US012601838B2

(12) United States Patent
Miyamoto et al.

(10) Patent No.: US 12,601,838 B2
(45) Date of Patent: Apr. 14, 2026

(54) SEMICONDUCTOR DEVICE

(71) Applicants: Sony Group Corporation, Tokyo (JP);
**Sony Semiconductor Solutions
Corporation**, Kanagawa (JP)

(72) Inventors: Takashi Miyamoto, Kanagawa (JP);
Yoshiyuki Akiyama, Kanagawa (JP);
Toru Akishita, Tokyo (JP); **Harunaga
Hiwatari**, Kanagawa (JP)

(73) Assignees: Sony Group Corporation, Tokyo (JP);
**Sony Semiconductor Solutions
Corporation**, Kanagawa (JP)

( * ) Notice: Subject to any disclaimer, the term of this
patent is extended or adjusted under 35
U.S.C. 154(b) by 1096 days.

(21) Appl. No.: 17/625,015

(22) PCT Filed: May 8, 2020

(86) PCT No.: PCT/JP2020/018650
§ 371 (c)(1),
(2) Date: Jan. 5, 2022

(87) PCT Pub. No.: WO2021/009997
PCT Pub. Date: Jan. 21, 2021

(65) Prior Publication Data
US 2022/0291380 A1     Sep. 15, 2022

(30) Foreign Application Priority Data
Jul. 12, 2019     (JP) ................................. 2019-130102

(51) Int. Cl.
*G01S 17/26*          (2020.01)
*G01S 7/484*          (2006.01)
(Continued)

(52) U.S. Cl.
CPC .............. *G01S 17/26* (2020.01); *G01S 7/484*
(2013.01); *G01S 7/4863* (2013.01); *G01S
7/4865* (2013.01)

(58) Field of Classification Search
CPC ........ G01S 17/26; G01S 7/484; G01S 7/4863;
G01S 7/4865; G01S 17/894; G01S 7/487;
G01J 11/00
See application file for complete search history.

(56) References Cited

U.S. PATENT DOCUMENTS 11,175,388  B1 *  11/2021  Wood ...................... G01S 17/34
2011/0134298  A1 *  6/2011  Aoyama ............. H10F 39/8033
257/431
(Continued)

FOREIGN PATENT DOCUMENTS

CN          1132378 A     10/1996
CN        101702017 A      5/2010
(Continued)

OTHER PUBLICATIONS

International Search Report (PCT/ISA/210), International Applica-
tion No. PCT/JP2020/018650, dated Jul. 7, 2020.

*Primary Examiner* — Isam A Alsomiri
*Assistant Examiner* — Joseph C Fritchman
(74) *Attorney, Agent, or Firm* — Michael Best &
Friedrich LLP

(57)               ABSTRACT
An object is to effectively take measures against erroneous
measurement of distance measurement information based on
a laser light source. Therefore, a semiconductor device
according to the present technology includes an imaging unit
including a photoelectric conversion element that receives
reflected light of light emitted from a specific laser light
source reflected by a subject and performs photoelectric
conversion and a control unit that executes validity deter-
mination processing for determining whether or not the light
(Continued)

received by the photoelectric conversion element is the light emitted from the specific laser light source.

20 Claims, 50 Drawing Sheets

(51) Int. Cl.
   *G01S 7/4863*      (2020.01)
   *G01S 7/4865*      (2020.01)

(56)                    References Cited

U.S. PATENT DOCUMENTS

| | | | |
|---|---|---|---|
| 2011/0163905 A1 | 7/2011 | Denis | |
| 2012/0194799 A1 | 8/2012 | Kamiyama | |
| 2017/0123053 A1 | 5/2017 | Stigwall | |
| 2017/0276789 A1* | 9/2017 | Ikeno | H04N 25/46 |
| 2017/0329011 A1 | 11/2017 | Warke et al. | |
| 2018/0269646 A1* | 9/2018 | Welford | H01S 3/0627 |

| | | | |
|---|---|---|---|
| 2019/0086541 A1* | 3/2019 | Kubota | G01S 7/484 |
| 2019/0132541 A1* | 5/2019 | Borremans | H04N 25/46 |
| 2020/0033118 A1* | 1/2020 | Nguyen | G06T 17/20 |

FOREIGN PATENT DOCUMENTS

| | | | |
|---|---|---|---|
| DE | 102009037596 A1 | 5/2011 | |
| DE | 102016209314 A1 | 12/2016 | |
| DE | 102016219515 A1 | 5/2017 | |
| JP | H05-281038 A | 10/1993 | |
| JP | 2001108886 A | 4/2001 | |
| JP | 2006322759 A | 11/2006 | |
| JP | 2008076131 A | 4/2008 | |
| JP | 2011216843 A | 10/2011 | |
| JP | 2013207321 A | 10/2013 | |
| JP | 2017531356 A | 10/2017 | |
| JP | 2018194297 A | 12/2018 | |
| JP | 2019056567 A | 4/2019 | |
| WO | WO-2011143647 A1 | 11/2011 | |
| WO | 2016/157600 A1 | 10/2016 | |
| WO | 2017/130996 A1 | 8/2017 | |
| WO | WO-2018135320 A1 | 7/2018 | |

* cited by examiner

| | |
|---|---|
| SPOT SHAPE A | ◯ |
| SPOT SHAPE B | ◎ |
| SPOT SHAPE C | ⬭ |
| SPOT SHAPE D | ▢ |
| SPOT SHAPE E | (double-lobed shape) |
| SPOT SHAPE F | (four small circles) |
| SPOT SHAPE G | △ |
| SPOT SHAPE H | □ |
| SPOT SHAPE I | ▯ |
| SPOT SHAPE J | (trapezoid) |
| SPOT SHAPE K | ◇ |
| SPOT SHAPE L | ⬠ |
| SPOT SHAPE M | ⬡ |
| SPOT SHAPE N | ☆ |

IRRADIATED DOT PATTERN

IRRADIATED DOT PATTERN

IRRADIATED DOT PATTERN

FIG. 61

BONDING SURFACE

INCIDENT LIGHT

SEMICONDUCTOR DEVICE

TECHNICAL FIELD

The present technology relates to a semiconductor device that performs distance measurement.

BACKGROUND ART

There is a distance measurement device that can prevent an output of erroneous distance measurement information with a simple configuration (for example, refer to Patent Document 1). This distance measurement device superimposes a signal of a side channel using a hardware logic circuit that generates a random number that is difficult to be duplicated or imitated on a signal of a main channel used to measure a relative distance to an object. A comparison verification unit collates transmission-side side channel data with reception-side side channel data and verifies the similarity so as to confirm validity of a reception signal.

CITATION LIST

Patent Document

Patent Document 1: Japanese Patent Application Laid-Open No. 2018-194297

SUMMARY OF THE INVENTION

Problems to be Solved by the Invention

However, in the invention described in Patent Document 1, an LED is used as a light source necessary for distance measurement, and the invention described in Patent Document 1 is not appropriate in a case where a laser resonator is used as a light source. In an actual environment where various noises exist, an enormous number of times of measurement and signal processing are required. Therefore, it is difficult to accurately verify the similarity at high speed from a weak side-channel signal.

Therefore, an object is to effectively take measures against erroneous measurement distance measurement information of based on a laser light source.

Solutions to Problems

A semiconductor device according to the present technology includes an imaging unit including a photoelectric conversion element that receives reflected light of light emitted from a specific laser light source reflected by a subject and performs photoelectric conversion and a control unit that executes validity determination processing for determining whether or not the light received by the photoelectric conversion element is the light emitted from the specific laser light source.

For example, in a case where distance measurement is performed using the specific laser light source, the control unit determines that the received light is reflected light of the light emitted from the specific laser light source.

The photoelectric conversion element in the semiconductor device described above includes a first photoelectric conversion element, and the first photoelectric conversion element may be connected to at least four charge accumulation units to which charges accumulated in different periods in the first photoelectric conversion element are transferred.

As a result, a light receiving waveform based on a waveform of the light emitted from a laser light source can be obtained.

The photoelectric conversion element in the semiconductor device described above includes a second photoelectric conversion element, and the number of the charge accumulation units connected to the second photoelectric conversion element may be less than the number of the charge accumulation units connected to the first photoelectric conversion element.

For example, the second photoelectric conversion element is used for distance measurement.

The number of the second photoelectric conversion elements in the semiconductor device described above may be more than the number of the first photoelectric conversion elements.

As a result, the number of charge accumulation units connected to the photoelectric conversion elements is further reduced.

The first photoelectric conversion elements in the semiconductor device described above may be arranged on an outer side of a group of the second photoelectric conversion elements.

As a result, the second photoelectric conversion elements can be densely arranged.

The first photoelectric conversion element in the semiconductor device described above may be used for the validity determination processing and also used for distance measurement.

As a result, light reception data received by the first photoelectric conversion element can be effectively used.

The first photoelectric conversion element in the semiconductor device described above may be used for the validity determination processing, and the second photoelectric conversion element may be used for distance measurement.

That is, some photoelectric conversion elements are used for the validity determination processing.

In the validity determination processing of the semiconductor device described above, determination based on a rising waveform of the laser light source may be made.

The rising waveform of the light emitted from the laser light source is individually different based on a laser resonator that generates laser light. It is difficult for a person other than a manufacturer of the laser light source to duplicate the rising waveform.

In the validity determination processing of the semiconductor device described above, determination based on a light reception spot shape of the light emitted from the laser light source may be made.

The light reception spot shape is determined on the basis of a spatial positional relationship between the laser light source, the subject, and the imaging unit.

The semiconductor device described above may include an illumination unit including the specific laser light source.

By integrating the specific laser light source and the imaging unit, a positional relationship between the specific laser light source and the imaging unit is constantly fixed.

The illumination unit in the semiconductor device described above may be able to irradiate laser light with a first waveform and laser light with a second waveform different from the first waveform.

As a result, the validity determination processing can be executed using both of the first waveform and the second waveform.

In the semiconductor device described above, light intensities of the first waveform and the second waveform at the time of irradiation may be different from each other.

As a result, the validity determination processing considering the light intensity can be executed.

In the semiconductor device described above, rising shapes of the first waveform and the second waveform may be different from each other.

As a result, it is possible to execute the validity determination processing using the rising shapes of both of the first waveform and the second waveform.

The illumination unit in the semiconductor device described above may irradiate the first waveform and the second waveform in a random order.

As a result, it is possible to execute the validity determination processing considering an appearance order of the first waveform and the second waveform.

In the semiconductor device described above, light emission time lengths of the first waveform and the second waveform may be different from each other.

As a result, it is possible to execute the validity determination processing considering the light emission time lengths of the first waveform and the second waveform.

In the semiconductor device described above, non-light emission time lengths of the first waveform and the second waveform may be different from each other.

As a result, it is possible to execute the validity determination processing considering the non-light emission time lengths of the first waveform and the second waveform.

The illumination unit in the semiconductor device described above may be able to emit spot-like laser light of which an irradiation range is equal to or less than a quarter of an imaging range of the imaging unit.

As a result, even if the spot shape of the light irradiated on the subject is modified and the width is doubled, the spot shape can be within the imaging range.

The illumination unit in the semiconductor device described above may be able to emit laser light having a mirror symmetrical or point symmetrical spot-like shape.

This makes it easy to implement spot-like laser light.

The illumination unit in the semiconductor device described above may be able to emit laser light having a non-mirror symmetrical or non-point symmetrical spot-like shape.

This makes it difficult to imitate the spot-like laser light.

The illumination unit in the semiconductor device described above may be able to emit a dot pattern in which a plurality of spot-like laser light beams is irregularly arranged.

As a result, the plurality of spot-like laser light beams can be detected by one time of imaging by the imaging unit.

The illumination unit in the semiconductor device described above may be able to emit a dot pattern in which the plurality of spot-like laser light beams is regularly arranged.

This makes it easy to generate the dot pattern.

The illumination unit in the semiconductor device described above may be able to emit a dot pattern in which spot-like laser light beams of which the number is equal to or less than a quarter of the number of photoelectric conversion elements are arranged.

As a result, it is possible to execute the validity determination processing considering the light reception spot shape according to each spot light beam forming the dot pattern.

The illumination unit in the semiconductor device described above may irradiate the specific laser light source so that laser light having a spot shape smaller than the imaging range of the imaging unit draws a specific trajectory within the imaging range.

As a result, the validity determination processing using the specific trajectory, that is, a scan trajectory can be executed.

BRIEF DESCRIPTION OF DRAWINGS

FIG. 2 is a diagram illustrating a configuration example of an imaging element.

FIG. 7 is a graph illustrating an example of a relationship between a wavelength and light intensity of a laser resonator.

FIG. 39 is a diagram illustrating a configuration example of a signal processing circuit in the ninth example of the validity determination processing.

FIG. 42 is a diagram illustrating an example of a spot shape of the laser light in the ninth example of the validity determination processing.

FIG. 61 is a cross-sectional view of an SPAD pixel in the seventeenth example of the validity determination processing.

MODE FOR CARRYING OUT THE INVENTION

Hereinafter, embodiments will be described in the following order.

<1. Configuration of imaging device>
<1-1. Overall configuration>
<1-2. Configuration of imaging element>
<1-3. Configuration of unit pixel>

7
8

<2. Distance image generation method>
<3. Validity determination processing>
<3-1. Rising waveform of laser light>
<3-2. First example of validity determination processing>
<3-3. Second example of validity determination process-
ing>
<3-4. Third example of validity determination process-
ing>
<3-5. Fourth example of validity determination process-
ing>
<3-6. Fifth example of validity determination processing>
<3-7. Sixth example of validity determination process-
ing>
<3-8. Seventh example of validity determination process-
ing>
<3-9. Eighth example of validity determination process-
ing>
<3-10. Ninth example of validity determination process-
ing>
<3-11. Tenth example of validity determination process-
ing>
<3-12. Eleventh example of validity determination pro-
cessing>
<3-13. Twelfth example of validity determination pro-
cessing>
<3-14. Thirteenth example of validity determination pro-
cessing>
<3-15. Fourteenth example of validity determination pro-
cessing>
<3-16. Fifteenth example of validity determination pro-
cessing>
<3-17. Sixteenth example of validity determination pro-
cessing>
<3-18. Seventeenth example of validity determination
processing>
<4. Summary>
<5. The present technology>

1. Configuration of Imaging Device 1-1. Overall Configuration

Figure 1:
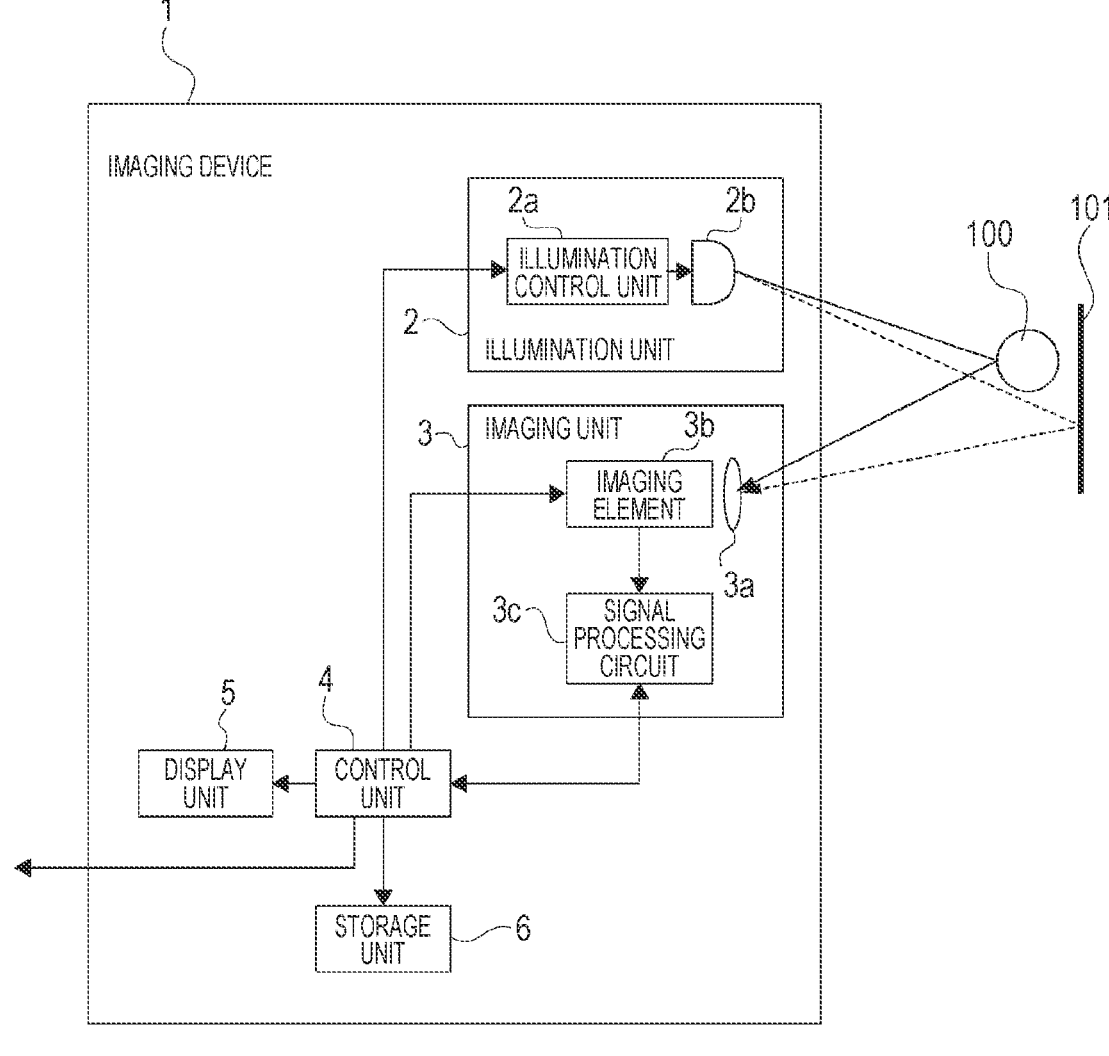
FIG. 1 is a diagram illustrating a system configuration example of an imaging device according to an embodiment of the present technology.

A block diagram of an imaging device 1 according to the
present embodiment is illustrated in FIG. 1. The imaging
device 1 is a device that captures a distance image, for
example, using the Time of Flight (ToF) method. Here, the
distance image indicates an image including a distance pixel
signal based on a distance of a subject from the imaging
device 1 in a depth direction detected for each pixel.

The imaging device 1 includes an illumination unit 2, an
imaging unit 3, a control unit 4, a display unit 5, and a
storage unit 6.

The illumination unit 2 includes an illumination control
unit 2a and a laser light source 2b. The illumination control
unit 2a controls a pattern in which the laser light source 2b
emits irradiation light (laser light) on the basis of control by
the control unit 4. Specifically, the illumination control unit
2a controls a pattern in which the laser light source 2b emits
the irradiation light according to an irradiation code included
in an irradiation signal supplied from the control unit 4.

For example, the irradiation code includes two values
including one (High) and zero (Low), the illumination
control unit 2a performs control to turn on the laser light
source 2b when the value of the irradiation code is one and
turn off the laser light source 2b when the value of the
irradiation code is zero.

The laser light source 2b emits light using a laser reso-
nator (light resonator) on the basis of the control by the
illumination control unit 2a. As the laser light emitted from
the laser light source 2b, it is desirable to use near infrared
light that is invisible or hardly visible to the naked eyes and
for which a light receiving sensor can be manufactured using
inexpensive silicon. However, far-infrared light, visible
light, ultraviolet light, or the light may be used.

As the laser resonator included in the laser light source 2b,
for example, a semiconductor laser (diode laser) is used.
However, a solid-state laser, a liquid laser, a gas laser, or the
like may be used.

As the semiconductor laser, an edge emitting laser (EEF)
that has a structure in which a resonator is formed in parallel
to a semiconductor substrate and a cleavage side surface
emits light, a surface emitting laser (SEL) that has a struc-
ture in which light is emitted in a direction perpendicular to
a semiconductor substrate, a vertical cavity surface emitting
laser (VCSEL) that is a surface emitting laser in which a
resonator is formed to be perpendicular to a semiconductor
substrate, a vertical external cavity surface emitting laser
(VECSEL) that has a resonator outside, or the like may be
used.

The imaging unit 3 includes a lens 3a, an imaging element
3b, and a signal processing circuit 3c.

The lens 3a forms an image of incident light on an
imaging surface of the imaging element 3b. The lens 3a may
have any configuration and, for example, may include a
plurality of lens groups.

The imaging element 3b includes, for example, a comple-
mentary metal oxide semiconductor (CMOS) image sensor
using the ToF method. The imaging element 3b images
subjects 100 and 101 on the basis of the control by the
control unit 4 and supplies an image signal obtained as a
result of the imaging to the signal processing circuit 3c.

Specifically, the imaging element 3b generates a pixel
signal indicating a correlation between a reference signal
supplied from the control unit 4 and reception light includ-
ing reflected light obtained by reflecting the irradiation light
irradiated from the laser light source 2b by the subjects 100
and 101 or the like and supplies the pixel signal to the signal
processing circuit 3c.

Note that the reference signal includes a reference code
indicating a pattern used to detect the correlation with the
reception light.

The signal processing circuit 3c processes the pixel signal
supplied from the imaging element 3b on the basis of the
control by the control unit 4. For example, the signal
processing circuit 3c generates a distance image on the basis
of the pixel signal supplied from the imaging element 3b.

The signal processing circuit 3c supplies the generated
distance image to the control unit 4.

The control unit 4 includes, for example, a control circuit
such as a field programmable gate array (FPGA) or a digital
signal processor (DSP), a processor, or the like. The control
unit 4 controls the illumination control unit 2a, the imaging
element 3b, and the signal processing circuit 3c.

Furthermore, the control unit 4 supplies the distance
image acquired from the imaging unit 3 to the display unit
5 and displays the distance image on the display unit 5.

Moreover, the control unit 4 makes the storage unit 6 store
the distance image acquired from the imaging unit 3.

Furthermore, the control unit 4 outputs the distance image
acquired from the imaging unit 3 to outside.

The display unit 5 includes a panel-type display device,
for example, a liquid crystal display device, an organic
electro luminescence (EL) display device, or the like.

The storage unit 6 can include arbitrary storage device, storage medium, or the like and stores the distance image or the like.

In addition, in each unit included in the imaging device 1, each unit used to execute various types of processing is provided.

1-2. Configuration of Imaging Element

Figure 2:
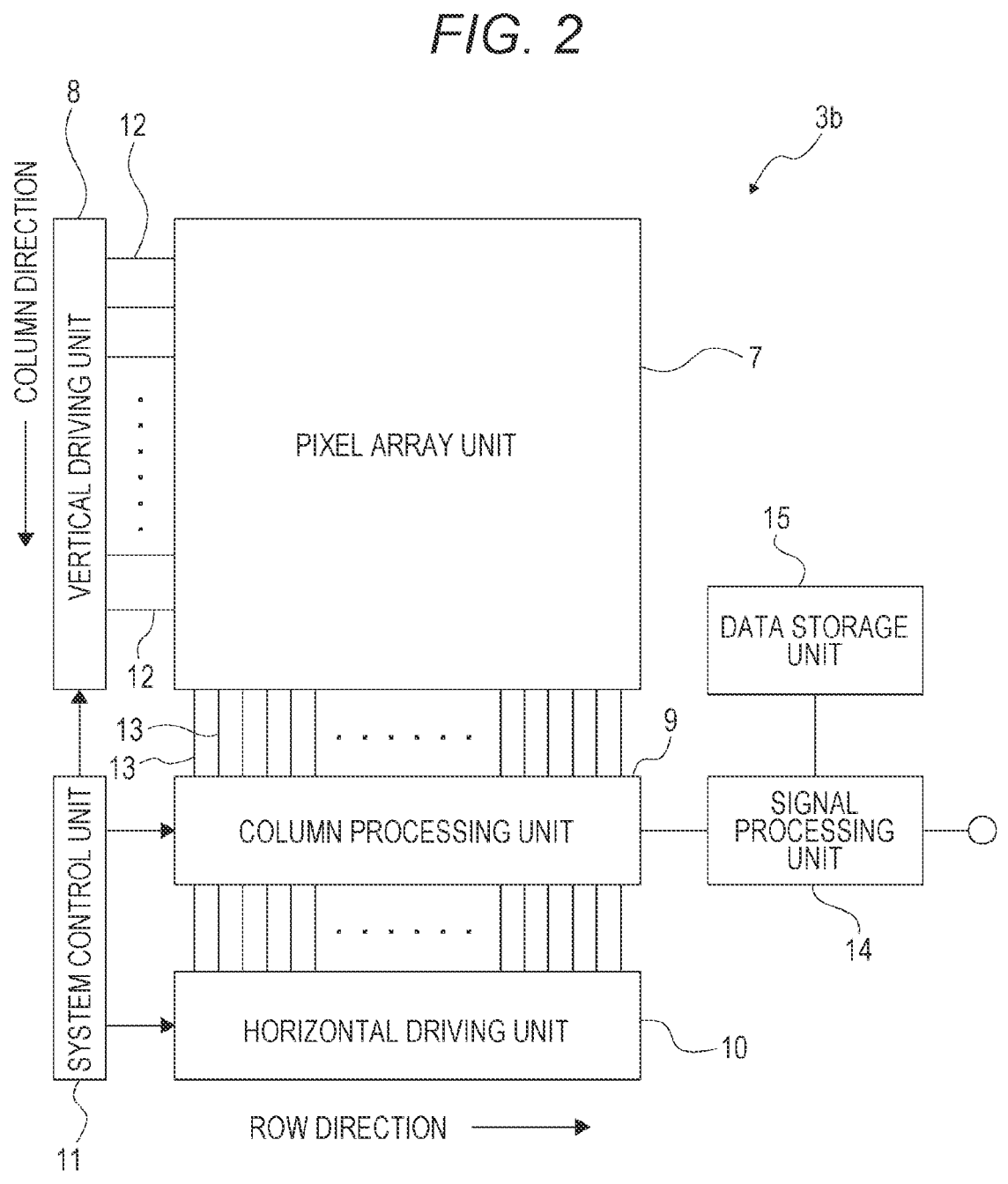

A configuration of the imaging element 3b is illustrated in FIG. 2.

The imaging element 3b includes a pixel array unit 7, a vertical driving unit 8, a column processing unit 9, a horizontal driving unit 10, a system control unit 11, pixel driving lines 12, vertical signal lines 13, a signal processing unit 14, and a data storage unit 15.

The pixel array unit 7 includes a pixel including a photoelectric conversion element that generates and accumulates charges according to an amount of the reflected light entered from the subject. The pixels included in the pixel array unit 7 are arranged in a two-dimensional array in a row direction and a column direction illustrated in FIG. 2.

For example, in the pixel array unit 7, the pixel driving line 12 is arranged along the row direction for each pixel row including pixels arranged in the row direction, and the vertical signal line 13 is arranged along the column direction for each pixel column including pixels arranged in the column direction.

The vertical driving unit 8 includes a shift register, an address decoder, or the like and supplies signals or the like to each pixel via the plurality of pixel driving lines 12. All the pixels or the pixels in row unit of the pixel array unit 7 are simultaneously driven on the basis of the supplied signal.

The column processing unit 9 reads signals from each pixel via the vertical signal line 13 for each pixel column of the pixel array unit 7, executes noise removal processing, correlated double sampling processing, analog to digital (A/D) conversion processing, or the like, and generates a pixel signal.

The horizontal driving unit 10 includes a shift register, an address decoder, or the like and sequentially selects a unit circuit corresponding to the pixel column of the column processing unit 9. Through selection scanning by the horizontal driving unit 10, the pixel signal on which the signal processing has been executed by the column processing unit 9 for each unit circuit is sequentially output to the signal processing unit 14.

The system control unit 11 includes a timing generator or the like that generates various timing signals, and drives and controls the vertical driving unit 8, the column processing unit 9, and the horizontal driving unit 10 on the basis of the timing signal generated by the timing generator. The signal processing unit 14 executes signal processing such as calculation processing on the pixel signal supplied from the column processing unit 9 while temporarily storing data in the data storage unit 15 as necessary and outputs an image signal including each pixel signal.

1-3. Configuration of Unit Pixel

A configuration example of the unit pixel will be described with reference to FIG. 3. Note that FIG. 3 is an equivalent circuit of the unit pixel.

A unit pixel 16 configuring the pixel array unit 7 of the imaging element 3b includes a photoelectric conversion element 17, transfer transistors 18a and 18b, floating diffusions (FD) 20a and 20b, reset transistors 22 and 23, a selection transistor 24, and amplification transistors 25 and 26.

Figure 3:
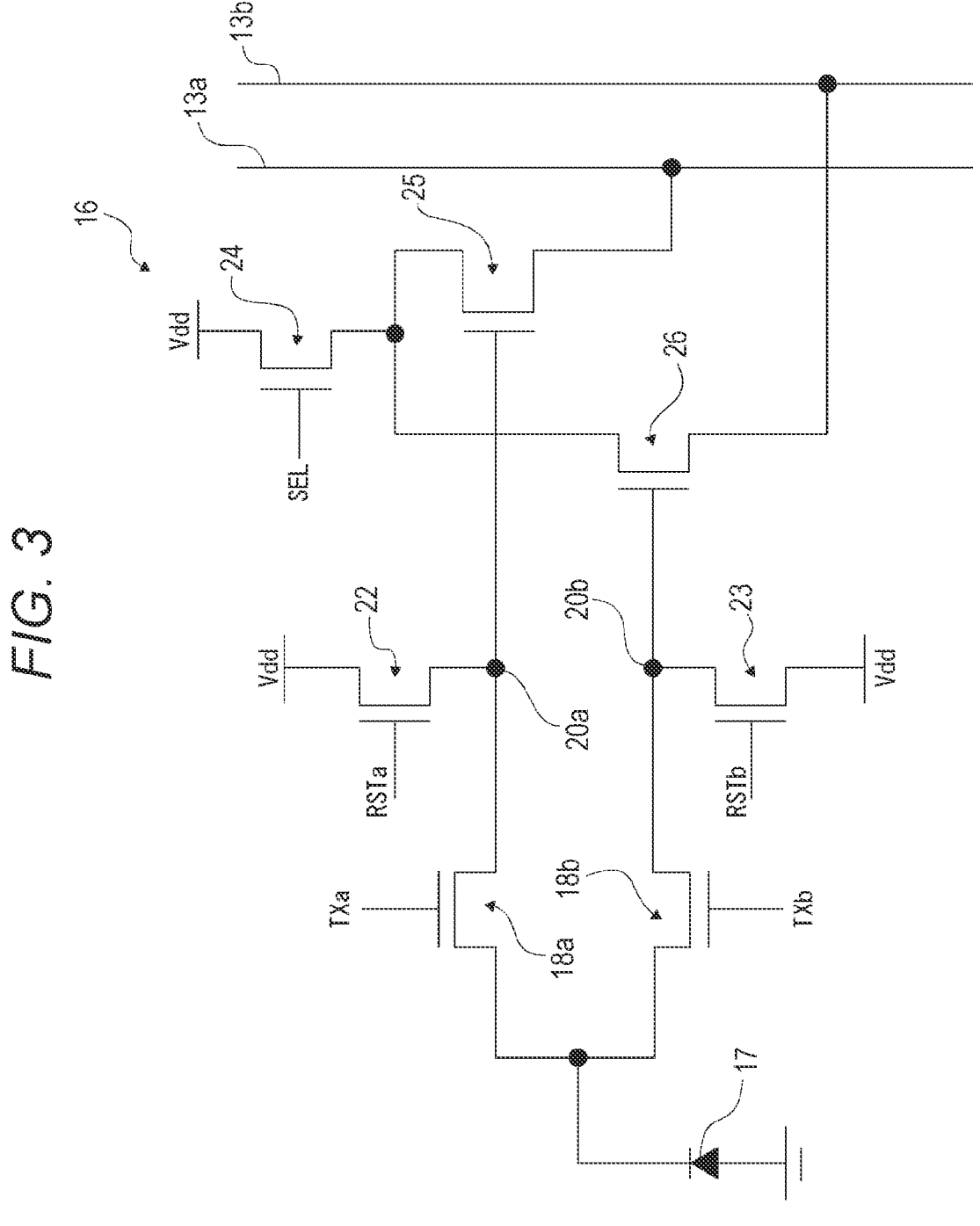
FIG. 3 is a diagram illustrating a configuration example of a unit pixel as an equivalent circuit.

Note that, in FIG. 3, an example is illustrated in which N-channel MOS transistors are used as the reset transistors 22 and 23, the selection transistor 24, and the amplification transistors 25 and 26. However, a combination of conductivity types of the reset transistors 22 and 23, the selection transistor 24, and the amplification transistors 25 and 26 is not limited to this example.

The photoelectric conversion element 17 includes, for example, an embedded photodiode. Specifically, description will be made with reference to FIG. 4.

The photoelectric conversion element 17 is formed by forming a p-type layer 28 on a substrate surface side of a p-type semiconductor substrate 27 and embedding an n-type embedding layer 29.

The transfer transistor 18a includes a gate electrode 19a. The gate electrode 19a is formed so as to cover a region between the photoelectric conversion element 17 and the FD 20a via an insulation film 30 formed on the surface of the semiconductor substrate 27.

A transfer signal TXa is supplied to the gate electrode 19a from the vertical driving unit 8 via the pixel driving line 12. When a voltage of the transfer signal TXa is set to a predetermined High level and the transfer transistor 18a is in a conductive state, the charge generated by the photoelectric conversion element 17 is transferred to the FD 20a via the transfer transistor 18a.

The transfer transistor 18b includes a gate electrode 19b. The gate electrode 19b is formed so as to cover a region between the photoelectric conversion element 17 and the FD 20b via the insulation film 30 formed on the surface of the semiconductor substrate 27.

A transfer signal TXb is supplied to the gate electrode 19b from the vertical driving unit 8 via the pixel driving line 12. When a voltage of the transfer signal TXb is set to a predetermined High level and the transfer transistor 18b is in a conductive state, the charge generated by the photoelectric conversion element 17 is transferred to the FD 20b via the transfer transistor 18b.

Note that it is assumed that the transfer signal TXa be a signal same as the reference signal supplied from the control unit 4 to the system control unit 11 and the transfer signal TXb be a signal obtained by inverting a bit of the reference signal. Therefore, the charges generated by the photoelectric conversion element 17 are distributed to the FDs 20a and 20b.

As a correlation between the reception light entering the photoelectric conversion element 17 and the reference signal is higher, the charge amount transferred to and accumulated in the FD 20a increases, the charge amount transferred to and accumulated in the FD 20b is decreased, and a difference between the charge amounts increases.

On the other hand, as the correlation between the reception light entering the photoelectric conversion element 17 and the reference signal is lower, the charge amount transferred to and accumulated in the FD 20a is decreased, the charge amount transferred to and accumulated in the FD 20b is increased, and the difference between the charge amounts decreases.

Except a part of an upper side of the FD 20a and a part of an upper side of the FD 20b, the insulation film 30 is formed to cover an entire surface of the semiconductor substrate 27.

Except an upper side of the photoelectric conversion element 17, a part of the upper side of the FD 20a, and a part of the upper side of the FD 20b, a light shielding curtain 31 is formed to cover an entire upper portion of the semiconductor substrate 27.

The FD 20a accumulates the charges transferred from the photoelectric conversion element 17 via the transfer transistor 18a and converts the accumulated charges into a voltage.

The FD 20b accumulates the charges transferred from the photoelectric conversion element 17 via the transfer transistor 18b and converts the accumulated charges into a voltage.

A drain electrode of the reset transistor 22 is connected to a pixel power supply Vdd, and a source electrode is connected to gate electrodes of the FD 20a and the amplification transistor 25.

A reset signal RSTa is supplied from the vertical driving unit 8 to a gate electrode of the reset transistor 22 via the pixel driving line 12. When a voltage of the reset signal RSTa is set to a predetermined High level and the reset transistor 22 is turned on, the FD 20a is reset, and the charges are discharged from the FD 20a.

A drain electrode of the reset transistor 23 is connected to the pixel power supply Vdd, and a source electrode is connected to gate electrodes of the FD 20b and the amplification transistor 26.

A reset signal RSTb is supplied from the vertical driving unit 8 to a gate electrode of the reset transistor 23 via the pixel driving line 12. When a voltage of the reset signal RSTb is set to a predetermined High level and the reset transistor 23 is turned on, the FD 20b is reset, and the charges are discharged from the FD 20b.

A drain electrode of the selection transistor 24 is connected to the pixel power supply Vdd, and a source electrode is connected to a drain electrode of the amplification transistor 25.

A source electrode of the amplification transistor 25 is connected to the vertical signal line 13. This vertical signal line is set as 13a.

A source electrode of the amplification transistor 26 is connected to the vertical signal line 13. This vertical signal line is set as 13b.

A selection signal SEL is supplied from the vertical driving unit 8 to a gate electrode of the selection transistor 24 via the pixel driving line 12. When a voltage of the selection signal SEL is set to a predetermined High level and the selection transistor 24 is turned on, the unit pixel 16 from which a pixel signal is read is selected.

That is, when the selection transistor 24 is turned on, the amplification transistor 25 supplies a signal SPa indicating the voltage of the FD 20a to the column processing unit 9 via the vertical signal line 13a.

When the selection transistor 24 is turned on, the amplification transistor 26 supplies a signal SPb indicating the voltage of the FD 20b to the column processing unit 9 via the vertical signal line 13b.

The signal processing unit 14 of the imaging element 3b generates a difference signal of the signals SPa and SPb supplied from each unit pixel 16 via the column processing unit 9. Furthermore, the signal processing unit 14 supplies the difference signal to the signal processing circuit 3c as a pixel signal of each unit pixel 16.

Therefore, the pixel signal output from the imaging element 3b is a signal indicating the correlation between the reference signal and the reception light of each unit pixel 16. That is, the higher the correlation between the reference signal and the reception light is, the larger the value of the pixel signal is. The lower the correlation between the reference signal and the reception light is, the smaller the value of the pixel signal is.

2. Distance Image Generation Method

An example of a distance image generation method performed by the imaging device 1 will be described with reference to each of FIGS. 5 and 6.

The imaging device 1 generates a distance image by performing a plurality of times of imaging using different combinations of the irradiation signals and the reference signals.

Figure 5:
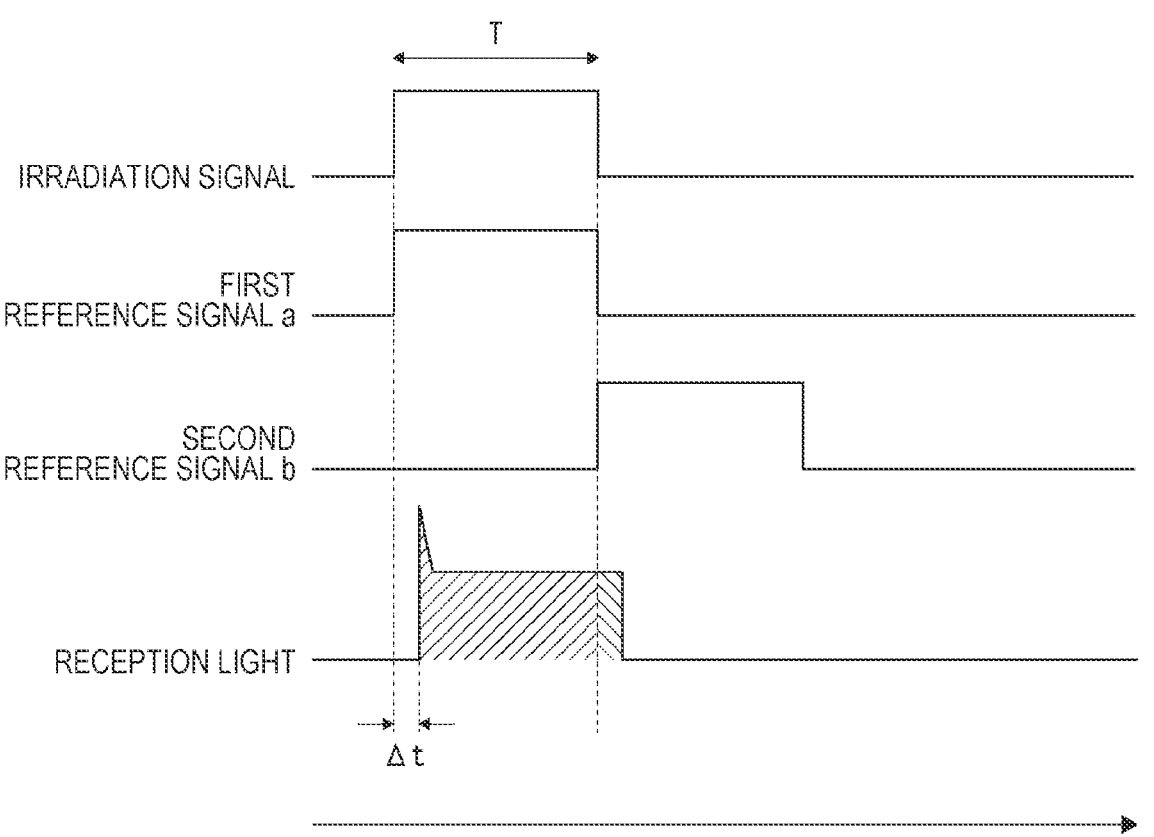
FIG. 5 is a timing chart example of distance image generation.

FIG. 5 is a timing chart of the distance image generation method in which the horizontal axis is a time axis t and respective timings of an irradiation signal, a first reference signal a, a second reference signal b, and reception light are illustrated.

Figure 6:
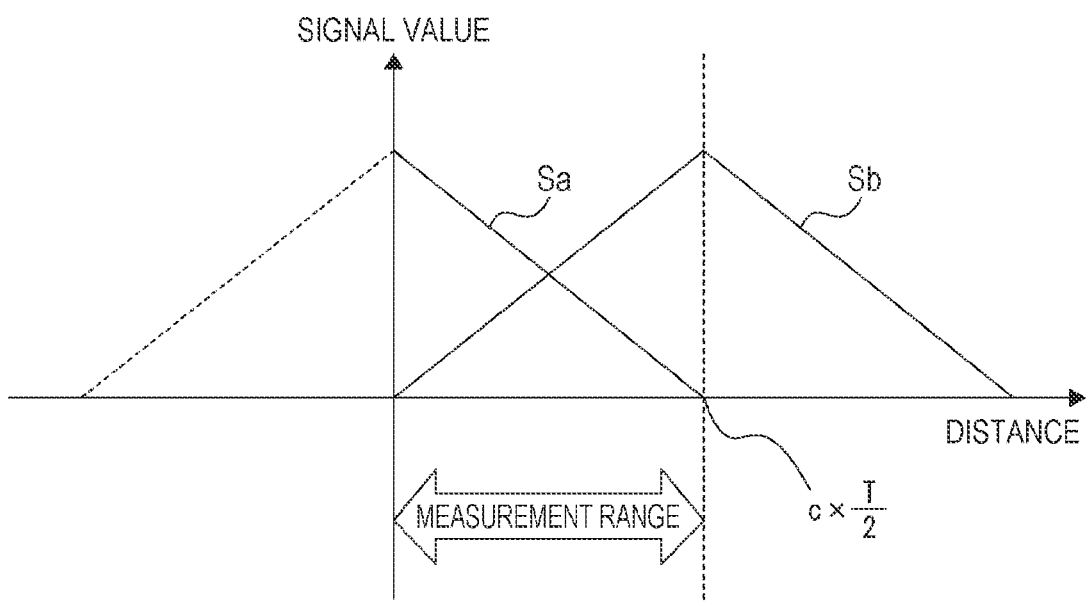
FIG. 6 is a graph schematically illustrating an example of a waveform of a pixel signal.

FIG. 6 schematically illustrates a relationship between a distance from the imaging device 1 to a subject and the pixel signal output from the unit pixel 16. The horizontal axis indicates a distance to the subject, and the vertical axis indicates a value of the pixel signal.

In the illustrated example, a combination of the irradiation signal and the first reference signal a is used at the time of first imaging. The irradiation signal and the first reference signal a are signals including pulses having the same phase and the same pulse width T.

The irradiation light emitted from the laser light source 2b has a substantially same waveform as the irradiation signal and has a rising waveform unique to a manufactured laser resonator. Hereinafter, for easy description of a basic concept of the distance image generation method, a case of a basic rectangular wave in which a rising waveform is omitted will be described.

A part of the irradiation light emitted from the laser light source 2b is reflected by the subject positioned in an irradiation direction, and a part of reflected light enters the photoelectric conversion element 17 of each unit pixel 16 of the imaging element 3b.

Here, reception light that enters the photoelectric conversion element 17 enters the photoelectric conversion element 17 with a delay of a delay time $\Delta t$ with respect to the irradiation signal (irradiation light) according to the distance between the imaging device 1 and the subject.

At this time, a value of a pixel signal Sa output from the unit pixel 16 is proportional to a time when the first reference signal a and the reception light overlap. That is, as setting a rise of a pulse of the first reference signal a as a reference (time of rising pulse of first reference signal a is set to zero), the value of the pixel signal Sa is maximized when the delay time $\Delta t$ is zero and is proportional to a time $T-\Delta t$. Then, when the delay time $\Delta t$ is equal to or more than the pulse width T, the value of the pixel signal Sa becomes zero.

At the time of second imaging, a combination of the irradiation signal and the second reference signal b is used. The second reference signal b has a waveform of which a phase is delayed by the same time as the pulse width T in comparison with the first reference signal a.

At this time, a value of a pixel signal Sb output from the unit pixel 16 is proportional to a time when the second reference signal b and the reception light overlap. That is, the value of the pixel signal Sb is proportional to the delay time $\Delta t$ when the delay time $\Delta t$ is zero to T and is proportional to a time $2T-\Delta t$ when the delay time $\Delta t$ is T to 2T. When the delay time $\Delta t$ becomes equal to or longer than 2T, the value of the pixel signal Sb becomes zero.

Here, the reception light includes reflected light of irradiation light that is irradiated with the same pattern as the irradiation signal (irradiation code), and the waveform of the reception light is similar to a waveform obtained by shifting the phase of the irradiation signal. Therefore, a waveform of the pixel signal Sa in FIG. 6 is similar to a waveform of a correlation function of the first reference signal a and the irradiation signal, and a waveform of the pixel signal Sb in FIG. 6 is similar to a waveform of a correlation function of the second reference signal b and the irradiation signal.

Note that the waveform of the pixel signal Sa here indicates a waveform in which a distance indicated by a dotted line in FIG. 6 includes a region of a negative value.

As indicated in the following formula 1, the distance to the subject is proportional to a ratio of the pixel signal Sb with respect to the sum of the pixel signal Sa and the pixel signal Sb.

[Expression 1]

$$\text{DISTANCE} \propto \frac{Sb}{Sa + Sb} \qquad \text{FORMULA 1}$$

For example, the signal processing circuit $3c$ generates a distance pixel signal based on the distance to the subject on the basis of the ratio of the pixel signal Sb with respect to the sum of the pixel signal Sa and the pixel signal Sb for each pixel and generates a distance image including the distance pixel signal. Then, on the basis of the distance image, for example, it is possible to measure the distance to the subject for each pixel or to recognize a difference between the distances.

Here, as illustrated in FIG. 6, distance measurement accuracy (distance measurement accuracy) is constant regardless of the distance because inclinations of the pixel signals Sa and Sb with respect to the distance are constant. The basic rectangular wave in which the rising waveform is omitted has been described above. However, it is desirable to consider the rising waveform in practice in FIG. 6 and the formula 1. In this case, a formula considering the rising waveform may be used for distance calculation. A result of the distance calculation is calculated without considering the rising waveform, and then, correction based on the rising waveform may be performed on the calculation result.

Furthermore, a range where the distance can be measured (distance measurement range) is set to a range before the pixel signal Sa becomes zero, and specifically, is a range from zero to a time c (light speed)×T/2.

3. Validity Determination Processing 3-1. Rising Waveform of Laser Light

In the present embodiment, the light emitted from the laser light source $2b$ included in the imaging device 1 enters the imaging element $3b$ as the reflected light from the subject, and distance measurement based on the incident light is performed. Therefore, there is a possibility that erroneous measurement is performed due to entry of light from a light source other than the laser light source $2b$, natural light, or the like to the imaging element $3b$.

The imaging device 1 according to the present embodiment has a configuration that reduces a possibility of such erroneous measurement. Specifically, validity determination processing for determining whether or not the light received by the imaging element $3b$ is light emitted from the laser light source $2b$ is executed. Hereinafter, description will be made with reference to each of the drawings.

First, the rising waveform of the laser light source $2b$ will be described with reference to each of FIGS. 7 to 11.

The laser resonator included in the laser light source $2b$ can be considered as a light emitting diode (LED) that satisfies conditions of laser oscillation.

Figure 7:
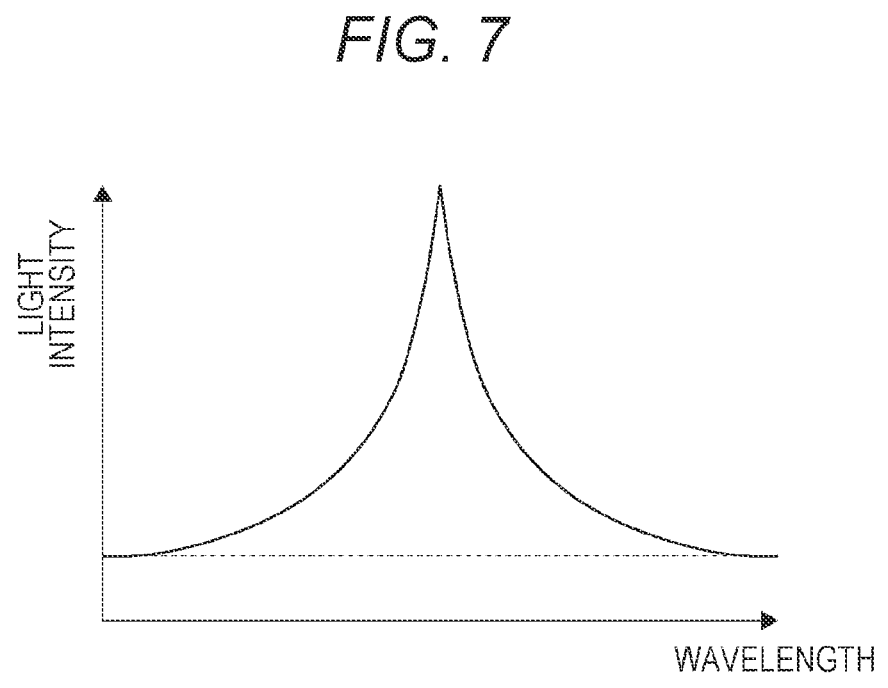

FIG. 7 illustrates a relationship between a wavelength and light intensity. The laser resonator has single peak characteristics in which the light intensity is maximized in a unique wavelength (center frequency). An oscillation wavelength emitted from the laser resonator has temperature dependency such that the oscillation wavelength becomes longer as the temperature increases. Therefore, the relationship between the time and the light intensity depends on a temperature change of the laser resonator.

Figure 8:
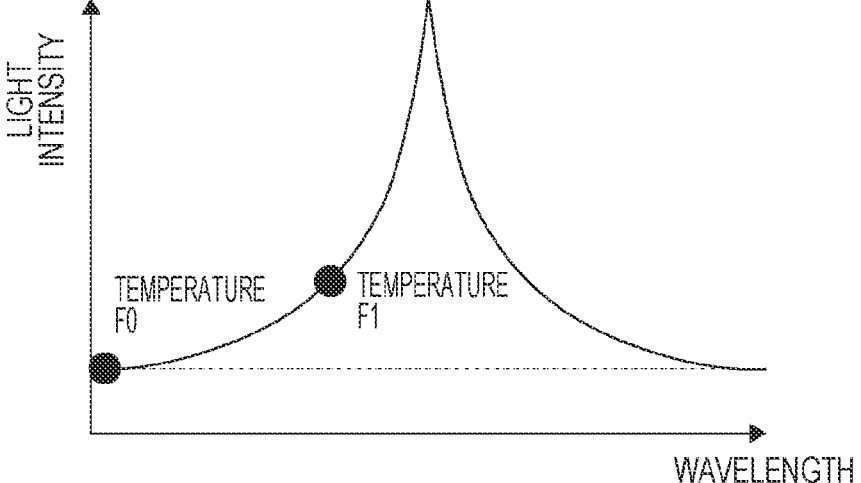
FIG. 8 is a graph illustrating an example of a relationship between a wavelength and light intensity of a laser resonator in a first light emission mode.
Figure 9:
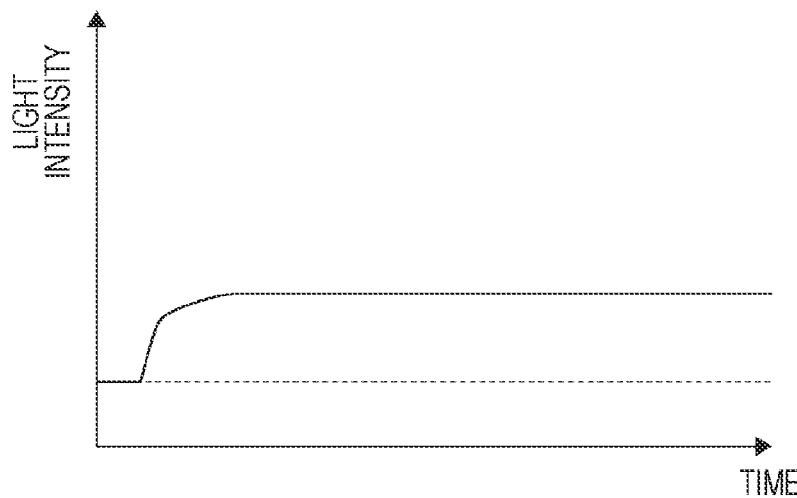
FIG. 9 is a graph illustrating an example of a temporal change in the light intensity of the laser resonator in the first light emission mode.

An example is illustrated in FIGS. 8 and 9. This example is an example in a case where an operating current (operating power) of the laser resonator is small, and FIG. 8 illustrates a wavelength of light emitted in a case where the temperature of the laser resonator increases from a temperature F0 to a temperature F1. FIG. 9 illustrates a temporal change in the light intensity.

As illustrated, because the operating current is small, the wavelength of the light emitted from the laser resonator is set to be shorter than a wavelength with the maximized light intensity. Therefore, a graph of a temporal change in the light intensity (that is, rising waveform of laser light) gradually increases, and after reaching a certain value, the certain value is maintained.

Figure 10:
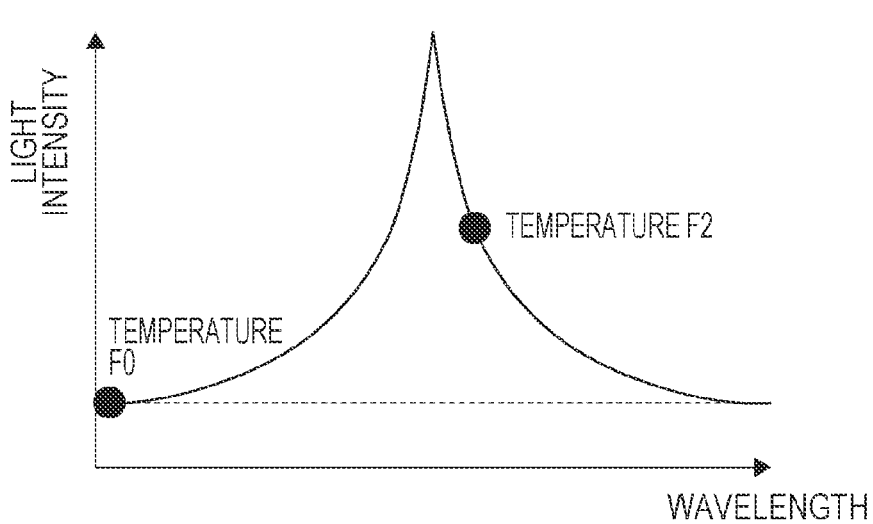
FIG. 10 is a graph illustrating an example of a relationship between a wavelength and light intensity of a laser resonator in a second light emission mode.
Figure 11:
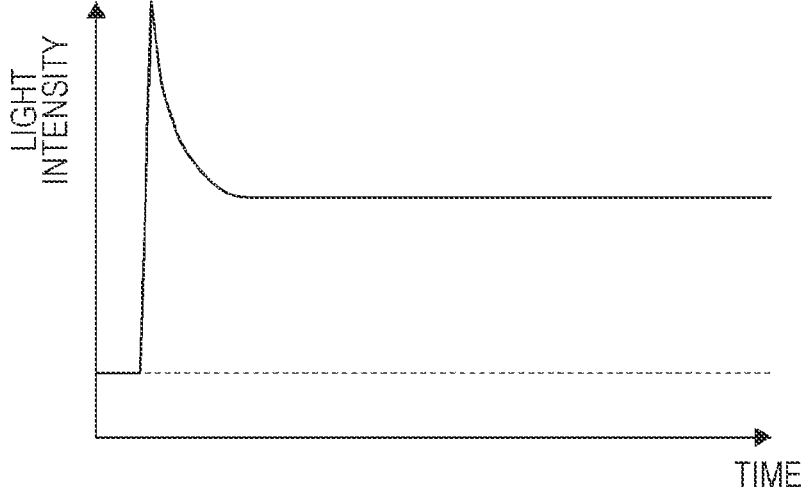
FIG. 11 is a graph illustrating an example of a temporal change in the light intensity of the laser resonator in the second light emission mode.

Another example is illustrated in FIGS. 10 and 11. This example is an example in a case where the operating current of the laser resonator is large, and FIG. 10 illustrates a wavelength of light emitted in a case where the temperature of the laser resonator increases from the temperature F0 to a temperature F2. FIG. 11 illustrates a temporal change in the light intensity.

As illustrated, because the operating current is large, the wavelength of the light emitted from the laser resonator is set to be larger than the wavelength with which the light intensity is maximized. Therefore, the rising waveform of the laser light has a shape that sharply rises and reaches a peak, and then, falls to the certain value.

In the following description, a light emission mode of the laser resonator that indicates the rising waveform as illustrated in FIG. 9 is referred to as a "first light emission mode", and a light emission mode of the laser resonator that indicates the rising waveform as illustrated in FIG. 11 is referred to as a "second light emission mode". Furthermore, laser light in the first light emission mode is referred to as "first laser light", and laser light in the second light emission mode is referred to as "second laser light".

The single peak characteristics of the laser resonator described above depend on the structure of the laser resonator, and in a case of a semiconductor laser, a center frequency depends on constituent elements of a semiconductor. Furthermore, an oscillation spectrum depends on light output (that is, spectrum linewidth is inversely proportional to light output). For these reasons, the relationship between the wavelength and the light intensity (FIG. 7) and the relationship between the time and the light intensity (FIGS. 9 and 11) individually vary for each laser resonator, and duplication by a person other than a manufacturer is considered as difficult. Therefore, validity can be determined by observing the rising waveform of the laser light.

3-2. First Example of Validity Determination Processing

A first example of the validity determination processing will be described with reference to each of FIGS. 12 to 17.

In the first example, a reference condition corresponding to a time waveform of light intensity at the time of irradiation is stored in the storage unit 6 in advance and measurement data corresponding to a time waveform of light intensity at the time of light reception is compared with the reference condition so as to confirm validity of a light receiving waveform.

Figure 12:
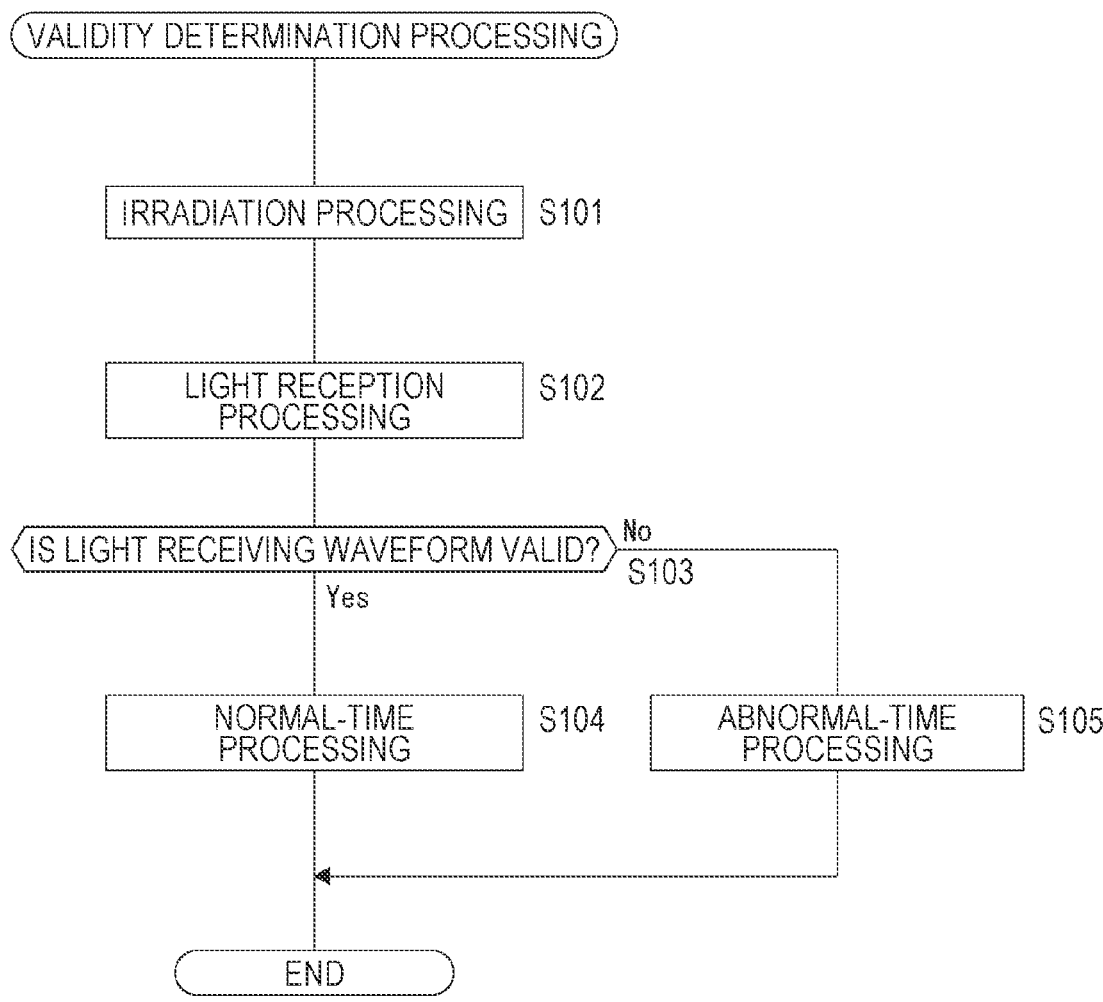
FIG. 12 is a flowchart of a first example of validity determination processing.
Figure 13:
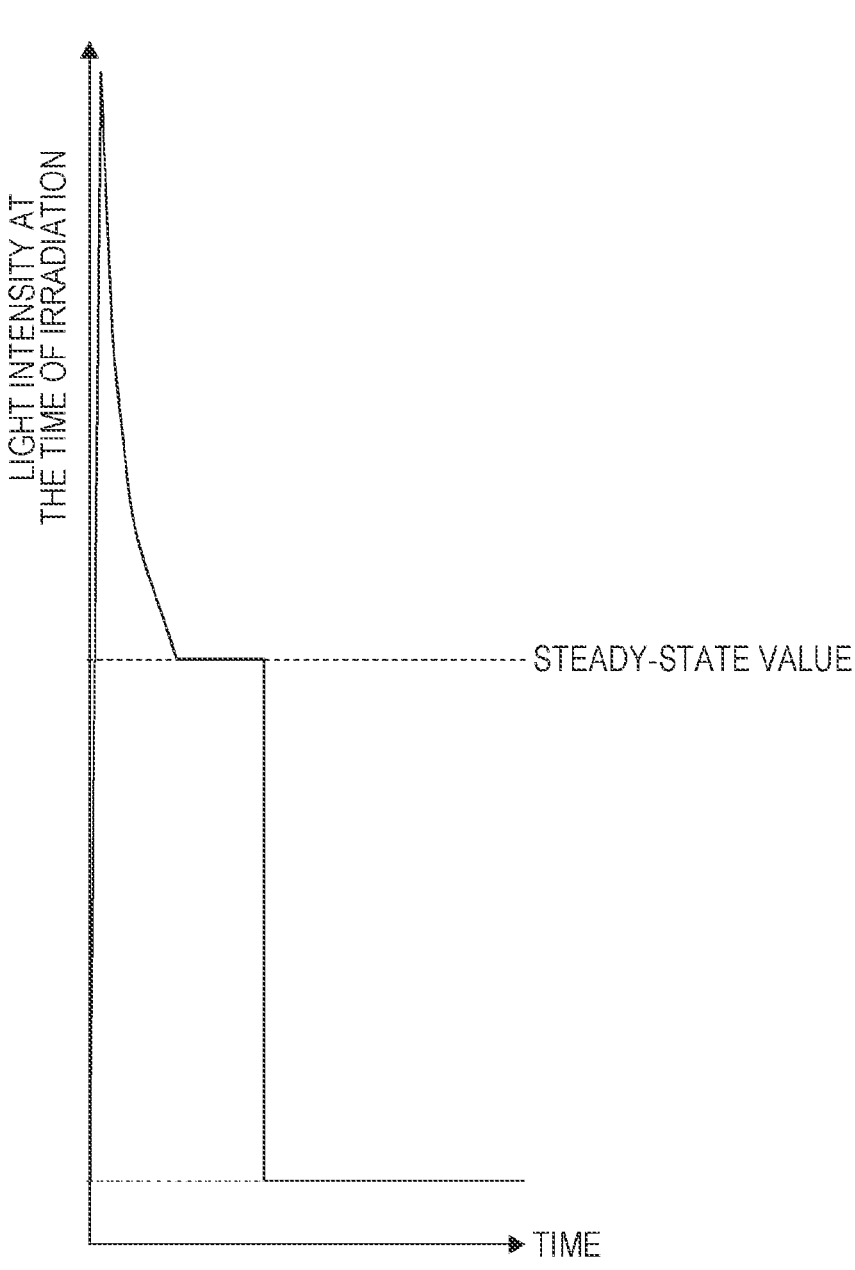
FIG. 13 is a graph illustrating a reference condition in the first example of the validity determination processing.
Figure 14:
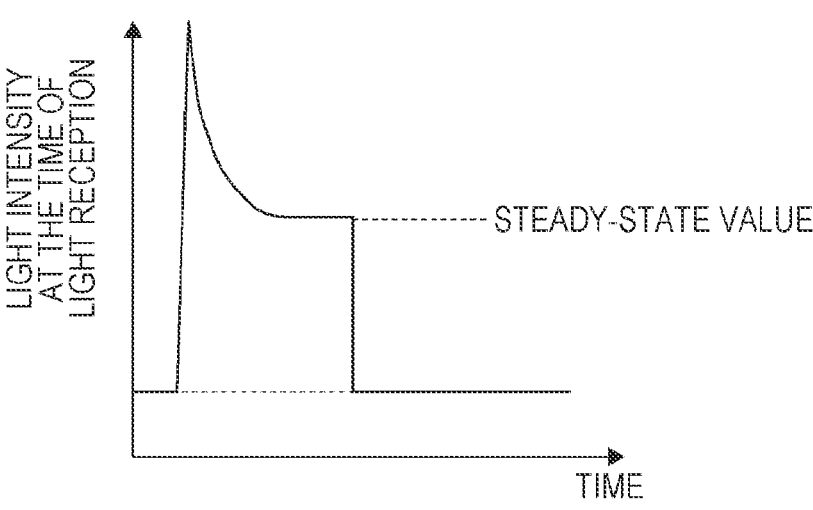
FIG. 14 is a graph illustrating an example of a normal light receiving waveform determined as valid in the first example of the validity determination processing.

A flowchart is illustrated in FIG. 12.

The control unit 4 executes irradiation processing in step S101. As a result, the laser light source 2b emits the laser light (first laser light or second laser light) in the first light emission mode or the second light emission mode. The emitted laser light turns to be reflected light by the subject and partially enters the imaging element 3b.

The control unit 4 executes light reception processing in step S102. As a result, the measurement data of the light receiving waveform is acquired.

The control unit 4 executes branching processing for determining whether or not the light receiving waveform is valid in step S103. The validity is confirmed by determining whether or not the reference condition stored in advance (for example, refer to FIG. 13) matches the light receiving waveform (for example, refer to FIG. 14) (or features match). Specifically, the determination is performed by confirming whether or not the maximum value of the light intensity of the light receiving waveform is substantially the same as a ratio of a steady-state value that is light intensity at the finally settled time or comparing a time length required from the rising to the falling of the waveform. Alternatively, the determination may be performed by comparing a time length from the rising to the steady-state value.

In a case where it is determined that the light receiving waveform is valid, the control unit 4 executes normal-time processing in step S104. In the normal-time processing, desired processing using a distance image or desired processing on a distance image is executed. That is, because the light receiving waveform is valid, it can be determined that the acquired distance image is correct. Therefore, it is possible to normally execute various types of processing using the distance image.

On the other hand, in a case where it is determined that the light receiving waveform is not valid in step S103, the control unit 4 executes abnormal-time processing in step S105. In the abnormal-time processing, for example, the validity may be determined again by executing each processing in steps S101 to S103. This is effective in a case where it is not possible to confirm the validity because optical noise accidentally enters from outside. Furthermore, backup processing for functional safety may be executed, in a case where a fail-safe function is included, processing for prioritizing the fail-safe function may be executed, or processing for separating information according to spontaneous light from information according to light emitted from others may be executed. Moreover, abnormality notification processing to a user of the imaging device 1 may be executed, a position and a rotation angle of a cross-talk person (including interferer) or an attacker (including disturber) may be specified by specifying a position and a rotation angle of an invalid light source, or complementary processing may be executed in a case where there are another measurement method, another distance measurement system, and another distance measurement device.

However, these cross-talk persons and attackers include not only humans but also non-humans such as other devices or nature. For example, processing for taking measures against erroneous measurement of spontaneous light of the imaging device 1 (including erroneous determination, malfunction, and unmeasurable caused by this) due to light emitted from other devices caused by other device including a light source (camera, mobile phone, smartphone, tablet, personal computer, game machine, television, display, electronic device, mobile device, automobile, moving body, drone, flying object, robot, movable body, or the like), the sun, or the like or light emitted from others such as natural light.

Figure 15:
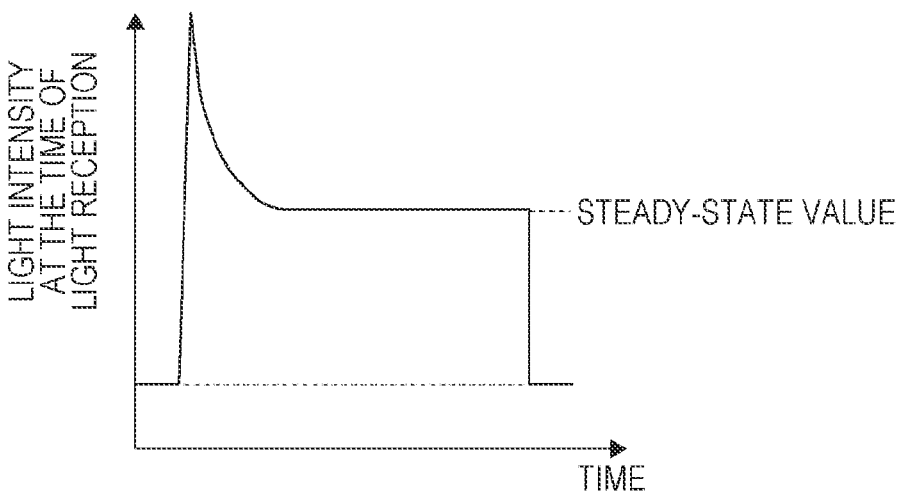
FIG. 15 is a graph illustrating an example of an abnormal light receiving waveform determined as invalid in the first example of the validity determination processing.
Figure 16:
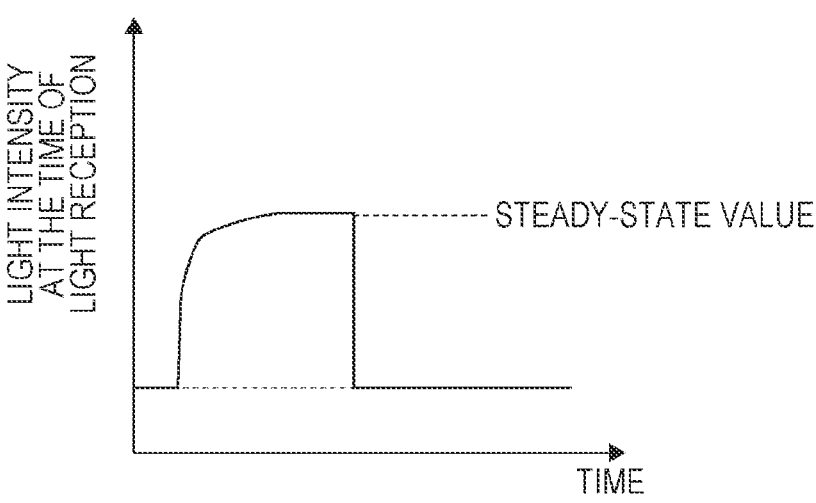
FIG. 16 is a graph illustrating another example of the abnormal light receiving waveform determined as invalid in the first example of the validity determination processing.
Figure 17:
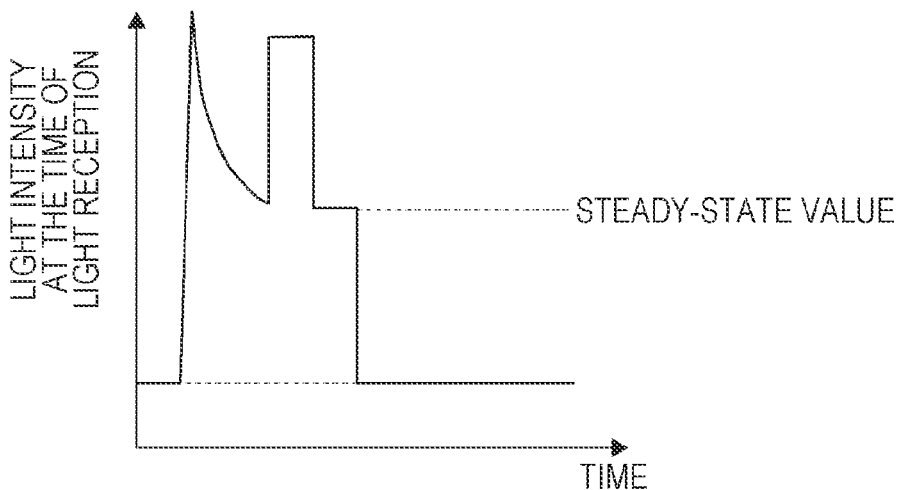
FIG. 17 is a graph illustrating still another example of the abnormal light receiving waveform determined as invalid in the first example of the validity determination processing.

Note that examples of the light receiving waveform that is determined to be invalid in the determination processing in step S103 are illustrated in FIGS. 15 to 17.

FIG. 15 is determined to be invalid because the time length required from the rising of the light receiving waveform to the falling does not match the reference condition.

FIG. 16 is determined to be invalid because a peak shape of the rising waveform does not exist. Alternatively, it may be determined to be invalid because the ratio between the maximum value of the light intensity and the steady-state value is different from the reference condition.

FIG. 17 is determined to be invalid because a peak value exists in a portion other than a rising portion.

Note that, as the reference condition stored in the storage unit 6, it is desirable to store information using the laser light source 2b in a calibrated state. Furthermore, calibration may be periodically performed in consideration of a temporal change of the laser resonator or the like, and the stored reference condition may be updated on the basis of the calibration.

3-3. Second Example of Validity Determination Processing

Figure 18:
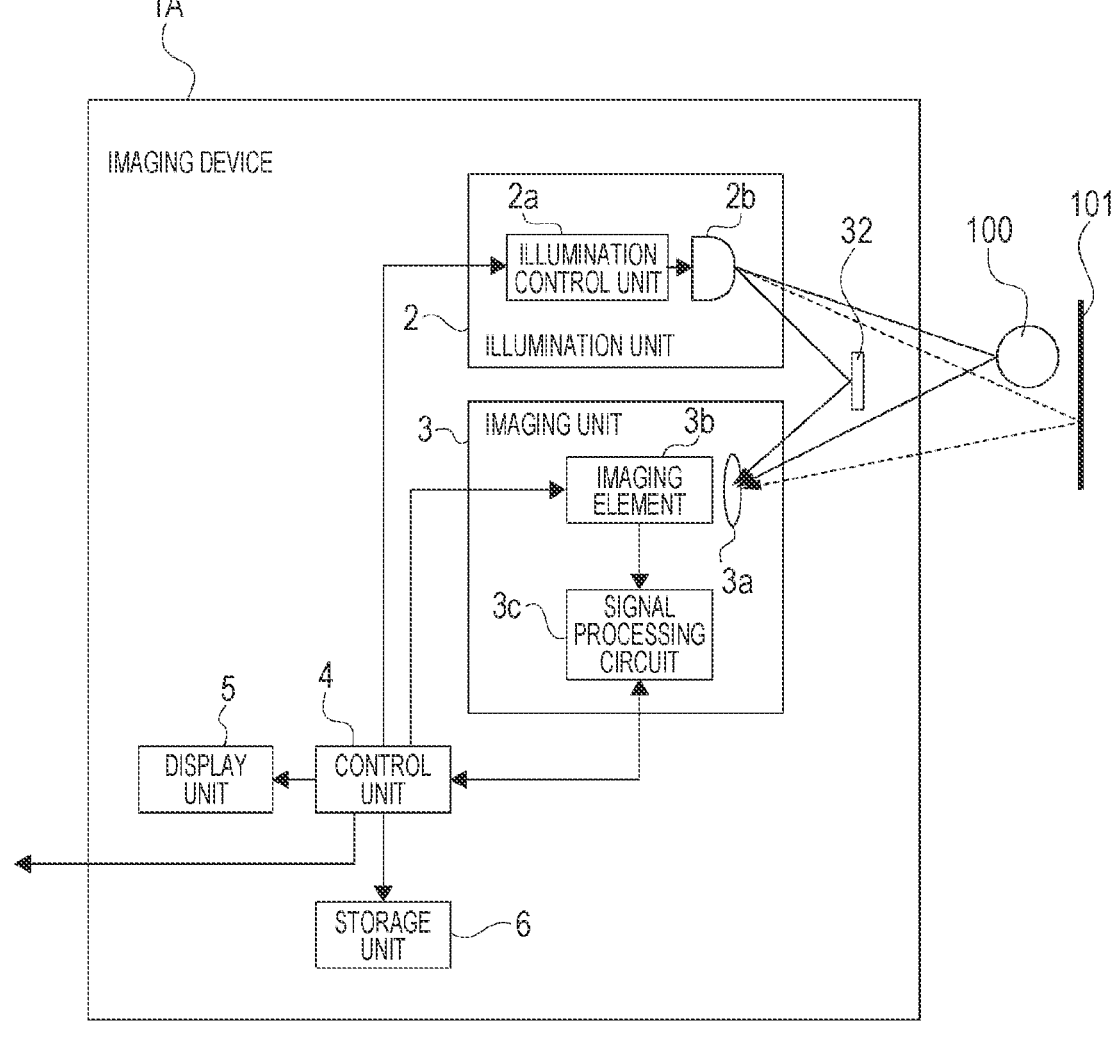
FIG. 18 is a diagram illustrating a system configuration of an imaging device in a second example of the validity determination processing.

In the second example of the validity determination processing, an imaging device 1A includes a light reflection unit 32. A block diagram of the imaging device 1A in this example is illustrated in FIG. 18.

In addition to the illumination unit 2, the imaging unit 3, the control unit 4, the display unit 5, and the storage unit 6, the imaging device 1A includes the light reflection unit 32 that reflects at least a part of the light emitted from the illumination unit 2. The light emitted from the illumination unit 2 and reflected by the light reflection unit 32 enters the imaging element 3b.

Figure 19:
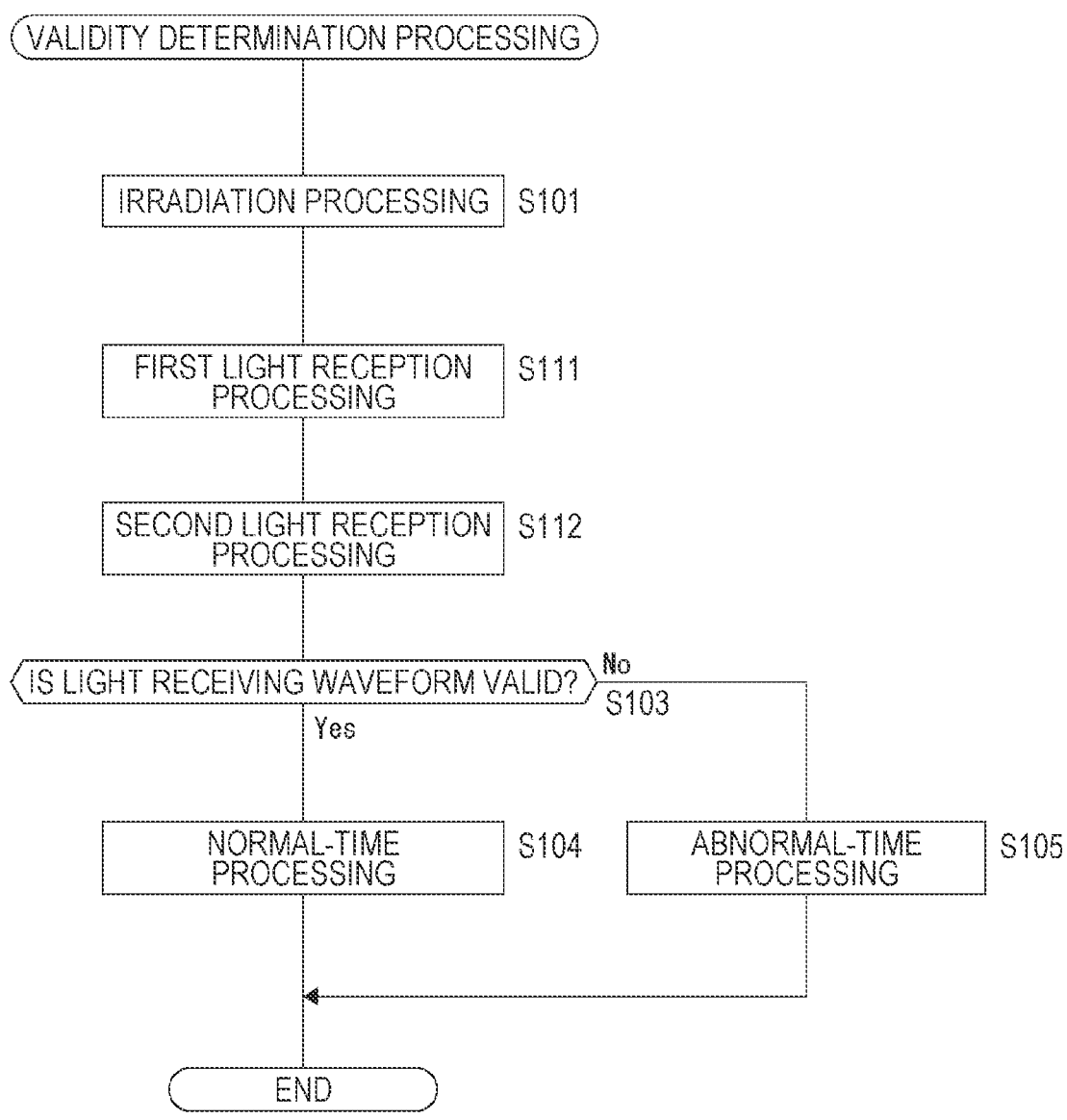
FIG. 19 is a flowchart of the second example of the validity determination processing.

A flowchart of a processing example in this example is illustrated in FIG. 19. Note that processing similar to the processing illustrated in the flowchart in FIG. 12 is denoted with the same reference, and the description thereof will be appropriately omitted.

The control unit 4 executes the irradiation processing in step S101. As a result, the illumination unit 2 emits light.

The light, from the illumination unit 2, reflected via the light reflection unit 32 (hereinafter, described as "internally reflected light") reaches the imaging element 3b earlier than light reflected via the subjects 100 and 101 (hereinafter, described as "externally reflected light").

Therefore, first, light reception processing for the internally reflected light is executed, and then, light reception processing for the externally reflected light is executed.

That is, the control unit 4 acquires a reference condition by executing first light reception processing that is the light reception processing for the internally reflected light in step S111. The reference condition is stored, for example, in the storage unit 6.

Subsequently, the control unit 4 acquires measurement data by executing second light reception processing that is the light reception processing for the externally reflected light in step S112.

The control unit 4 executes the branching processing for determining whether or not a light receiving waveform is valid by comparing the reference condition with the measurement data in step S103.

In a case where it is determined that the light receiving waveform is valid, the control unit 4 executes the normal-time processing in step S104, and in a case where it is determined that the light receiving waveform is not valid, the control unit 4 executes the abnormal-time processing in step S105.

A modification of the second example of the validity determination processing will be described.

In the modification, the irradiation processing is executed twice.

Figure 20:
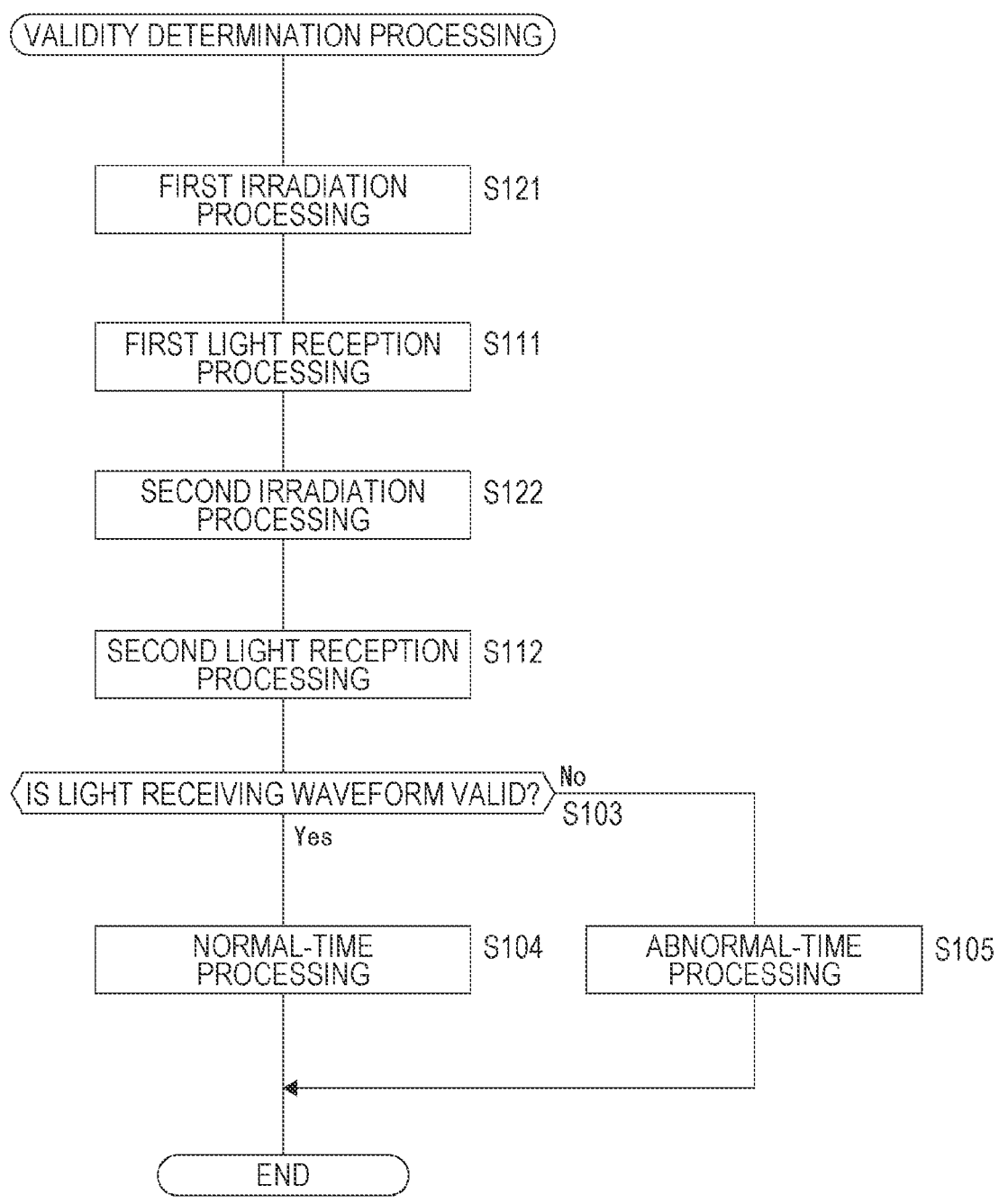
FIG. 20 is a flowchart of a modification of the second example of the validity determination processing.

Specifically, description will be made with reference to the flowchart in FIG. 20.

The control unit 4 executes first irradiation processing in step S121 and executes the first light reception processing in step S111. As a result, the reference condition is acquired and stored.

The control unit 4 executes second irradiation processing in step S122 and executes the second light reception processing in step S112. As a result, the measurement data is acquired.

The control unit 4 executes the branching processing for determining whether or not a light receiving waveform is valid by comparing the reference condition with the measurement data in step S103.

In a case where it is determined that the light receiving waveform is valid, the control unit 4 executes the normal-time processing in step S104, and in a case where it is determined that the light receiving waveform is not valid, the control unit 4 executes the abnormal-time processing in step S105.

By executing the irradiation processing twice, the accuracy of the validity determination processing can be improved. Furthermore, it is possible to reduce erroneous measurement by a cross-talk person and enhance security against a malicious attacker who attempts to invalidly pass through the validity determination processing.

Note that the control unit 4 may execute the first irradiation processing under a first irradiation condition in step S121 and may execute the second irradiation processing, in step S122, under a second irradiation condition that is at least partially different from the first irradiation condition. By varying the irradiation conditions in the first irradiation processing and the second irradiation processing, it is more difficult to imitate the illumination unit 2.

The first irradiation condition and the second irradiation condition are, for example, conditions of which light emission time length, light intensity, or the like differ.

Furthermore, a light guide unit including a light guide path may be included instead of the light reflection unit. A similar effect can be obtained by using the light guide path.

Note that, in the modification, processing may be executed by the imaging device 1 that does not include the light reflection unit 32 or may be executed by the imaging device 1A that includes the light reflection unit 32.

Furthermore, the illumination unit 2 may include a plurality of laser light sources, and a laser light source performs irradiation in the first irradiation processing may be different from a laser light source performs irradiation in the second irradiation processing.

3-4. Third Example of Validity Determination Processing

In a third example of the validity determination processing, validity is determined by irradiating laser light having different optical waveforms.

When a current flowing into the laser light source 2b as a semiconductor laser is gradually increased, light output of the laser light source 2b gradually increases. However, until the light output exceeds a current value at the time of oscillation start, LED light, not the laser light, is emitted. When exceeding the current value at the time of oscillation start when the laser oscillation is started, the light output rapidly increases, and the laser oscillation is started. The output rapidly changes with respect to the current. That is, lower limit values are set for the light output (light intensity) and the operating current.

On the other hand, an upper limit value is set for the light output (light intensity) is provided on the basis of the viewpoint of safety of laser products or the like according to various standards, rules based on operation environments, or the like.

In a case where the laser light source 2b emits light using two or more types of current values within a range between the lower limit value and the upper limit value (that is, a case of first light emission mode and second light emission mode described above), it is possible to confirm the validity of the light receiving waveform on the basis of rising waveforms having different shapes. Therefore, it is possible to further reduce erroneous measurement by a cross-talk person and make it more difficult to duplicate the laser light by a malicious attacker or the like.

Figure 21:
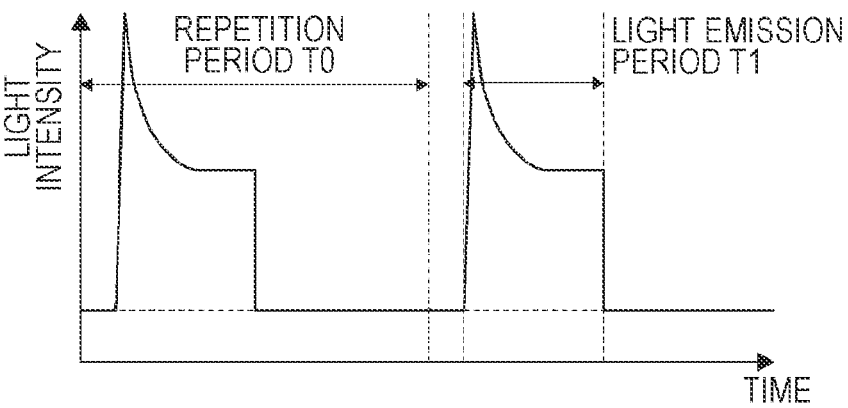
FIG. 21 is a graph illustrating an example of a waveform of light irradiated in a third example of the validity determination processing.
Figure 22:
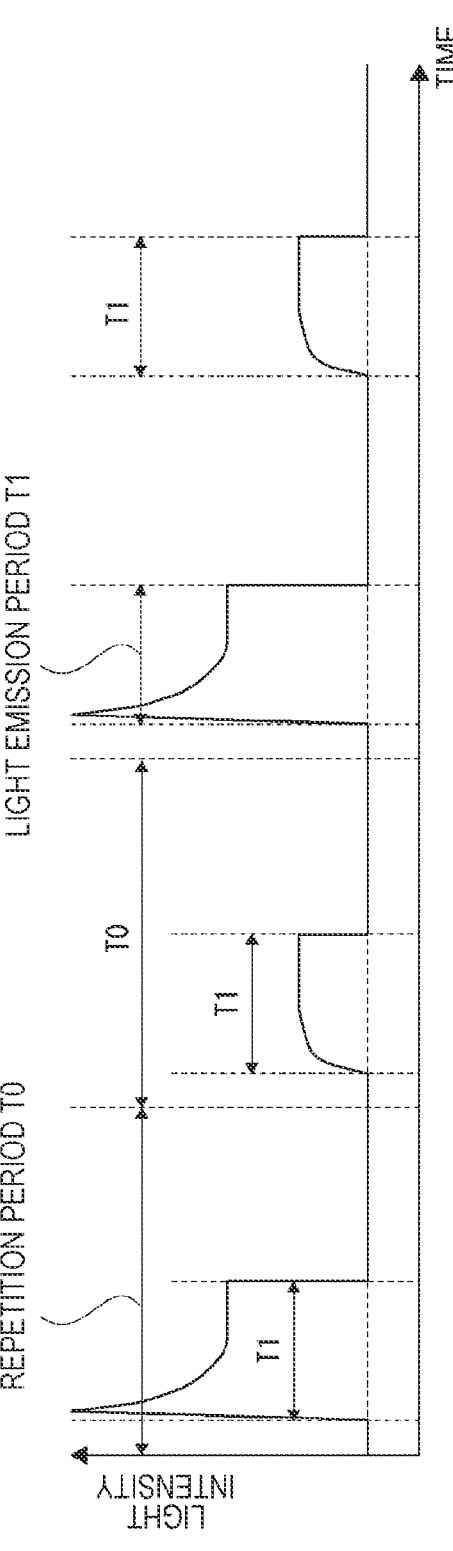
FIG. 22 is a graph illustrating another example of the waveform of the light irradiated in the third example of the validity determination processing.
Figure 23:
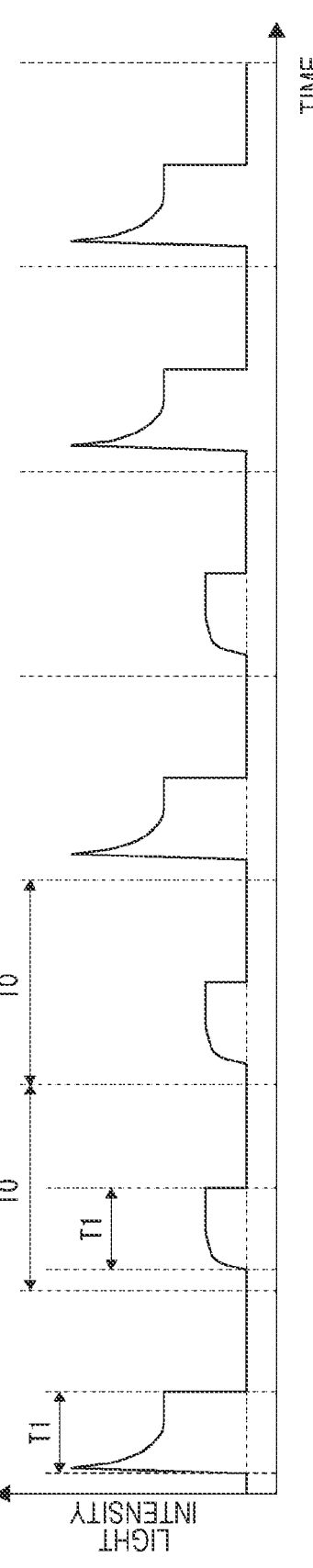
FIG. 23 is a graph illustrating still another example of the waveform of the light irradiated in the third example of the validity determination processing.

An example is illustrated in each of FIGS. 21 to 23.

FIG. 21 illustrates an example of an irradiation waveform in a case where the laser light source 2b performs irradiation a plurality of times according to the first light emission mode. The laser light source 2b performs irradiation at a constant repetition period T0. A time length when the laser light source 2b emits light (light emission period T1) is set to be constant.

FIG. 22 is an example of an irradiation waveform in which the first laser light and the second laser light are repeatedly and alternately irradiated.

The irradiation in the first light emission mode and the irradiation in the second light emission mode are repeated at the repetition period T0. Both of the first light emission mode and the second light emission mode are included in the light emission period T1.

FIG. 23 is an irradiation waveform in a case where the first laser light and the second laser light are irradiated in a random order.

The irradiation in both modes is performed at the constant repetition period T0 and in the light emission period T1.

Note that the light emission period T1 and a non-light emission period (T0–T1) may be modulated or may be set as a random period. Moreover, in addition to the first light emission mode and the second light emission mode, a third light emission mode different from the first light emission mode and the second light emission mode may be used. In the third light emission mode, a current different from the current applied to the laser light source 2b in the first light emission mode and the current applied to the laser light source 2b in the second light emission mode is applied to the laser light source 2b.

In addition, the laser light source 2b may perform irradiation by setting the current applied to the laser light source 2b to a random value within the above range, without setting the current applied to the laser light source 2b to a predetermined value as in the first light emission mode and the second light emission mode.

With such various modes, it is possible to make it more difficult to duplicate the laser light.

Note that, regarding switching between the first laser light and the second laser light, it is sufficient that the irradiation signal described above include a first irradiation signal (first irradiation code) and a second irradiation signal (second irradiation code).

Figure 24:
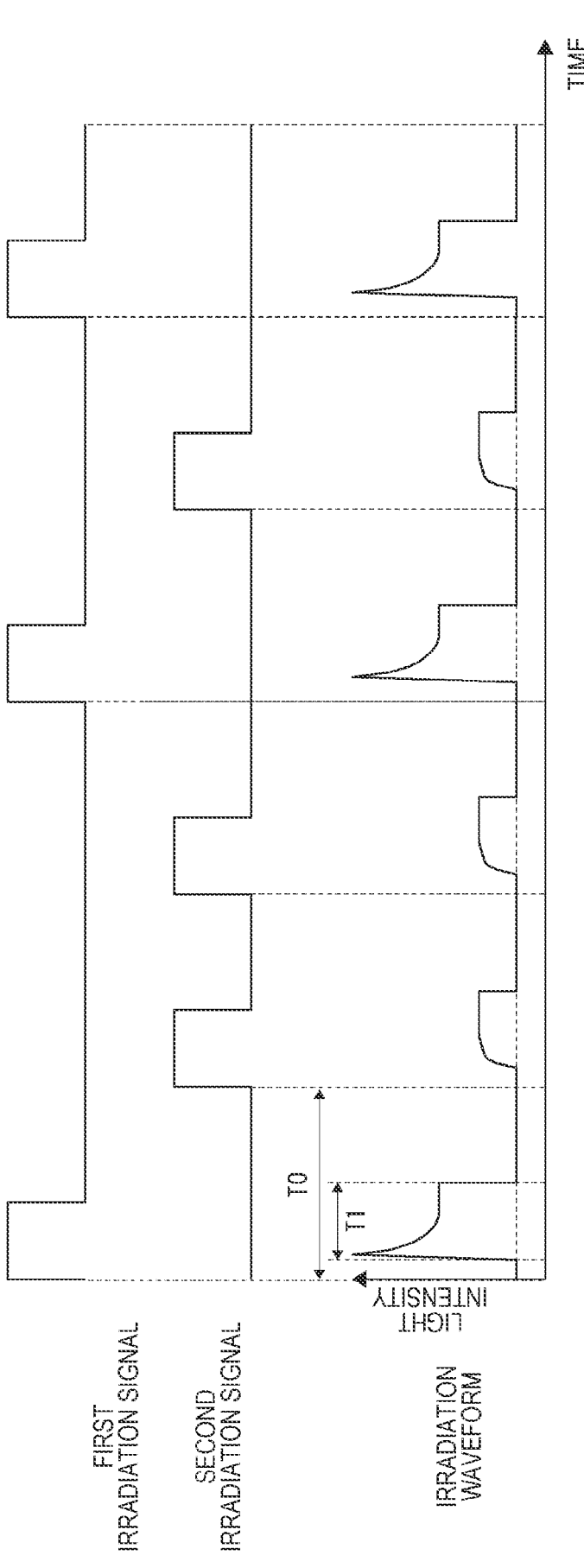
FIG. 24 is a diagram illustrating an example of an irradiation signal and an irradiation waveform in the third example of the validity determination processing.

FIG. 24 illustrates examples of the first irradiation signal and the second irradiation signal and irradiation waveforms of the first laser light and the second laser light emitted in response to the signals.

In a case where the light emitted from the laser light source 2b is switched between the first laser light and the second laser light, for example, it is sufficient for the imaging device 1 to include a switching unit. Furthermore, the switching unit may be provided in the illumination unit 2 or the illumination control unit 2a.

3-5. Fourth Example of Validity Determination Processing

A fourth example of the validity determination processing is an example in which the unit pixel 16 of the imaging element 3b includes four or more charge accumulation units (FD). Specifically, description will be made with reference to FIG. 25.

Figure 25:
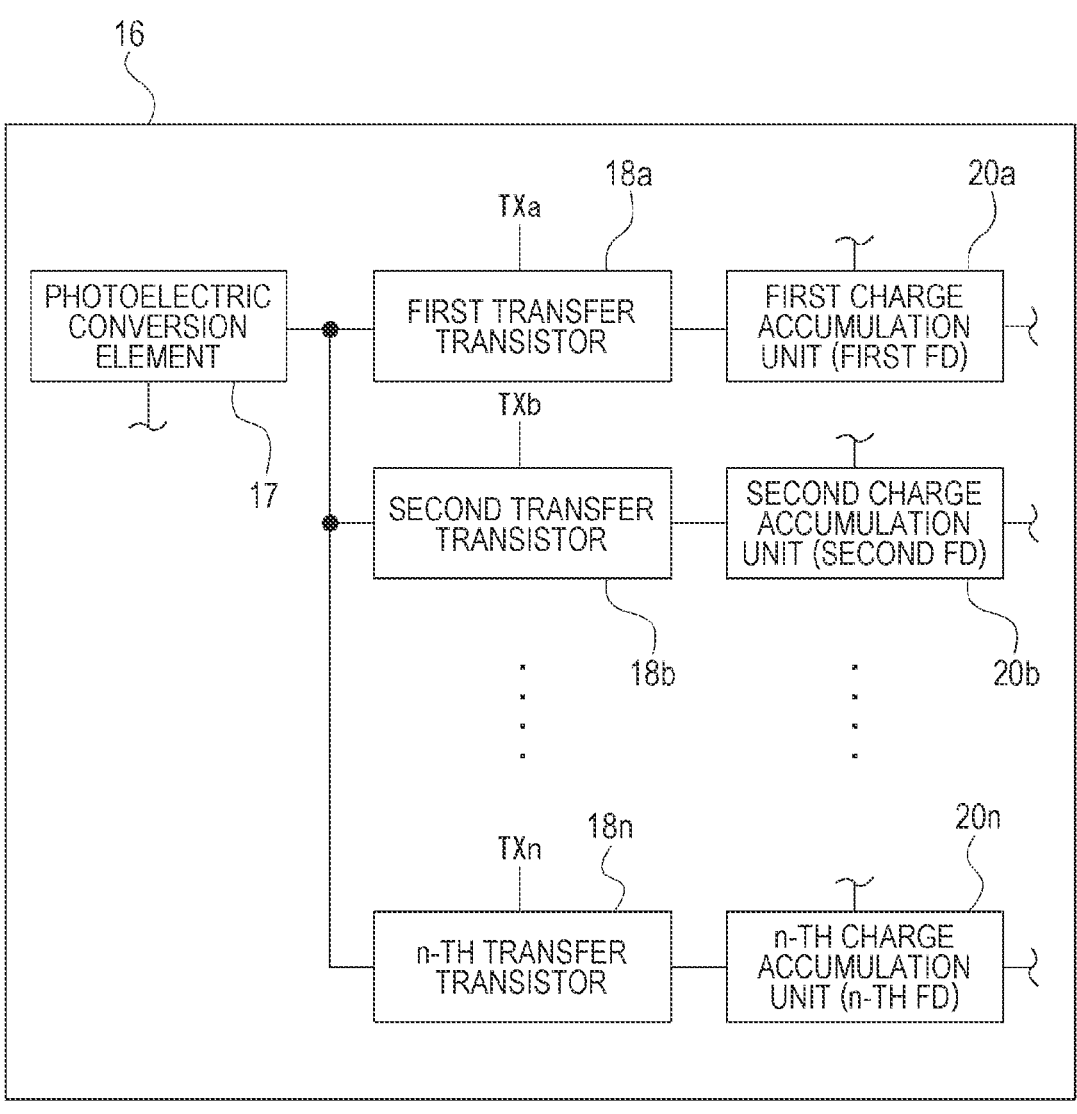
FIG. 25 is a schematic block diagram in a fourth example of the validity determination processing.

FIG. 25 is a diagram illustrating some of units excerpted from the units included in the unit pixel 16.

As illustrated, each photoelectric conversion element 17 included in the unit pixel 16 is connected to a first transfer transistor 18a, a second transfer transistor 18b, . . . , and an n-th transfer transistor 18n.

Each transfer transistor 18 is connected to the FD 20. Specifically, the first transfer transistor 18a is connected to a first FD 20a, and the second transfer transistor 18b is connected to a second FD 20b. Similarly, the n-th transfer transistor 18n is connected to an n-th FD 20n.

In each FD 20, charges generated by the photoelectric conversion element 17 are accumulated in a corresponding charge accumulation period. The charge accumulation period corresponding to each FD 20 is set so as not to overlap.

Figure 26:
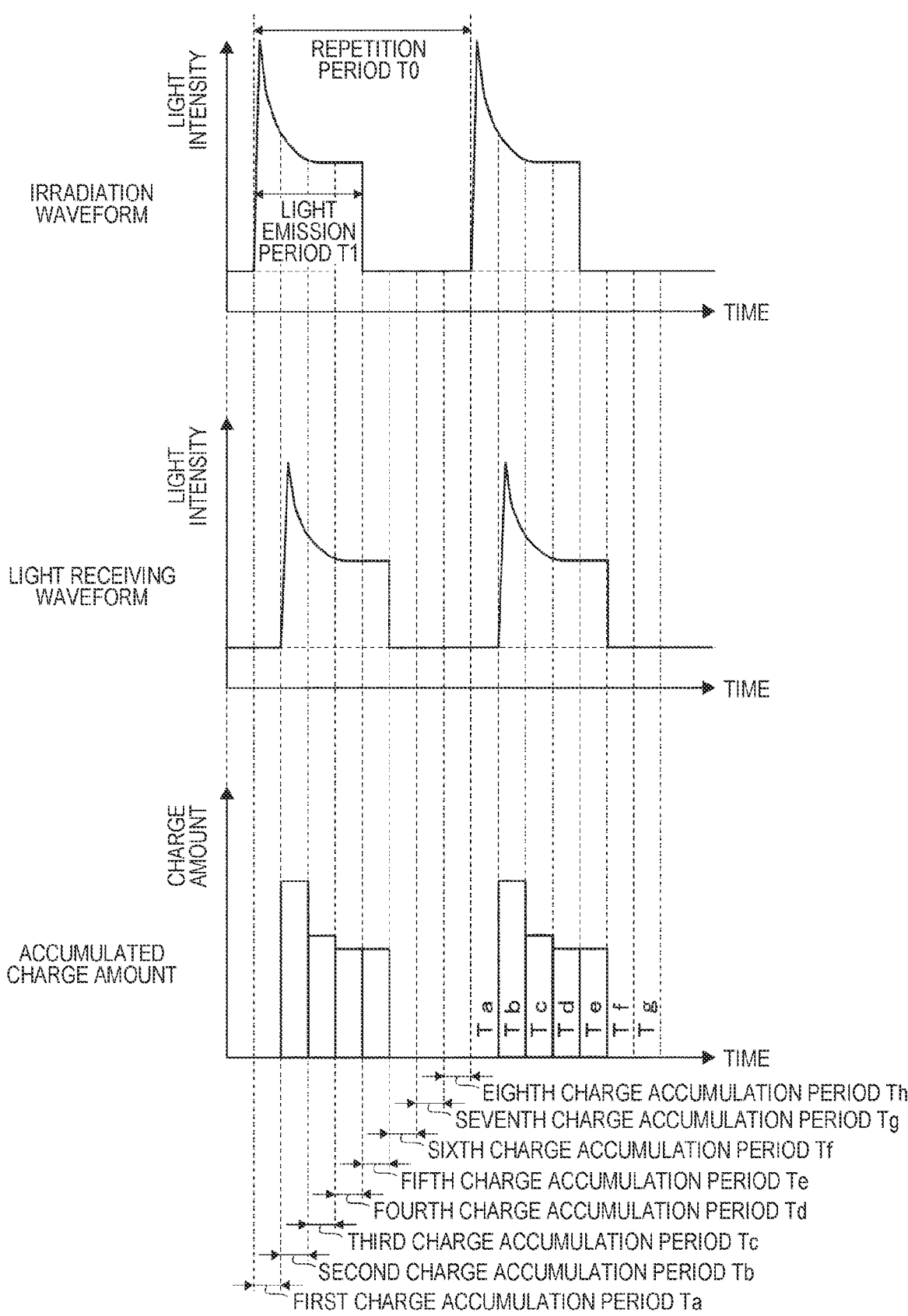
FIG. 26 is a diagram illustrating a relationship between an irradiation waveform, a light receiving waveform, and an accumulated charge amount in the fourth example of the validity determination processing.

FIG. 26 is a diagram illustrating a charge amount accumulated in each charge accumulation period in a case where a single unit pixel 16 includes eight FDs 20 so as to grasp a feature amount of a light receiving waveform.

As illustrated, the repetition period T0 is divided into eight periods from a first charge accumulation period Ta to an eighth charge accumulation period Th. The charge accumulation periods are set to be periods having an equal length.

The first charge accumulation period Ta is started simultaneously with the light emission of the laser light source 2b. In the illustrated example, in the first charge accumulation period Ta, the light emitted from the laser light source 2b does not reach the imaging element 3b yet and light intensity of the received light is set to be zero. Furthermore, the second charge accumulation period Tb to the fifth charge accumulation period Te are included in a period (light reception period T2) in which the light emitted from the laser light source 2b is received.

As illustrated in FIGS. 25 and 26, in a case where the photoelectric conversion element 17 is connected to the plurality of FDs 20, it is possible to grasp the feature amount of the rising waveform of the light receiving waveform.

Note that, in order to measure a charge amount of light received in each of a first half and a second half portions in the light emission period T1 that has a half time length of the repetition period T0, it is necessary to set a period obtained by dividing the repetition period T0 into four periods as a charge accumulation period. That is, it is preferable that the photoelectric conversion element 17 be connected to four FDs 20 (first FD 20a, second FD 20b, third FD 20c, and fourth FD 20d).

Note that, although the charge accumulation periods are equal to each other, the charge accumulation periods may be unequal.

By connecting more FDs 20 to the photoelectric conversion element 17, it is possible to extract the feature amount of the light receiving waveform in more detail.

Figure 27:
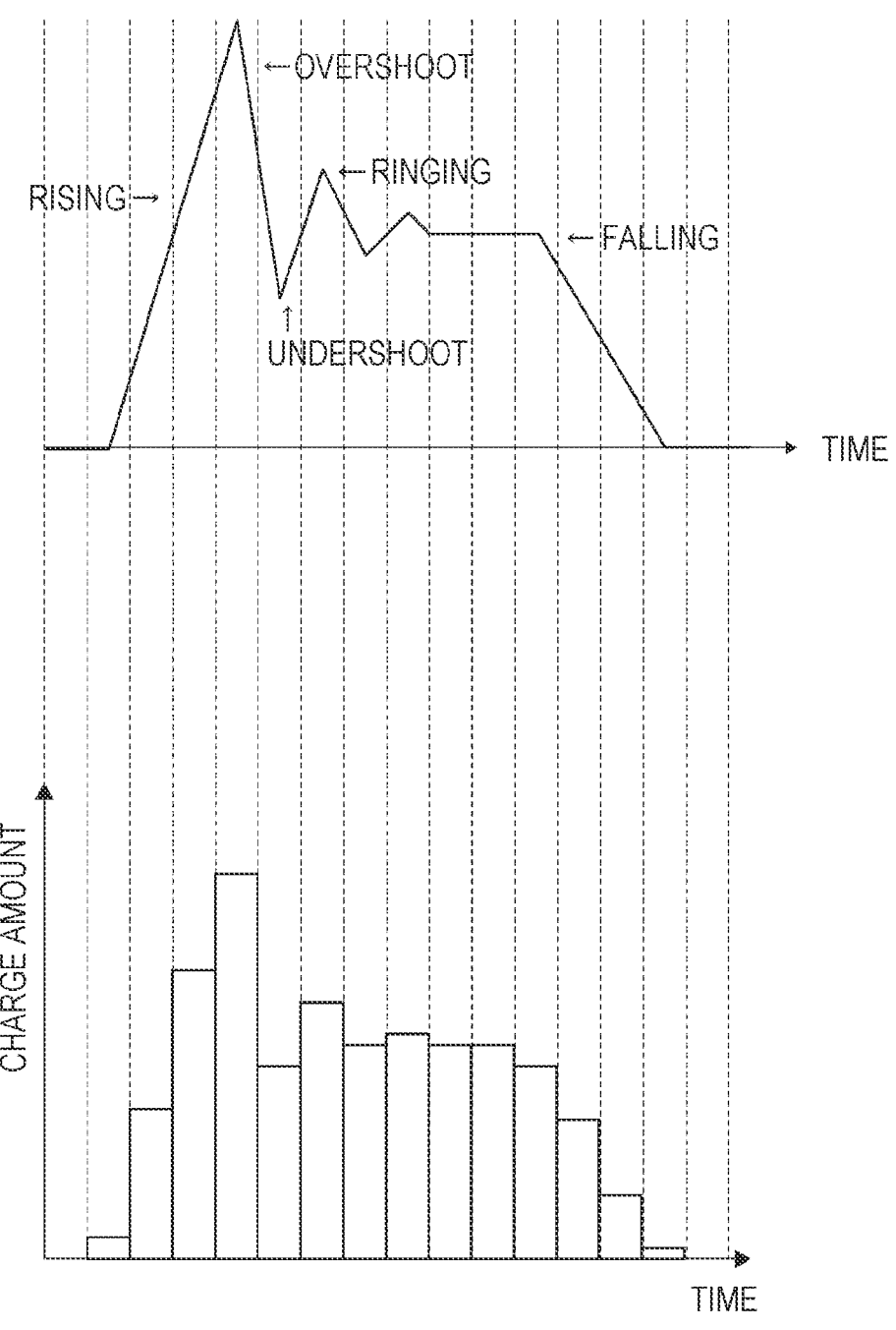
FIG. 27 is a diagram illustrating an example of a light receiving waveform and a charge accumulation amount.

An example of the light receiving waveform and the charge amount accumulated in each charge accumulation period is illustrated in FIG. 27.

There is a case where the irradiation waveform of the laser light source 2b includes overshoot, undershoot, ringing, or the like in addition to a rising shape and a falling shape. In such a case, by connecting more FDs 20 to the photoelectric conversion element 17 as illustrated, it is possible to grasp a feature of a waveform.

Figure 28:
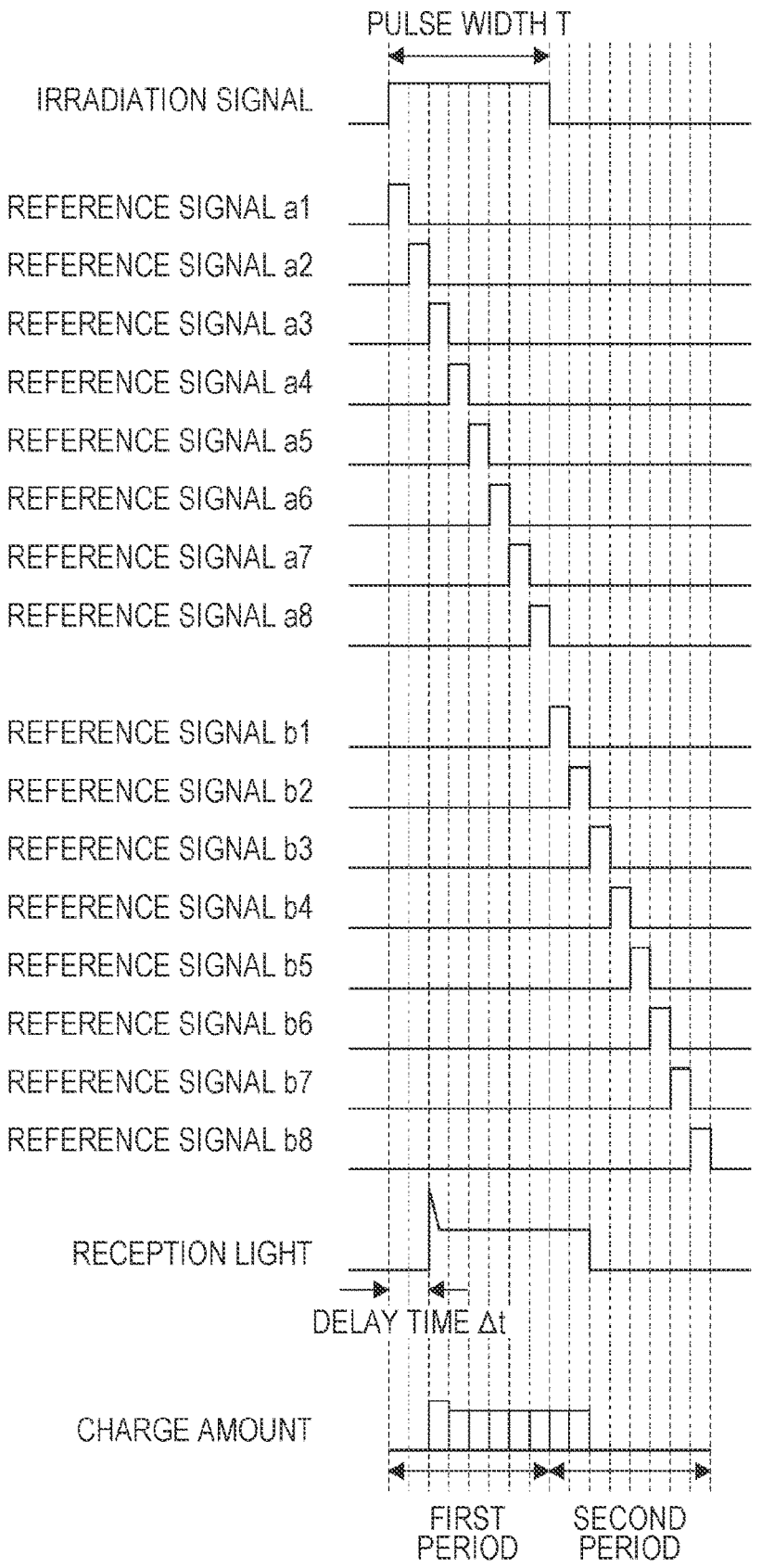
FIG. 28 is a diagram illustrating a relationship between an irradiation signal, a reference signal, and a charge amount in each charge accumulation period in the fourth example of the validity determination processing.

A method for generating a distance image with the configuration in this example will be described. FIG. 28 is a diagram illustrating a relationship between an irradiation signal, a reference signal, and a charge amount in each charge accumulation period. The example illustrated in FIG. 28 has a configuration in which the photoelectric conversion element 17 is connected to 16 FDs 20.

As illustrated, a timing of rising of the irradiation signal matches a timing of rising of a reference signal a1. At the same time as the falling of the reference signal a1, a reference signal a2 rises. In this way, pulses of the reference signal a1 to a reference signal a8 are generated. By selecting the charge accumulation unit corresponding to each reference signal, the charges generated by the photoelectric conversion element 17 are accumulated in a pulse output period.

At the same time as the falling of the reference signal a8, a reference signal b1 rises. Subsequent to the reference signal b1, pulses of a reference signal b2 to a reference signal b8 are generated so as not to overlap.

A period from the rising of the reference signal a1 to the falling of the reference signal a8 (first period) is substantially the same period as the pulse width T. Furthermore, a period length of a period from the rising of the reference signal b1 to the falling of the reference signal b8 (second period) is substantially the same as a period length of the pulse width T.

Because the light emitted from the laser light source 2b reaches the imaging element 3b as the reflected light from the subject, a delay time Δt is generated from the rising of the irradiation signal to start of light reception. Therefore, a light receiving operation of the imaging element 3b may be performed in both of the first period and the second period.

In a case where the reflected light is received over the first period and the second period, it is possible to measure the distance to the subject.

The pixel signal Sa described above is proportional to a sum Qa of the charge amount accumulated in each FD 20 in the first period. Furthermore, the pixel signal Sb is proportional to a sum Qb of the charge amount accumulated in each FD 20 in the second period. That is, the distance to the subject can be calculated using a value calculated by Qb/(Qa+Qb).

Note that it is possible to calculate the distance to the subject without using the sum Qa and the sum Qb. For example, the distance may be calculated using a charge amount obtained by correcting a charge amount in at least a part of the first period (for example, charge amount of rising portion) and a charge amount in at least a part of the second period (for example, charge amount of falling portion) on the basis of a charge amount in a period other than the first period and the second period. There is a case where a calculation error regarding the distance can be corrected using such calculation.

3-6. Fifth Example of Validity Determination Processing

A fifth example of the validity determination processing is an example in which a light emission period varies for each irradiation of the laser light source 2b.

Figure 29:
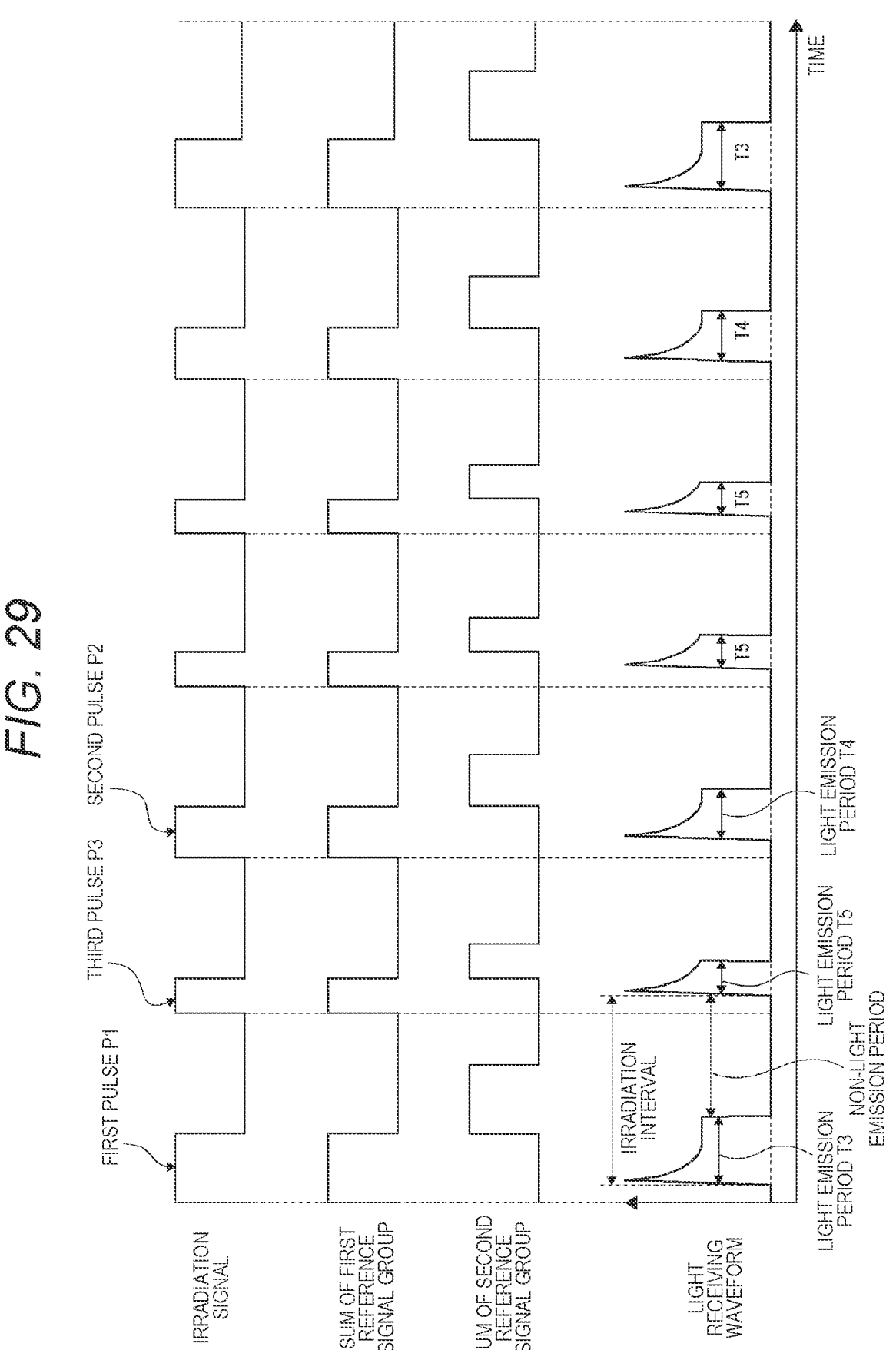
FIG. 29 is a diagram illustrating a relationship between an irradiation signal and a reference signal in a fifth example of the validity determination processing.

A specific example is illustrated in FIG. 29.

In this example, the irradiation signal includes three types of pulses having different pulse widths. Specifically, the irradiation signal includes a first pulse P1 of which a pulse width is "large", a second pulse P2 of which a pulse width is "medium", and a third pulse P3 of which a pulse width is "small".

A light emission period based on the first pulse P1 is set as a light emission period T3. A light emission period based on the second pulse P2 is set as a light emission period T4. A light emission period based on the third pulse P3 is set as a light emission period T5.

A first reference signal group A obtained by adding the first reference signals a respectively corresponding to the pulses in the irradiation signal is a signal substantially the same as the irradiation signal.

Furthermore, a second reference signal group B obtained by adding the second reference signals b respectively corresponding to the pulses in the irradiation signal includes a pulse that is adjacent to each pulse in the first reference signal group A in terms of time.

Time lengths between the pulses in the irradiation signal, that is, the non-light emission periods have the same period length. As a result, an irradiation interval of the laser light source 2b that is the time length from rising of a pulse to rising of a next pulse is not constant.

By making the light emission period of the laser light source 2b be different for each irradiation, it is necessary to calculate the distance according to the light emission period. However, even if the irradiation waveform and the rising waveform of the light receiving waveform are not compared with each other, it is possible to determine the validity of the laser light source 2b using only the light emission period, and therefore, processing can be simplified.

Note that, by performing both of the comparison between the irradiation waveform with the rising waveform of the light receiving waveform and the comparison of the lengths of the light emission periods, it is possible to make it more difficult to imitate the laser light.

Note that, by repeating the reference signals illustrated in FIG. 29 a plurality of times, the imitation of the laser light may be sophisticated while suppressing an increase in an information amount necessary for the generation of the reference signal.

3-7. Sixth Example of Validity Determination Processing

In a sixth example of the validity determination processing, a non-light emission period that is a period from falling of an irradiation pulse of the laser light source 2b to rising of a next irradiation pulse is randomly determined.

Figure 30:
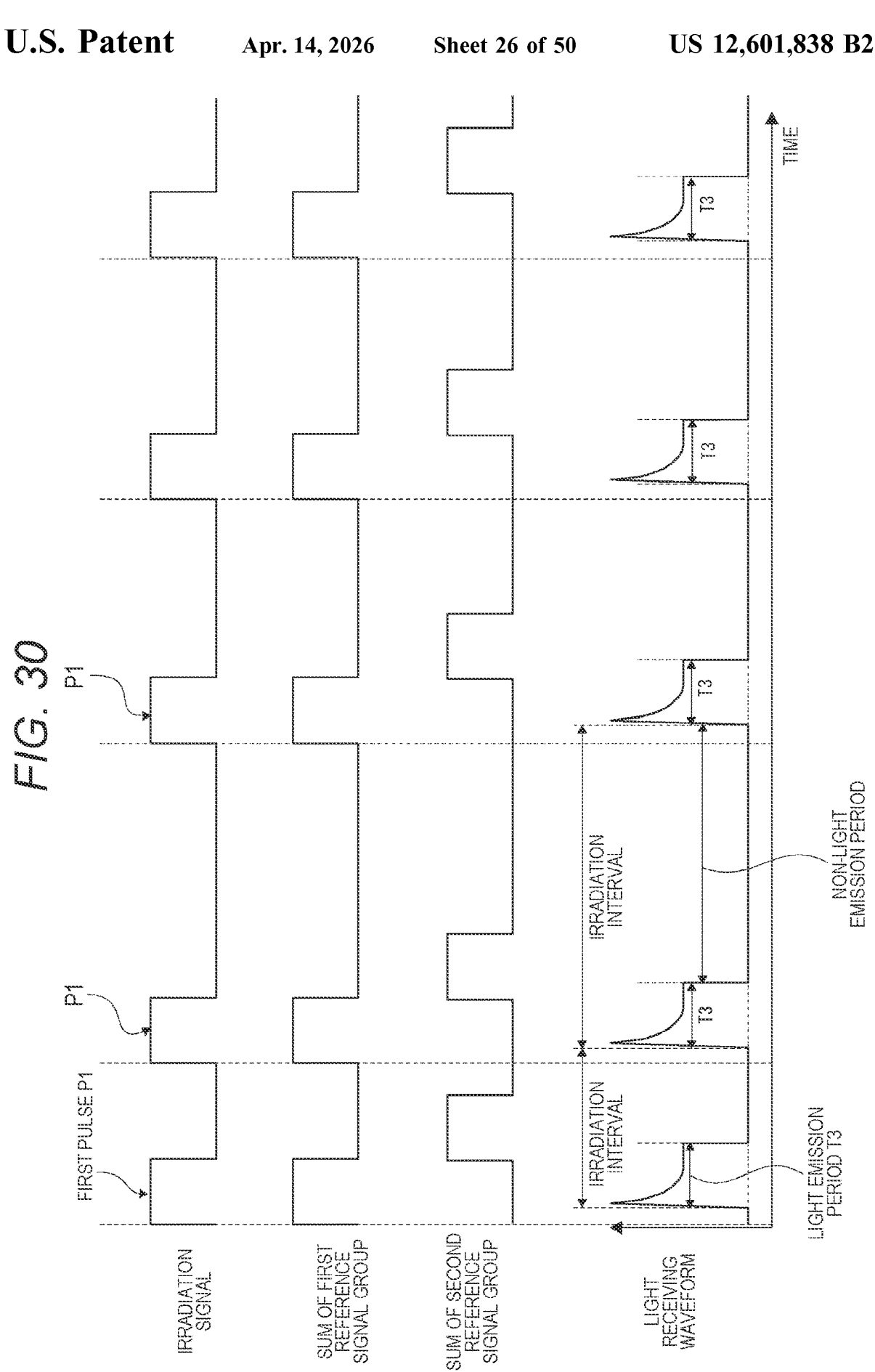
FIG. 30 is a diagram illustrating a relationship between an irradiation signal and a reference signal in a sixth example of the validity determination processing.

Specifically, description will be made with reference to FIG. 30.

A pulse width of one pulse in the irradiation signal is the same. Accordingly, each light emission period has the same time length.

Furthermore, periods between the pulses are different from each other. Accordingly, the non-light emission periods are not the same.

Therefore, the irradiation interval is not constant.

Because a calculation formula used for distance measurement is set to be the same by setting a constant light emission period, processing can be simplified.

Furthermore, by making the non-light emission period of the laser light source 2b be different for each irradiation, even if the irradiation waveform and the rising waveform of the light receiving waveform are not compared with each other, it is possible to determine the validity of the laser light source 2b using only the non-light emission period, and therefore, processing can be simplified.

Note that, by performing both of the comparison between the irradiation waveform with the rising waveform of the light receiving waveform and the comparison of the lengths of the non-light emission periods, it is possible to make it more difficult to imitate the laser light.

Figure 31:
FIG. 31 is a diagram illustrating a relationship between an irradiation signal and a reference signal in a modification of the sixth example of the validity determination processing.

As a modification of the sixth example of the validity determination processing, an example will be described with reference to FIG. 31 in which both of the light emission period and the non-light emission period are variable while setting the irradiation interval to be constant.

As illustrated, in this modification, the irradiation interval is constant. Therefore, ratios of the light emission period and the non-light emission period indicated in the irradiation interval are variable for each irradiation.

Even in such a mode, it is possible to make it difficult to imitate the laser light.

Note that, by detecting the ratios of the light emission period and the non-light emission period in terms of time, it is possible to determine the validity of the laser light source 2b without comparing the irradiation waveform with the rising waveform of the light receiving waveform. Moreover, by comparing the irradiation waveform with the rising waveform of the light receiving waveform, it is possible to make it more difficult to imitate the laser light.

3-8. Seventh Example of Validity Determination Processing

In a seventh example of the validity determination processing, the unit pixel 16 of the imaging element 3b includes a first unit pixel 16A and a second unit pixel 16B. Specific description will be made.

As illustrated in FIG. 25, the first unit pixel 16A includes one first photoelectric conversion element 17A and four or more FDs 20.

Figure 4:
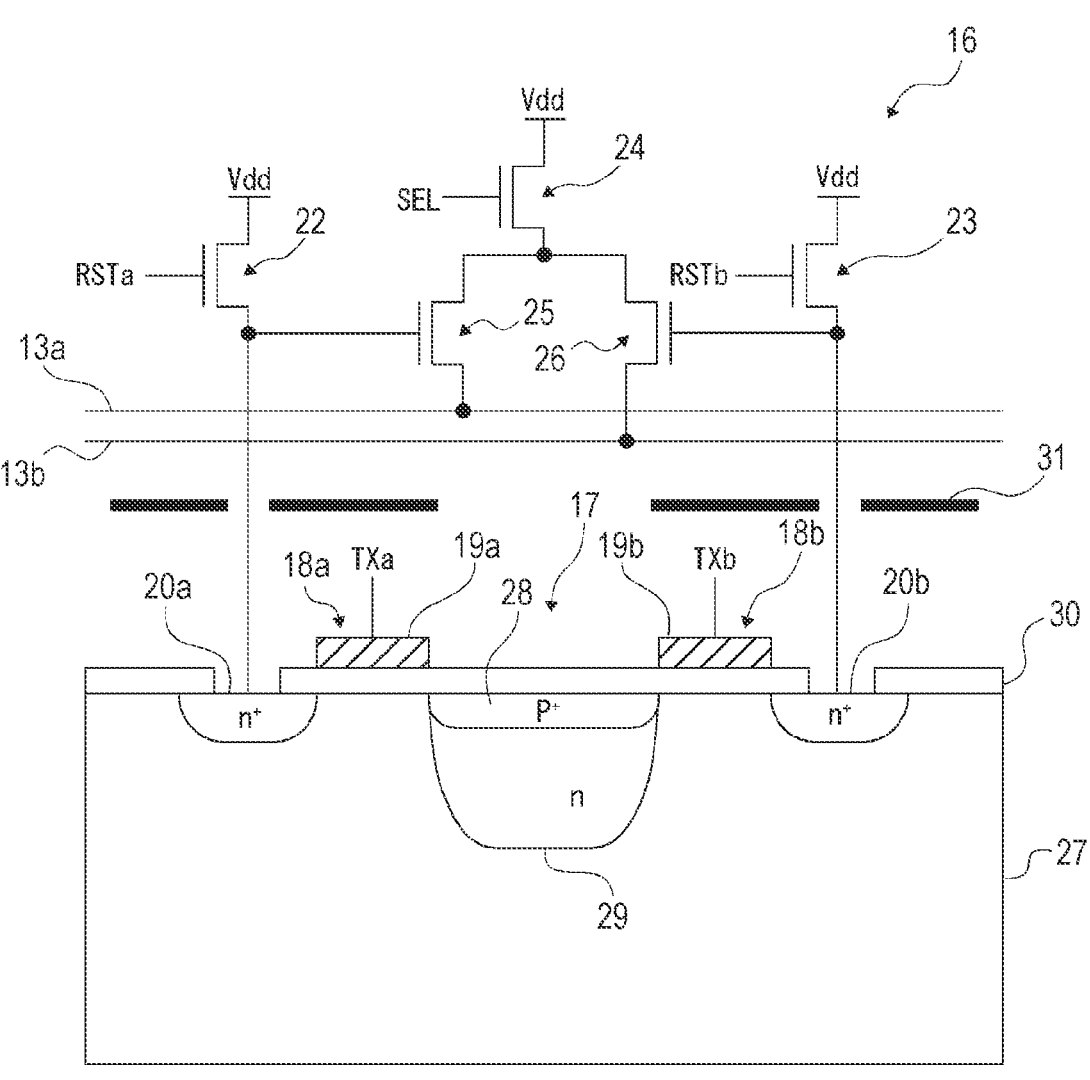
FIG. 4 is a schematic diagram illustrating a configuration example of the unit pixel.

As illustrated in FIGS. 3 and 4, the second unit pixel 16B includes one second photoelectric conversion element 17B and two FDs 20.

The number of first unit pixels 16A including the first photoelectric conversion elements 17A is set to be smaller than the number of second unit pixels 16B including the second photoelectric conversion elements 17B.

As a result, the number of FDs 20 included in the imaging element 3b is reduced, and this reduces cost and reduces the size of the imaging element 3b.

Figure 32:
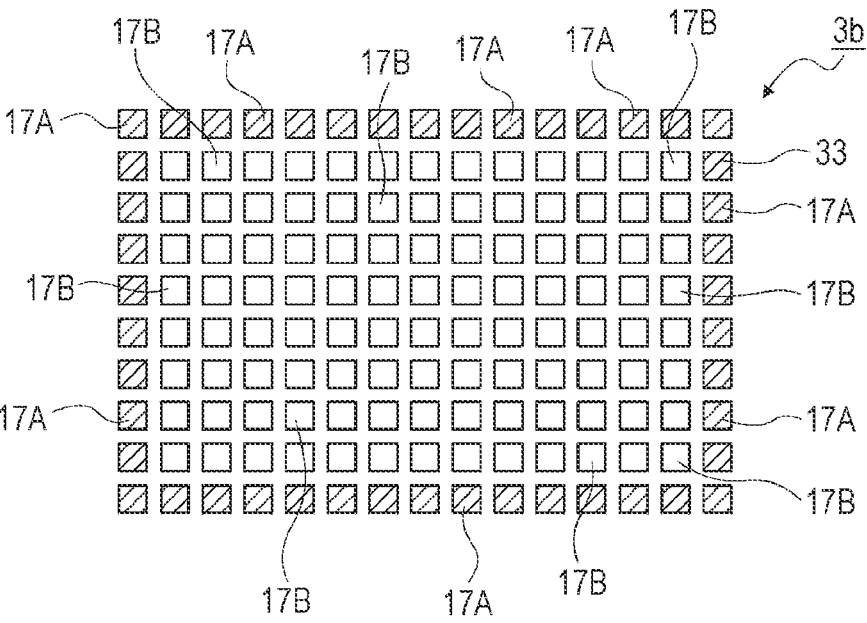
FIG. 32 is a diagram illustrating an arrangement example of first photoelectric conversion elements and second photoelectric conversion elements in a seventh example of the validity determination processing.
Figure 33:
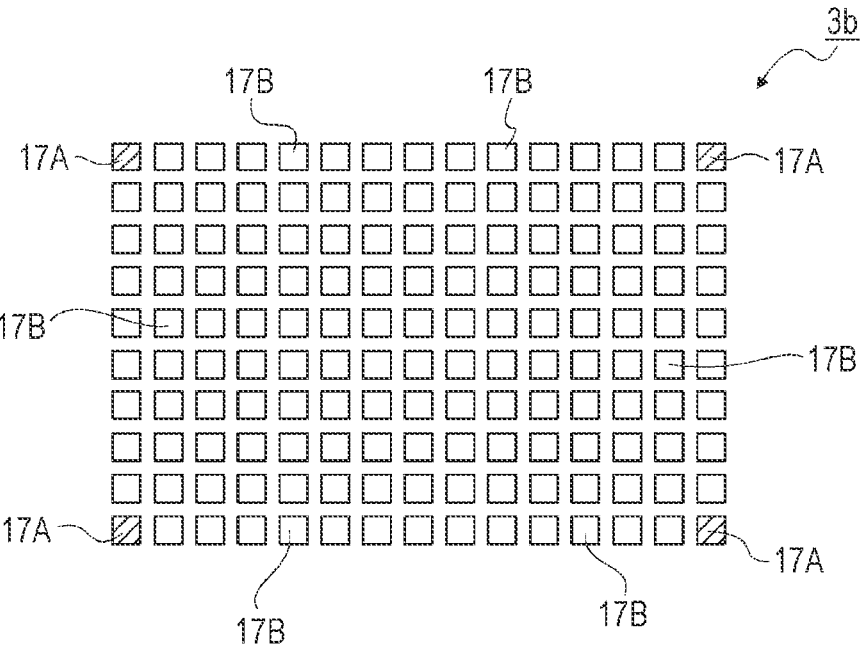
FIG. 33 is a diagram illustrating another arrangement example of the first photoelectric conversion elements and second photoelectric conversion elements in the seventh example of the validity determination processing.

Arrangement examples of the first photoelectric conversion elements 17A and the second photoelectric conversion elements 17B are illustrated in FIGS. 32 and 33.

The example illustrated in FIG. 32 is an example in which the first photoelectric conversion elements 17A are arranged in an outer edge portion 33 of the imaging element 3b and the second photoelectric conversion elements 17B are arranged on the inner side. That is, the first photoelectric conversion elements 17A are arranged only in the outermost portion.

As a result, the number of first photoelectric conversion elements 17A can be reduced. Therefore, the number of FDs 20 can be significantly reduced than a case where the first photoelectric conversion elements 17A are arranged in all the photoelectric conversion elements 17.

The example illustrated in FIG. 33 is an example in which the first photoelectric conversion elements 17A are arranged at four corners of the imaging element 3b and the second photoelectric conversion elements 17B are arranged in a portion other than the four corners.

As a result, because the number of first photoelectric conversion elements 17A can be further reduced, and the number of FDs 20 can be more significantly reduced.

Note that the examples illustrated in FIGS. 32 and 33 are merely examples. As long as at least one first photoelectric conversion element 17A is arranged, various types of validity determination processing described above can be executed.

Because the other photoelectric conversion elements 17 are used as photoelectric conversion elements 17 for distance measurement, it is sufficient to arrange the second photoelectric conversion element 17B to which the smaller number of FDs 20 are connected.

Furthermore, as illustrated in FIGS. 32 and 33, by arranging more second photoelectric conversion elements 17B than the first photoelectric conversion elements 17A, it is possible to contribute to cost reduction.

Moreover, by arranging the first photoelectric conversion elements 17A in the outer edge portion 33 of the imaging element 3b, it is possible to densely arrange the second photoelectric conversion elements 17B that are the photoelectric conversion elements 17 for distance measurement in a center portion. Therefore, a distance measurement function and a validity determination function can be realized without increasing the size of the imaging element 3b. Note that the configuration in which the second unit pixel 16B includes the single second photoelectric conversion element 17B and the two FDs 20 has been described. However, the second unit pixel 16B may include the single second photoelectric conversion element 17B and three or more (for example, four or eight) FDs 20.

3-9. Eighth Example of Validity Determination Processing

In a tenth example of the validity determination processing, the validity is determined, and distance measurement processing is executed.

Specifically, description will be made with reference to the attached drawings.

Figure 34:
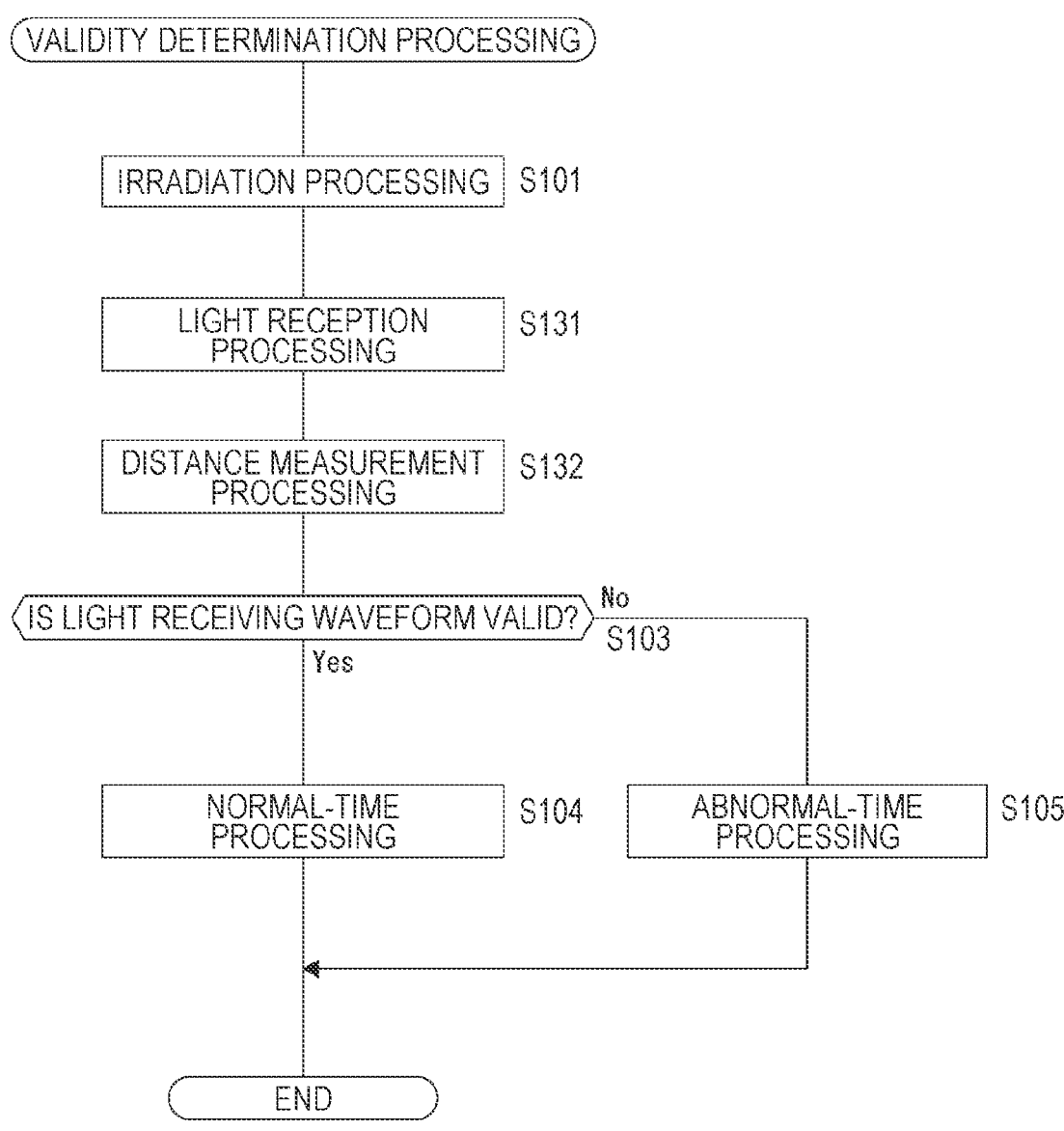
FIG. 34 is a flowchart of a first example of an eighth example of the validity determination processing.

FIG. 34 is a first example of an eighth example of the validity determination processing. In this example, the distance measurement processing and the validity determination processing are executed on the basis of one light reception processing. Note that processing similar to the processing illustrated in the flowchart in FIG. 12 is denoted with the same reference, and the description thereof will be appropriately omitted.

The control unit 4 executes the irradiation processing in step S101. As a result, the illumination unit 2 emits light.

The control unit 4 executes the light reception processing in step S131. In the light reception processing, data for distance measurement is acquired on the basis of the charge amount converted by the second photoelectric conversion element 17B. Furthermore, data used for validity determination is acquired on the basis of the charge amount converted by the first photoelectric conversion element 17A.

The control unit 4 executes the distance measurement processing and generates a distance image in step S132. That is, distance measurement using the pixel signals Sa and Sb is performed for each pixel. Note that, as described above, distance measurement using the first photoelectric conversion element 17A may be also performed. That is, distance measurement may be performed using the sum Qa of the charge amount accumulated in each FD 20 in the first period and the sum Qb of the charge amount accumulated in each FD 20 in the second period. As a result, for example, even in a case where the photoelectric conversion elements 17 are arranged as in FIG. 32, distance measurement can be performed for all the pixels of the imaging element 3b.

The control unit 4 determines whether or not the light receiving waveform is valid in step S103.

In a case where it is determined that the light receiving waveform is valid, the control unit 4 executes the normal-time processing in step S104, and in a case where it is determined that the light receiving waveform is not valid, the control unit 4 executes the abnormal-time processing in step S105.

Figure 35:
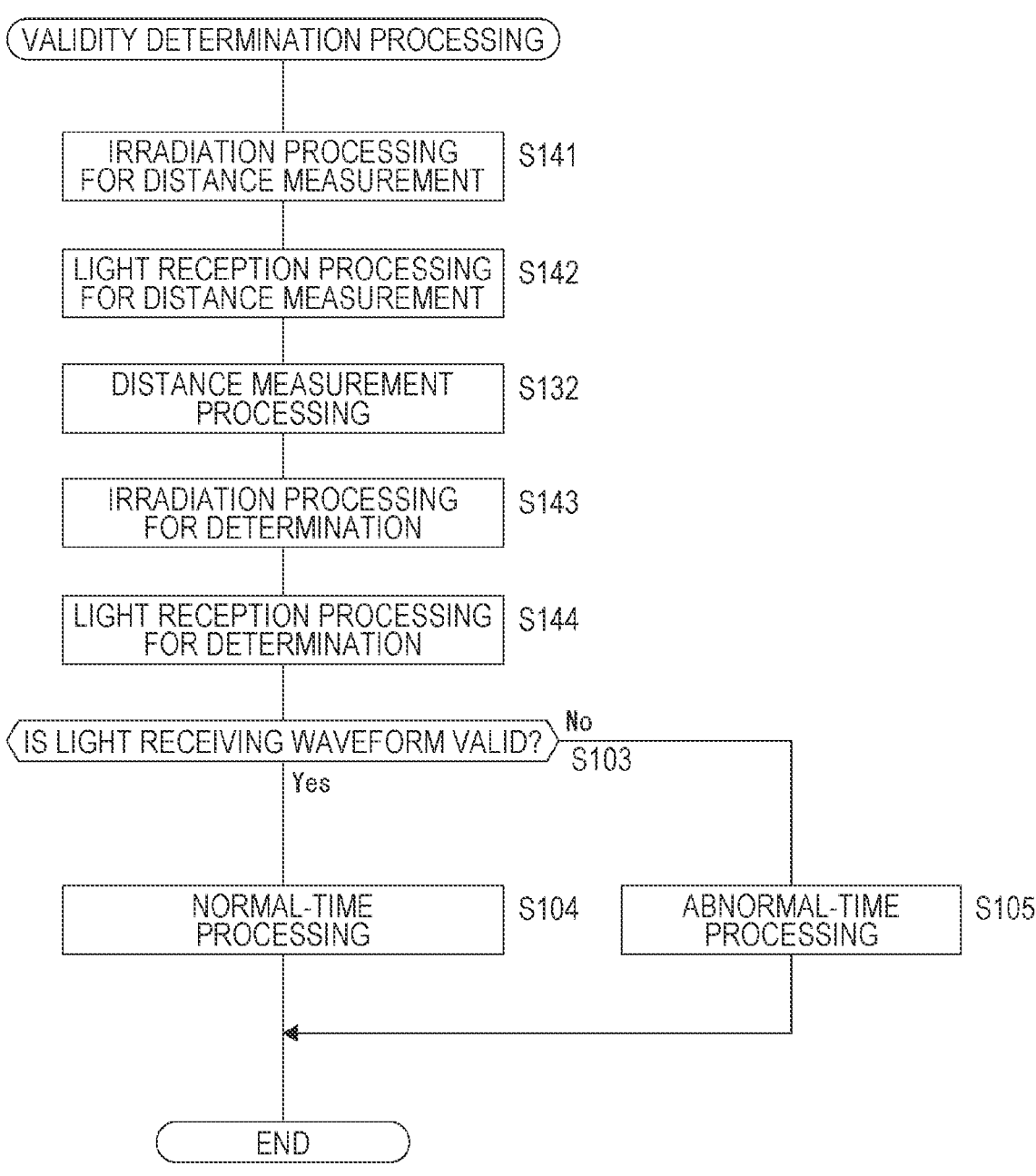
FIG. 35 is a flowchart of a second example of the eighth example of the validity determination processing.

FIG. 35 is a second example of the eighth example of the validity determination processing. In this example, the irradiation processing and the light reception processing are executed twice. Note that processing similar to the processing illustrated in the flowchart in FIG. 12 is denoted with the same reference, and the description thereof will be appropriately omitted.

The control unit 4 executes irradiation processing for distance measurement for performing irradiation for distance measurement in step S141 and executes light reception processing for distance measurement in step S142. As a result, data for distance measurement is acquired on the basis of the charge amount converted by the second photoelectric conversion element 17B.

The control unit 4 executes the distance measurement processing and generates a distance image in step S132.

The control unit 4 executes irradiation processing for determination in order to acquire information used for the validity determination processing in step S143 and executes light reception processing for determination in step S144. As a result, data used for validity determination is acquired.

The control unit 4 determines whether or not the light receiving waveform is valid in step S103.

In a case where it is determined that the light receiving waveform is valid, the control unit 4 executes the normal-time processing in step S104, and in a case where it is determined that the light receiving waveform is not valid, the control unit 4 executes the abnormal-time processing in step S105.

In this example, the first photoelectric conversion element 17A may be configured to generate only data used for the validity determination or may be configured to generate the data used for the validity determination and the data for distance measurement.

Figure 36:
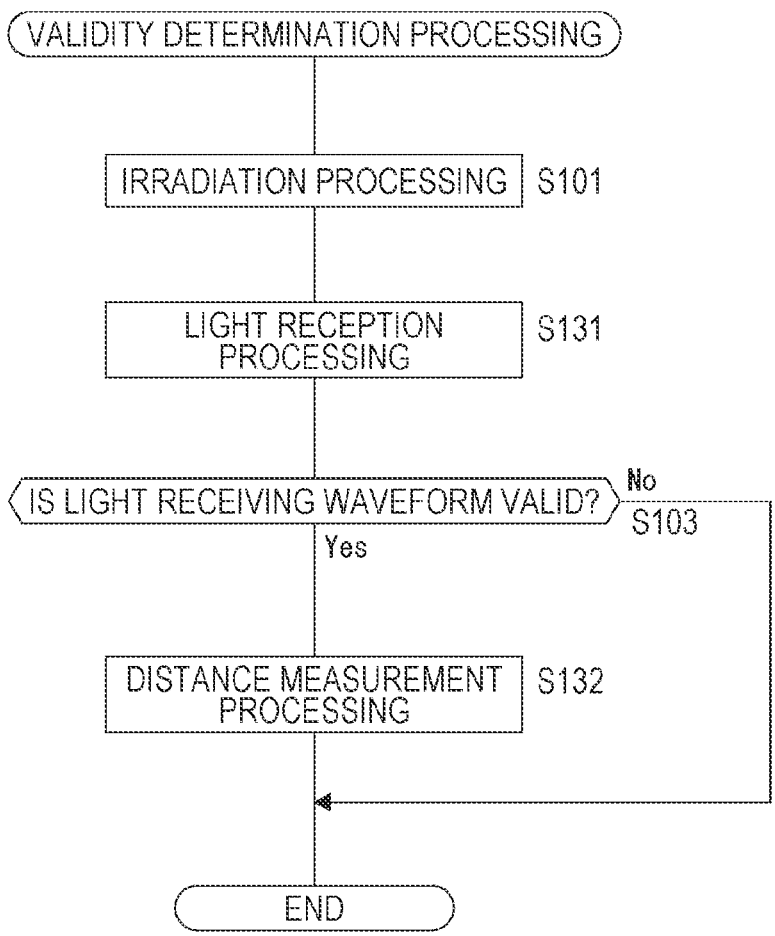
FIG. 36 is a flowchart of a third example of the eighth example of the validity determination processing.

FIG. 36 is a third example of the eighth example of the validity determination processing. This example is an example in which distance measurement is performed after validity is confirmed.

The control unit 4 executes the irradiation processing in step S101 and the light reception processing in step S131. As a result, the data used for validity determination is acquired on the basis of the charge amount converted by the first photoelectric conversion element 17A, and the data for distance measurement is acquired on the basis of the charge amount converted by the second photoelectric conversion element 17B.

The control unit 4 determines whether or not the light receiving waveform is valid in step S103. In a case where it is determined that the light receiving waveform is valid, the control unit 4 generates a distance image by executing the distance measurement processing in step S132.

On the other hand, in a case where it is determined that the light receiving waveform is not valid, the control unit 4 ends the series of processing illustrated in FIG. 36.

Note that, in a case where it is determined that the light receiving waveform is valid, the control unit 4 executes the distance measurement processing in step S132 and executes the normal-time processing in step S104. Furthermore, in a case where it is determined that the light receiving waveform is not valid, the control unit may execute the abnormal-time processing in step S105.

According to the present example, the validity is determined before the distance measurement processing. Therefore, in a case where the validity cannot be confirmed, the distance measurement processing is not executed so that a calculation processing amount can be reduced. That is, because the processing can be efficiently executed, it is possible to contribute to reduce power consumption.

Figure 37:
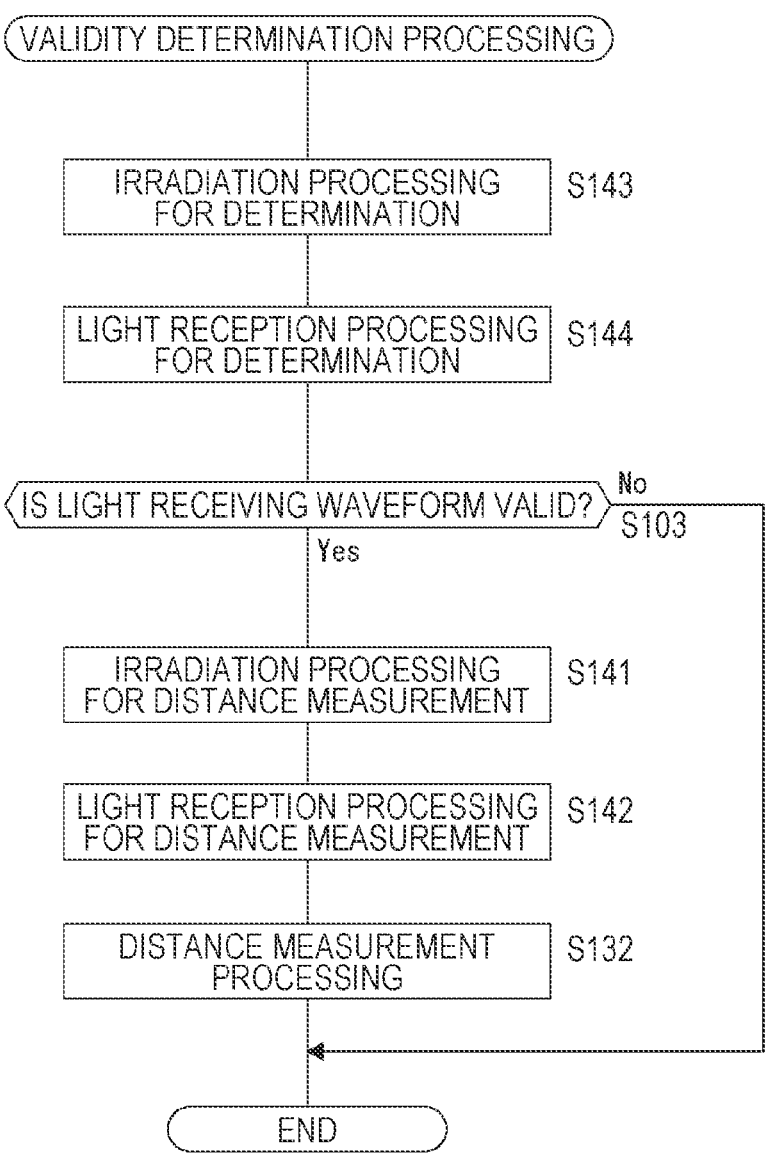
FIG. 37 is a flowchart of a fourth example of the eighth example of the validity determination processing.

FIG. 37 is a fourth example of the eighth example of the validity determination processing. This example is an example in which distance measurement is performed after validity is confirmed.

The control unit 4 executes the irradiation processing for determination in step S143 and executes the light reception processing for determination in step S144. Subsequently, the control unit 4 determines whether or not the light receiving waveform is valid in step S103.

In a case of determining that the light receiving waveform is valid, the control unit 4 executes the irradiation processing for distance measurement for performing the irradiation for distance measurement in step S141 and executes the light reception processing for distance measurement in step S142. As a result, data for distance measurement is acquired on the basis of the charge amount converted by the second photoelectric conversion element 17B.

Subsequently, the control unit 4 executes the distance measurement processing in step S132 so as to generate a distance image.

On the other hand, in a case where it is determined that the light receiving waveform is not valid, the control unit 4 ends the series of processing illustrated in FIG. 37.

In this example, as in the third example, because the validity is determined before the distance measurement processing. Therefore, in a case where the validity cannot be confirmed, the distance measurement processing is not executed so that a calculation processing amount can be reduced. That is, because the processing can be efficiently executed, it is possible to contribute to reduce power consumption.

In each example of the eighth example of the validity determination processing described above, the validity determination may be periodically confirmed by repeatedly executing the series of processing at certain time intervals, and the series of processing may be repeatedly executed irregularly.

Furthermore, the series of processing may be executed each time when an execution instruction is received.

Moreover, the distance measurement processing and the validity determination processing may be simultaneously executed or may be executed in a time-division manner.

In a case where the processing is simultaneously executed, the series of processing that can be processed within a predetermined time increases. Therefore, it is possible to improve the accuracy of the distance measurement result and the speed.

Furthermore, in a case where the processing is executed in a time-division manner, the processing may be executed so that execution times partially overlap or may be executed so that the execution times do not overlap. By executing the processing so that the execution times do not overlap, concentration of the calculation processing amount can be reduced. Therefore, it is possible to reduce the maximum power consumption.

3-10. Ninth Example of Validity Determination Processing

A ninth example of the validity determination processing is an example of validity determination processing by an imaging device 1B that includes a pattern generation unit.

Figure 38:
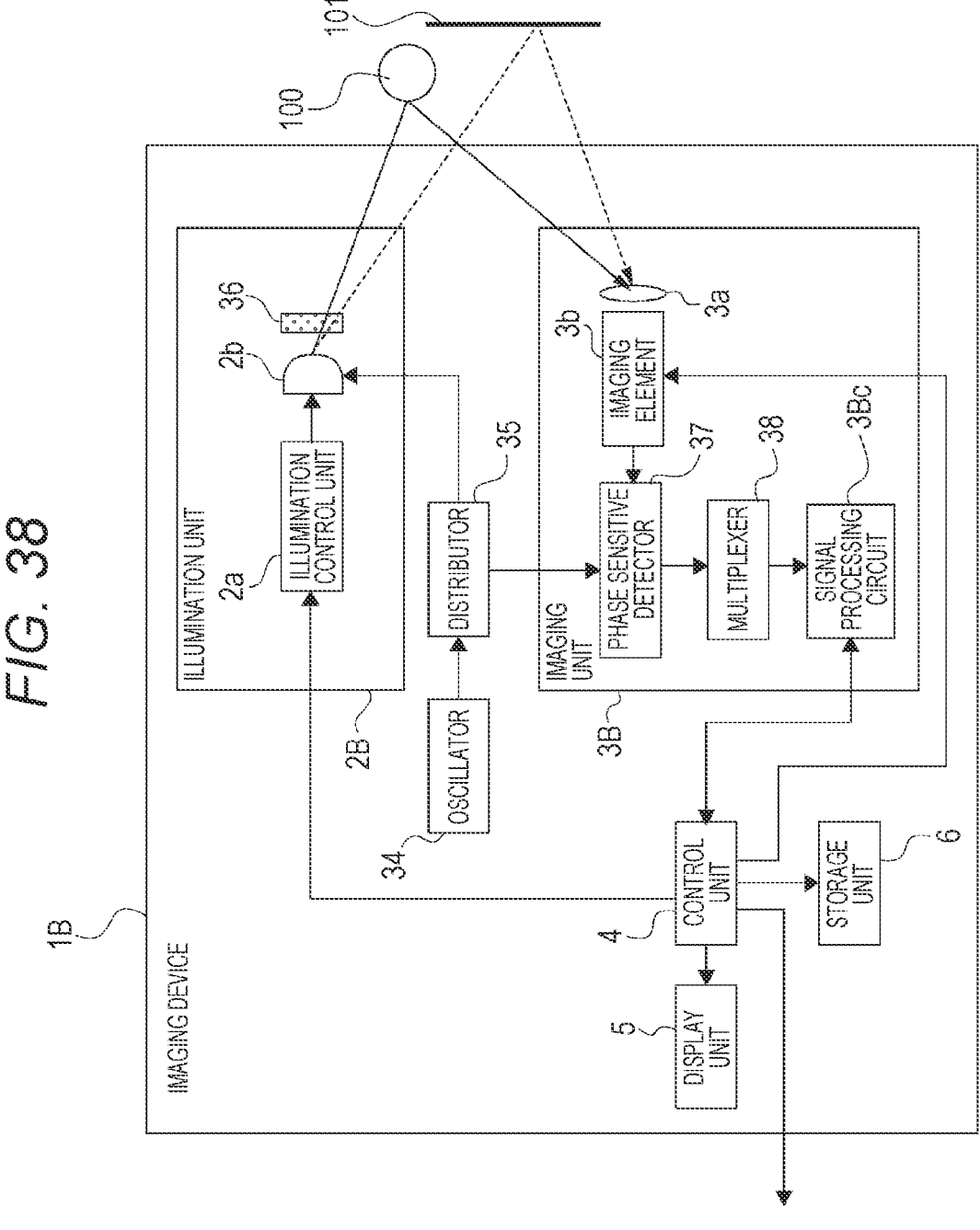
FIG. 38 is a diagram illustrating a system configuration of an imaging device in a ninth example of the validity determination processing.

A configuration example of the imaging device 1B is illustrated in FIG. 38. The imaging device 1B is, for example, an optical three-dimensional camera. The imaging device 1B includes an illumination unit 2B, an imaging unit 3B, a control unit 4, a display unit 5, a storage unit 6, an oscillator 34, and a distributor 35.

The illumination unit 2B includes a pattern generation unit 36 in addition to the illumination control unit 2a and the laser light source 2b. Note that, in addition, the illumination unit 2B may further include a lens system through which the light emitted from the laser light source 2b passes. Note that, in the illumination unit 2 described above, a lens system may be provided through which light emitted from the pattern generation unit 36 and the laser light source 2b passes.

The imaging unit 3B includes a phase sensitive detector 37 and a multiplexer 38 in addition to the lens 3a, the imaging element 3b, and a signal processing circuit 3Bc.

The oscillator 34 outputs a predetermined modulation signal (for example, sine wave signal, pulse wave signal, rectangular wave signal, saw-tooth wave signal, triangular wave signal, or the like). The modulation signal output from the oscillator 34 is input to the distributor 35.

The distributor 35 distributes the input modulation signals into two and outputs the respective signals to the laser light source unit 2b and the phase sensitive detector 37.

The laser light source 2b emits laser light of which intensity is modulated on the basis of the input modulation signal.

For example, the pattern generation unit 36 generates a predetermined irradiation intensity pattern by diffusing the light emitted from the laser light source 2b.

The subjects 100 and 101 are irradiated with the generated predetermined intensity pattern as irradiation light having a predetermined spread angle. The predetermined spread angle here is, for example, an angle at which an irradiation region is within an instantaneous field of view of the imaging element 3b.

The imaging element 3b receives incident light entered via the lens 3a and performs photoelectric conversion for each pixel on the basis of the control by the control unit 4. The signal that has been photoelectrically converted for each pixel is a reception signal and is output to the phase sensitive detector 37.

The phase sensitive detector 37 has a structure in which elements are arranged in a two-dimensional array in a row direction and a column direction, and each element corresponds to each pixel of the imaging element 3b. That is, the reception signal output from a certain pixel of the imaging element 3b is input to one element of the phase sensitive detector 37.

The phase sensitive detector 37 performs phase detection using the modulation signal input from the distributor 35. Each element of the phase sensitive detector 37 outputs a signal as a result of the phase detection (for example, complex amplitude signal) to the multiplexer 38.

The multiplexer 38 multiplexes signals received from the respective elements as the result of the phase detection so as to form one output in which the signals are sequentially arranged. The multiplexed signal that has been formed into one signal is output to the signal processing circuit 3Bc.

Figure 39:
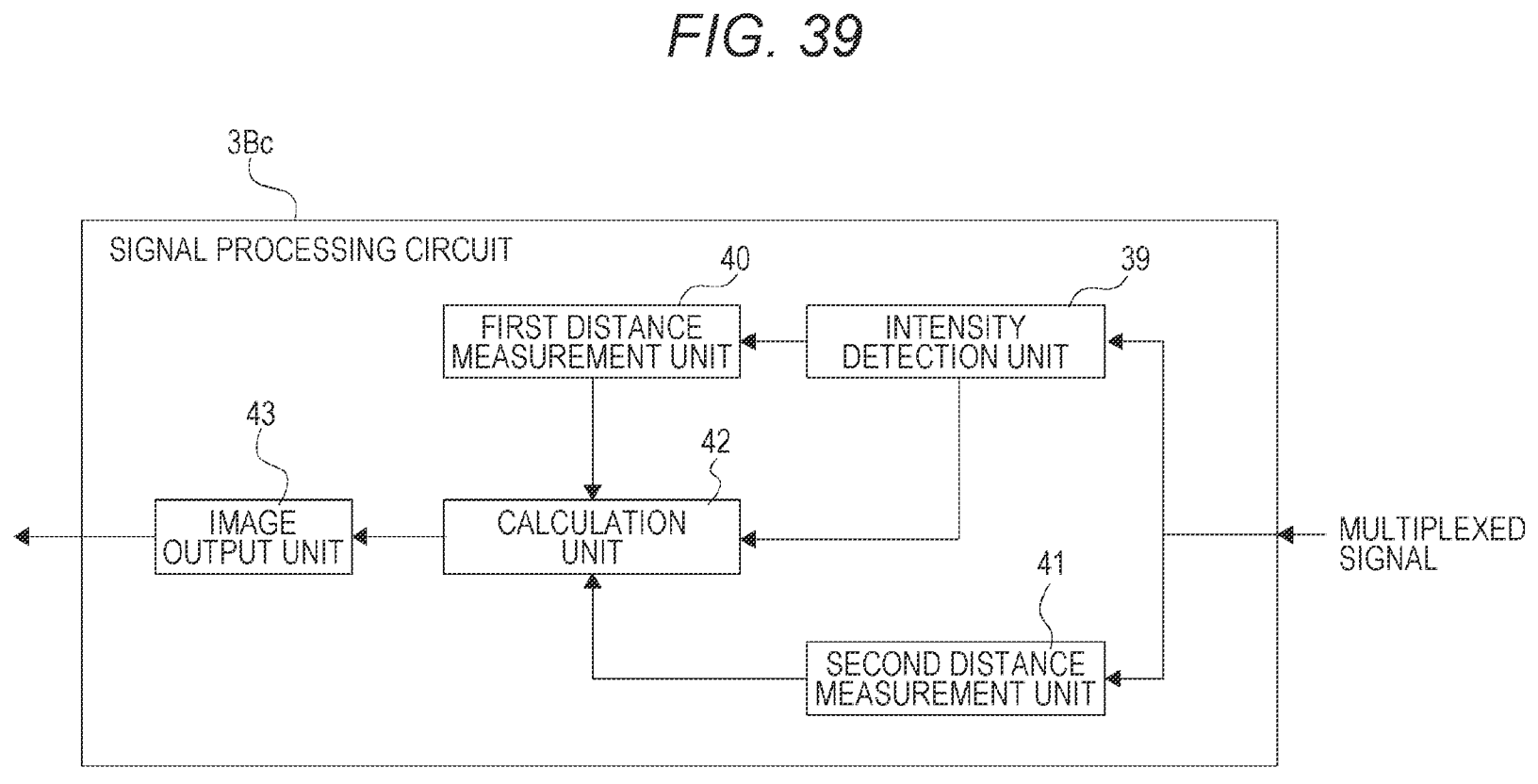

A configuration example of the signal processing circuit 3Bc is illustrated in FIG. 39.

The signal processing circuit 3Bc includes an intensity detection unit 39, a first distance measurement unit 40, a second distance measurement unit 41, a calculation unit 42, and an image output unit 43.

The signal processing circuit 3Bc processes the multiplexed signal from the multiplexer 38 and calculates and outputs a three-dimensional shape.

The intensity detection unit 39 detects signal intensity of each element of the phase sensitive detector 37 from the multiplexed signal received from the multiplexer 38. The signal intensity of each element detected by the intensity detection unit 39 increases for an element (pixel) that receives more emission light from the laser light source unit 2b of which the intensity is modulated on the basis of the predetermined modulation signal. Signal intensity information for each element acquired by the intensity detection unit 39 is input to the first distance measurement unit 40 and the second distance measurement unit 41 at the next stage.

The first distance measurement unit 40 performs distance measurement according to a triangulation method using the received signal intensity information. The distance measurement is performed for each element of the phase sensitive detector 37, an in addition, for each pixel of the imaging element 3b. Specifically, by measuring a change in reception intensity for each element (or pixel), distance information to the subject is calculated.

The first distance measurement unit 40 outputs three-dimensional shape information (3D information) to the calculation unit 42 on the basis of the calculated distance information.

The second distance measurement unit 41 performs distance measurement by the ToF method using the received signal intensity information. The distance measurement is performed for each element of the phase sensitive detector 37, an in addition, for each pixel of the imaging element 3b.

The second distance measurement unit 41 outputs three-dimensional shape information (3D information) to the calculation unit 42 on the basis of the calculated distance information.

The calculation unit 42 selects one of the 3D information by the triangulation method or the 3D information by the ToF method for each element of the phase sensitive detector 37 (that is, for each pixel of imaging element 3b). The selected 3D information is output to the image output unit 43.

The image output unit 43 calculates a final three-dimensional shape of the subject on the basis of the received 3D information for each element (for each pixel) and outputs the result.

Note that the configuration of the signal processing circuit 3Bc illustrated in FIG. 39 includes two distance measurement units (first distance measurement unit 40 and second distance measurement unit 41). However, in a case where the signal processing circuit 3Bc performs distance measurement by the ToF method, it is not necessary to include the second distance measurement unit 41. In that case, the calculation unit 42 does not need to execute selection processing. Furthermore, it is sufficient for the image output unit 43 to calculate the three-dimensional shape based on the distance measurement result by the triangulation method.

The imaging device 1B has the configurations illustrated in FIGS. 38 and 39, for example, so that the illumination unit 2B can output laser light with a dot pattern in which small spot-like light (spot light) beams are arranged in a predetermined pattern.

Figure 40:
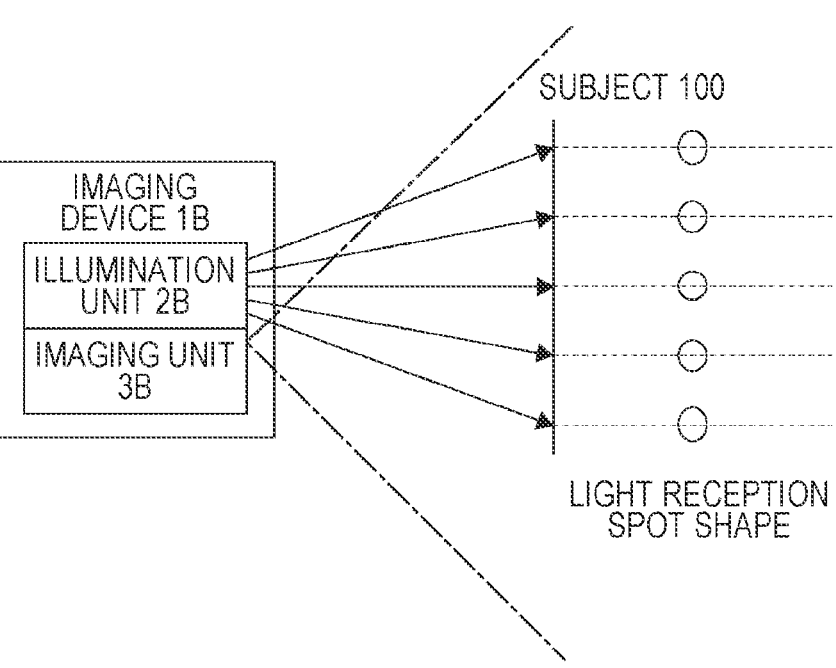
FIG. 40 is a diagram illustrating an example of an irradiation pattern of laser light in the ninth example of the validity determination processing.

Specifically, examples of the plurality of spot light beams emitted from the illumination unit 2B and shapes of the spot light beams (light reception spot shape) received by the imaging element 3b when the plurality of spot light beams emitted to the subject is imaged by the imaging unit 3B are illustrated in FIG. 40.

FIG. 40 illustrates light paths of five spot light beams emitted from the illumination unit 2B until the spot light beams reach the subject 100. Furthermore, the spot shapes formed, on the imaging element 3b, by the spot light beams when the spot light beams projected on the subject 100 are imaged by the imaging unit 3B, that is, light reception spot shapes are illustrated. The light reception spot shape irradiated to the position that is the substantially front surface of the illumination unit 2B is a perfect circular shape. Furthermore, as the irradiated position is separated from the substantially front surface of the illumination unit 2B, the light reception spot shape deviates from a perfect circular shape and becomes an elliptical shape. However, regarding these shapes, there is a case where blurring (blurring), speckles, or the like should be considered.

That is, as being closer to the center of the imaging range, the light reception spot shape of the light with the dot pattern emitted from the illumination unit 2B becomes closer to a perfect circular shape. This is because the positions of the illumination unit 2B and the imaging unit 3B in the space are substantially the same.

Figure 41:
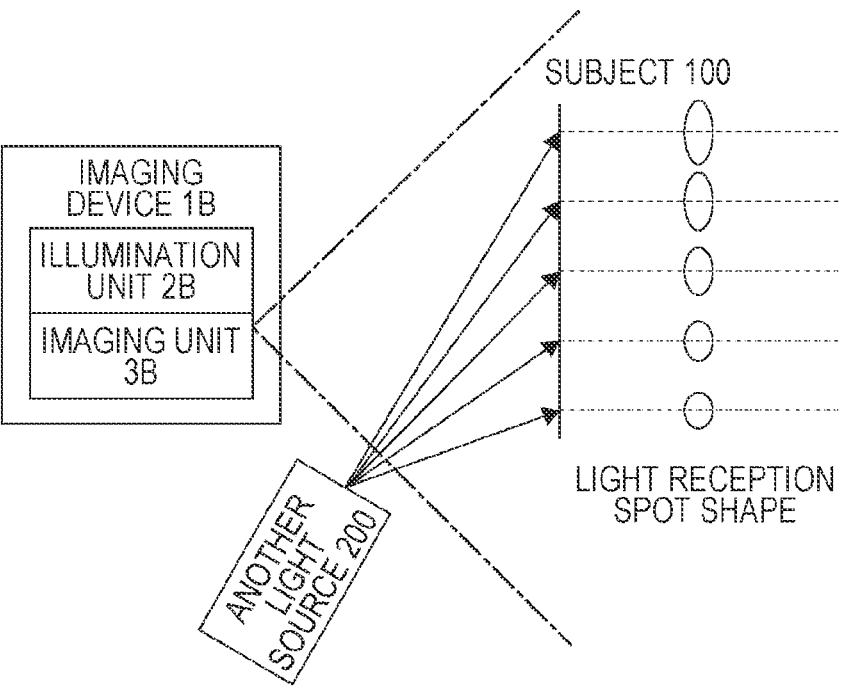
FIG. 41 is a diagram illustrating an example of an irradiation pattern from another light source in the ninth example of the validity determination processing.

FIG. 41 illustrates light reception spot shapes in a case where light with a dot pattern irradiated from another light source 200 other than the illumination unit 2B to the subject 100 is imaged by the imaging unit 3B.

As illustrated, all light reception spot shapes of the light with the dot pattern irradiated from the another light source are elliptical shapes. Furthermore, flattening of an ellipse is set to be higher (close to one) than each light reception spot shape illustrated in FIG. 40.

This is because the positions of the another light source 200 and the imaging unit 3B in the space are separated from each other. That is, even if the another light source 200 at the position separated from the imaging device 1B emits the dot pattern to the subject, it can be determined that the another light source 200 is not a valid light source by detecting the light reception spot shape.

It is efficient to match or substantially match an irradiatable range of the illumination unit 2B and an imagable range of the imaging unit 3B.

That is, at least a part of the illumination unit 2B (for example, any one of laser light source 2b, pattern generation unit 36, or optical system such as lens in front thereof) and at least a part of the imaging unit 3B (for example, one of imaging element 3b and lens 3a) are arranged at the same or substantially the same angle with respect to the subject 100. As a result, at the normal time, the light reception spot shape that is a substantially symmetrical shape such as a perfect circular shape is detected by the imaging unit 3B.

Furthermore, as the position is closer to the center of the imagable range, it is possible to configure the light reception spot shape closer to a symmetrical shape.

On the other hand, for example, at the abnormal time such as in a case where the another light source 200 performs irradiation for the purpose of impersonation, at least a part of the imaging unit 3B and the another light source 200 often have different arrangement angles with respect to the subject 100. Therefore, a light reception spot shape that is an asymmetrical shape such as an elliptical shape is detected by the imaging unit 3B.

As a result, the validity determination processing based on the light reception spot shape of the laser light can be executed.

Note that, in the example illustrated in FIG. 40, an example has been described in which the number of spot light beams emitted from the illumination unit 2B is five. However, the number may be more than five, and for example, may be small as one. However, in a case where the number of spot light beams is plural, it is possible to execute the validity determination processing based on a change tendency of the plurality of light reception spot shapes. On the other hand, in a case where the number of spot light beams is one, by irradiating at least a partial region of the imagable range with a laser light beam so that the laser light beam draws a specific trajectory, it is possible to execute the validity determination processing based on the change tendency of the light reception spot shape. For example, under a measurement environment in which some of spot light beams are diffusely reflected, it is desirable to execute the validity determination processing based on the change tendency of the light reception spot shape. Of course, what is the basis of the validity determination processing can be selected or switched.

Note that, in this example, the shape of the spot light beam emitted from the illumination unit 2B is a perfect circular shape. However, other shapes may be considered. FIG. 42 is a table of various examples of spot light beam shapes (spot shape).

A spot shape A is a perfect circular shape described above. A spot shape B is a doughnut-like shape. In addition, various shapes are considered such as an elliptical shape (spot shape C), an oval shape (spot shape D), a shape in which a plurality of figures overlaps (spot shape E), a shape including a plurality of figures that does not overlap (spot shape F), a triangular shape (spot shape G), a square shape (spot shape H), a rectangular shape (spot shape I), a trapezoid shape (spot shape J), a rhombic shape (spot shape K), a pentagonal shape (spot shape L), a polygonal shape more than a hexagonal shape (spot shape M), a star shape (spot shape N), or the like. However, at least a part of these shapes may be rounded, blurred (blurred), have a shape considering speckles, or the like.

For easy manufacturing of the laser light source 2b and the pattern generation unit 36, a mirror symmetrical shape or point symmetrical shape is desired. In particular, a perfect circular shape (spot shape A) and a doughnut-like shape (spot shape B) are further desirable.

Furthermore, in consideration of making it difficult to duplicate the laser light, a spot shape other than the perfect circular shape is desirable, and in particular, a non-mirror symmetrical spot shape or non-point symmetrical spot shape is desired.

The spot shape of the laser light can be shaped, for example, using a beam shaping element.

Note that, in order to confirm the validity of the laser light source 2b on the basis of the light reception spot shape of the laser light, for example, in consideration of detecting a twice or more shape change in the spot shape, it is preferable that an area of an irradiation range be at least equal to or less than 25% of an area of the imagable range.

3-11. Tenth Example of Validity Determination Processing

A tenth example of the validity determination processing is an example in which the illumination unit 2B irradiates laser light with a dot pattern in which a plurality of spot light beams is arranged at a predetermined position.

Figure 43:
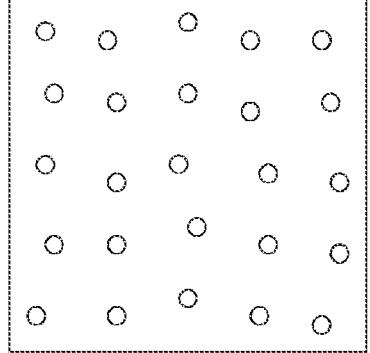
FIG. 43 is a diagram illustrating an example of a dot pattern irradiated from an illumination unit.
Figure 44:
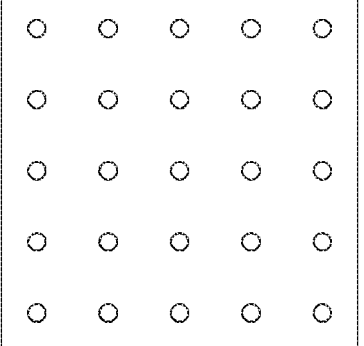
FIG. 44 is a diagram illustrating another example of the dot pattern irradiated from the illumination unit.
Figure 45:
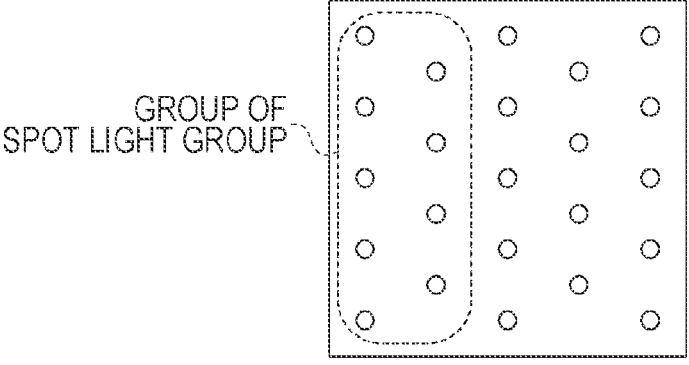
FIG. 45 is a diagram illustrating still another example of the dot pattern irradiated from the illumination unit.

Each of FIGS. 43 to 45 illustrates a dot pattern example. Note that, the dot pattern illustrated in each drawing is a part of the dot patterns irradiated from the illumination unit 2B (irradiated dot pattern).

FIG. 43 illustrates a dot pattern used for distance measurement by the triangulation method. Specifically, a dot pattern is illustrated in which spot light beams are irregularly arranged.

FIG. 44 illustrates a dot pattern in which spot light beams are regularly arranged. Such a dot pattern may be used for the distance measurement by the triangulation method.

FIG. 45 illustrates an example in which a dot pattern is formed by periodically repeating a group of spot light beam groups including a plurality of spot light beams.

For example, the illumination unit 2B of the imaging device 1B includes a diffraction optical element so that a spot light beam group can be duplicated.

In this case, laser light with a dot pattern including a large number of spot light beams can be generated with a simple configuration. Furthermore, because the dot pattern is a repetition pattern of the spot light beam group, a part of calculation of distance measurement can be performed in common, and it is possible to shorten a time required for the calculation and reduce a load of a processing unit.

The dot pattern illustrated in each drawing can be applied to the distance measurement by the ToF method.

Figure 46:
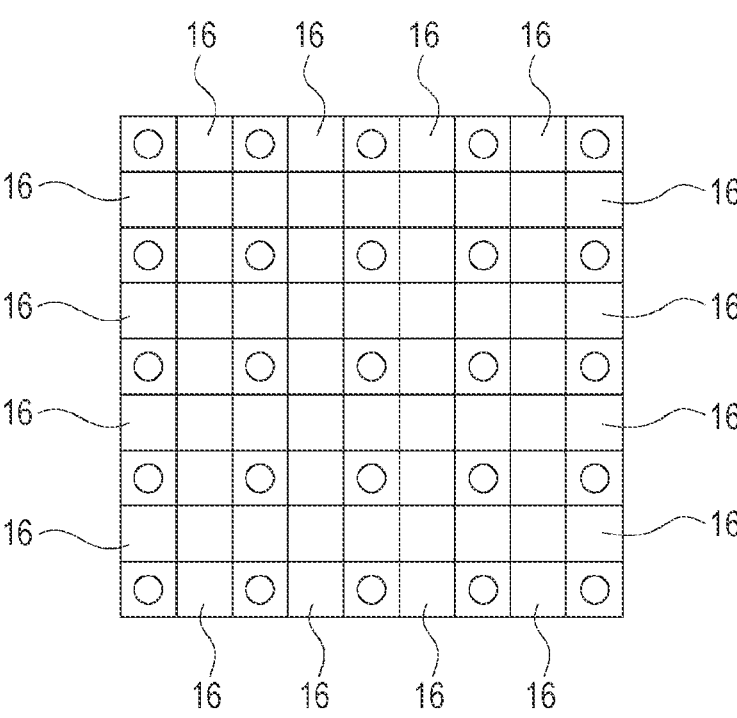
FIG. 46 is a diagram illustrating an example of a light receiving dot pattern when laser light is emitted from a valid light source.

A dot pattern formed on the imaging element 3b (light receiving dot pattern) when the illumination unit 2B irradiates the subject with the dot pattern illustrated in FIG. 44 and the imaging unit 3B images the subject is illustrated in FIG. 46.

The illustrated state indicates a state where the light reception spot shape is provided within a region for one pixel.

Figure 47:
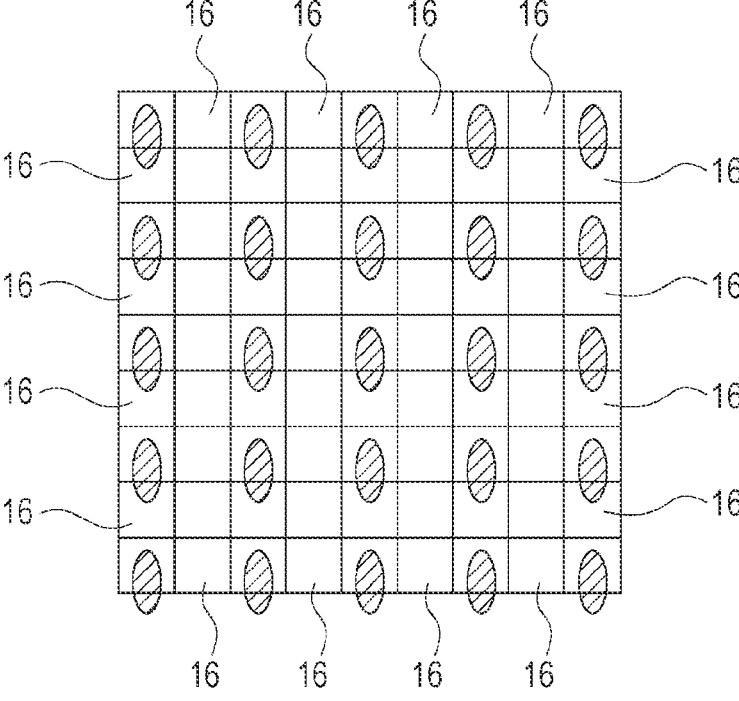
FIG. 47 is a diagram illustrating an example of a light receiving dot pattern when laser light is emitted from an invalid light source.

Furthermore, an example of a light reception spot shape in a case where an invalid another light source 200 irradiates a dot pattern is illustrated in FIG. 47.

Because the light reception spot shape is an elliptical shape as illustrated, the light reception spot shape is not within the region for one pixel, and light is received over a region for two pixels.

As illustrated in FIGS. 46 and 47, in a case where a condition such that "total number of spot light beams of laser light*4≤total number of pixels in imaging element 3*b*" is satisfied, it is possible to confirm the validity of the laser light source on the basis of the light reception spot shape of the laser light.

Figure 48:
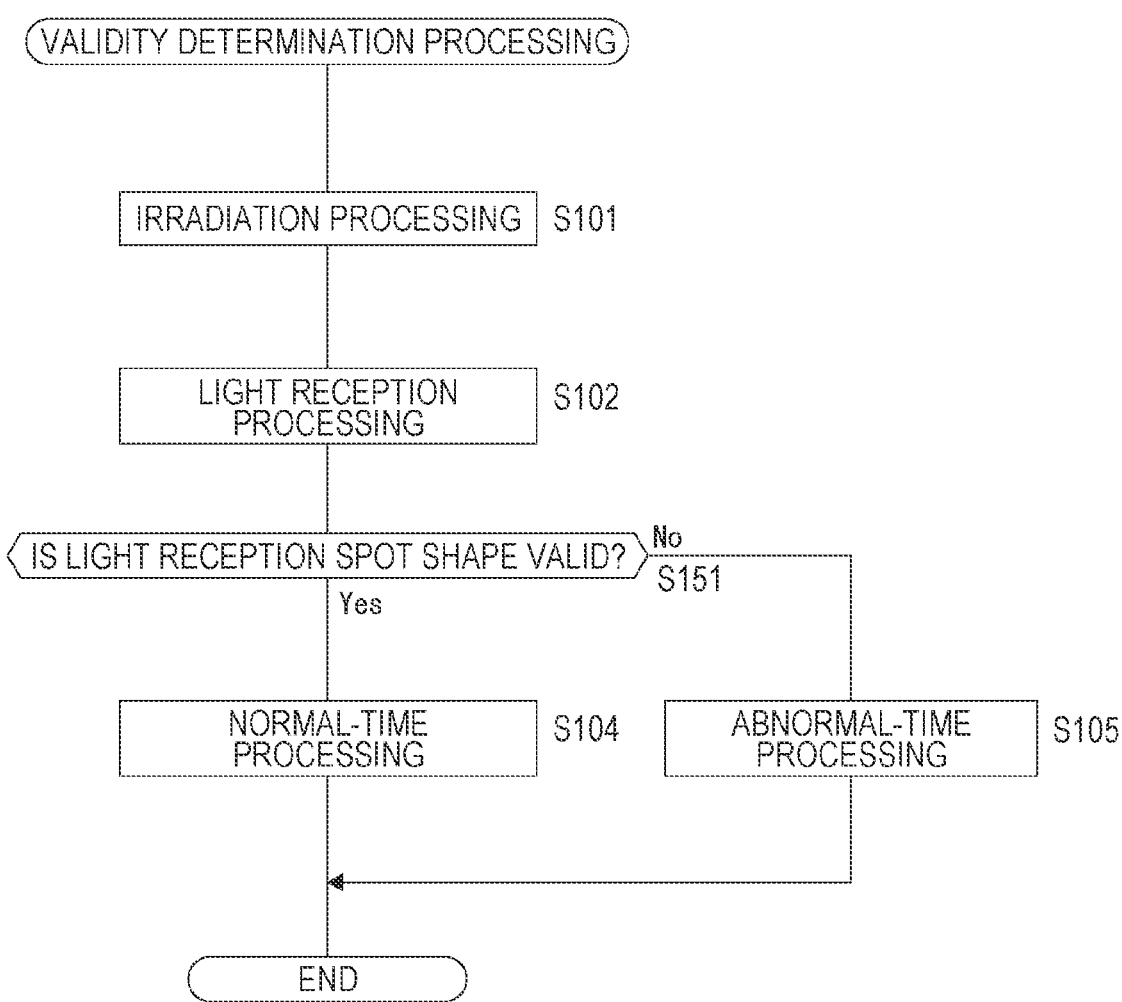
FIG. 48 is a flowchart of a tenth example of the validity determination processing.

An example of processing executed by the control unit 4 in this example is illustrated in FIG. 48. Note that processing similar to the processing in each flowchart described above is denoted with the same reference numerals, and description thereof will be appropriately omitted.

The control unit 4 executes the irradiation processing in step S101 and executes the light reception processing in step S102. As a result, for example, a signal based on a light receiving dot pattern illustrated in FIG. 46 is acquired.

The control unit 4 executes the branching processing for determining whether or not the light reception spot shape is valid in step S151.

In a case where it is determined that the light reception spot shape is valid, the control unit 4 executes the normal-time processing in step S104, and in a case where it is determined that the light reception spot shape is not valid, the control unit 4 executes the abnormal-time processing in step S105.

3-12. Eleventh Example of Validity Determination Processing

An eleventh example of the validity determination processing is an example in which determination is made on the basis of the number of light reception spot light beams.

Specifically, the validity of the laser light source is confirmed by comparing the number of spot light beams included in the irradiated dot pattern (the number of irradiation spots) and the number of light reception spot light beams included in the light receiving dot pattern (the number of light receiving spots).

Figure 49:
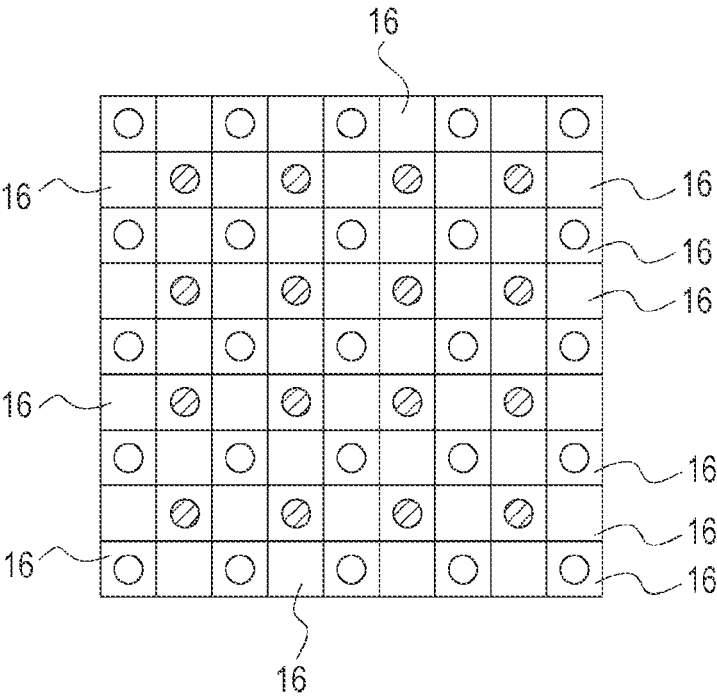
FIG. 49 is an example of a light receiving dot pattern that is determined as invalid in an eleventh example of the validity determination processing.

For example, FIG. 49 illustrates an example of a light receiving dot pattern in which the validity determination result is "invalid".

As illustrated, the imaging element 3*b* receives light of invalid spot light beams in addition to valid spot light beams.

Figure 50:
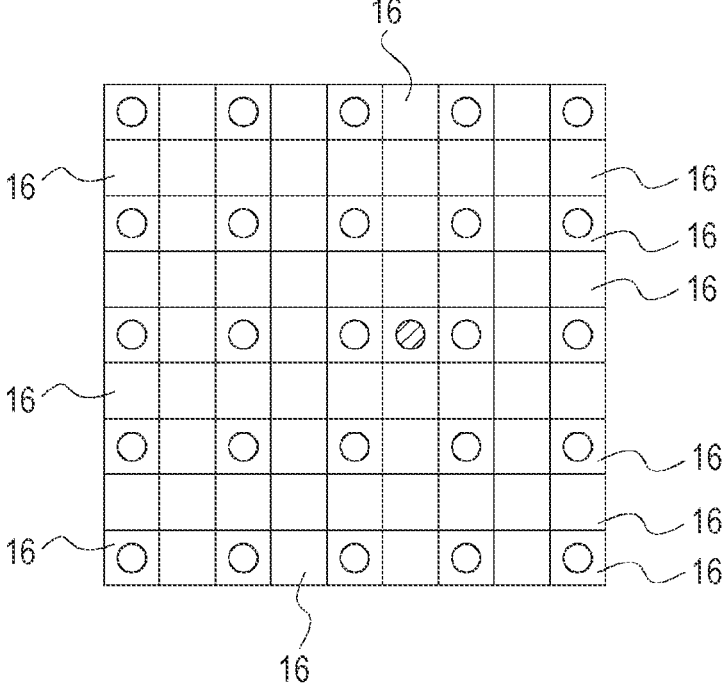
FIG. 50 is another example of the light receiving dot pattern that is determined as invalid in the eleventh example of the validity determination processing.

Furthermore, similarly, FIG. 50 illustrates an example of a light receiving dot pattern in which the validity determination result is "invalid". As illustrated, if the number of light reception spot light beams included in the light receiving dot pattern is larger than the number of spot light beams included in the irradiated dot pattern by at least one, the validity determination result is "invalid".

Note that, in a case where the number of light receiving spots is less than the number of irradiation spots, a case is considered where it is not possible to perform detection because the reflected light from the subject is too weak. Therefore, the validity determination result may be "valid". Note that, in this case, it may be determined whether or not the determination result is valid on the basis of a distance and arrangement between the light reception spot light beams.

3-13. Twelfth Example of Validity Determination Processing

A twelfth example of the validity determination processing is an example of a case where the light reception spot shape is larger with respect to the size of the unit pixel 16 of the imaging element 3*b*. Specifically, description will be made with reference to FIGS. 51 and 52.

Figure 51:
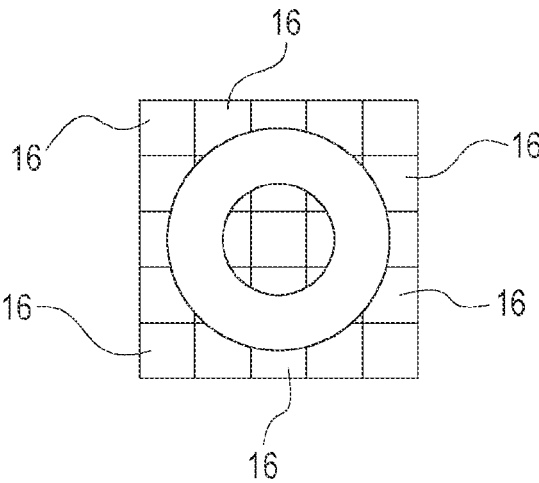
FIG. 51 is a diagram illustrating a shape of valid light reception spot light in a twelfth example of the validity determination processing.

FIG. 51 is an example in which one light reception spot light beam is positioned in a range including 25 unit pixels 16. In this example, because a charge amount accumulated in the unit pixel 16 positioned at the center is zero, a doughnut-like spot shape can be appropriately determined.

Figure 52:
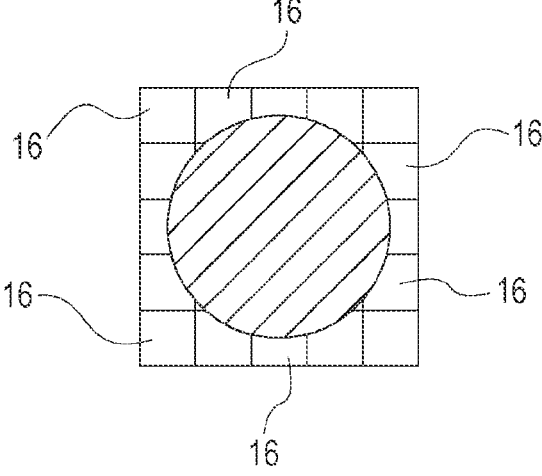
FIG. 52 is a diagram illustrating a shape of invalid light reception spot light in the twelfth example of the validity determination processing.

Furthermore, FIG. 52 is an example in which one light reception spot light beam is positioned in a range including 25 unit pixels 16. The light reception spot light is based on light emitted from the another light source 200 that is invalid.

Although an outer shape of the light reception spot light is the same in all the figures, the charge amount accumulated in the unit pixel 16 positioned at the center is not zero in FIG. 52. Therefore, it is possible to grasp that the light reception spot light is different from the light reception spot light by the valid laser light source 2*b*.

Note that, in order to appropriately determine a spot shape having a doughnut-like shape, it is sufficient that other unit pixels 16 be arranged so as to surround a certain unit pixel 16. If the shape of the unit pixel 16 is a triangle or a substantially triangle, "the total number of spot light beams of laser light*4≤the total number of pixels of imaging element 3*b*", if the shape of the unit pixel 16 is a quadrangle or a substantially quadrangle, "the total number of spot light beams of laser light*5≤the total number of pixels of imaging element 3*b*", if the shape of the unit pixel 16 is a pentagon or a substantially pentagon, "the total number of spot light beams of laser light*6≤the total number of pixels of imaging element 3*b*", and if the shape of the unit pixel 16 is a hexagonal shape or a substantially hexagonal shape, "the total number of spot light beams of laser light*7≤the total number of pixels of imaging element 3*b*". It is sufficient that at least a part in the imaging range satisfy these conditions.

In this way, by complicating the irradiation spot shape, this makes it difficult to imitate the laser light, and it is possible to improve the accuracy of the validity determination processing.

3-14. Thirteenth Example of Validity Determination Processing

A thirteenth example of the validity determination processing is an example in which the validity is determined on the basis of a light receiving dot pattern.

Figure 53:
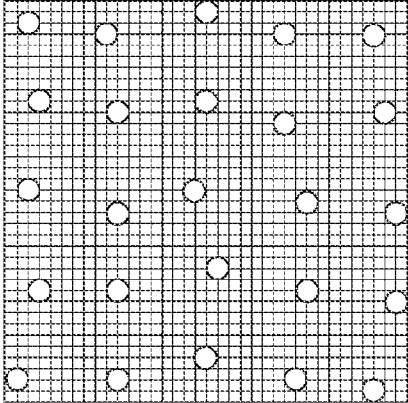
FIG. 53 is a diagram illustrating an example of a valid light receiving dot pattern.

First, FIG. 53 illustrates a light receiving dot pattern when an irradiated dot pattern emitted from the valid laser light source 2*b* and emitted to the subject is imaged.

Figure 54:
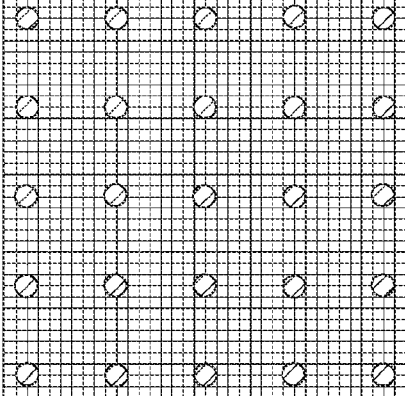
FIG. 54 is a diagram illustrating an example of an invalid light receiving dot pattern in a thirteenth example of the validity determination processing.

Next, FIG. 54 illustrates a light receiving dot pattern when an irradiated dot pattern emitted from an invalid another light source 200 is imaged. The above case may include a case where reflected light of light emitted from the invalid another light source 200 reflected by the subject is received or a case where light that directly entered from the another light source 200 is received.

The validity of the laser light source can be determined by comparing the light receiving dot patterns in FIGS. 53 and 54.

Note that such validity determination can be performed in a case of an irradiated dot pattern in which spot light beams are randomly arranged and in a case where the imaging unit 3B grasps the random arrangement. In this example and other examples below, the imaging unit 3B and the illumination unit 2B that irradiates the laser light are provided in the same imaging device 1B, and the imaging unit 3B can grasp the random irradiated dot pattern irradiated by the illumination unit 2B. Therefore, it is possible to perform the validity determination described above.

Figure 55:
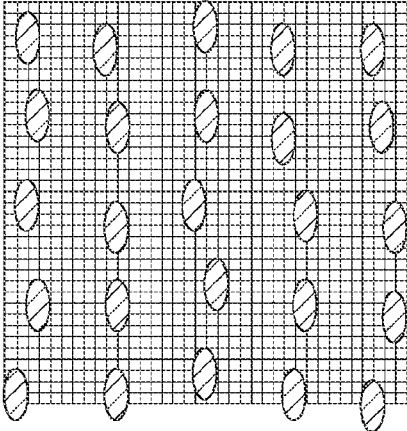
FIG. 55 is a diagram illustrating another example of the invalid light receiving dot pattern in the thirteenth example of the validity determination processing.

Note that, as illustrated in FIG. 55, in a case where the light reception spot shapes are different even if the light reception spot light is correctly arranged, it is determined that invalid light is received.

3-15. Fourteenth Example of Validity Determination Processing

A fourteenth example of the validity determination processing is an example in a case where the laser light source 2*b* is used as the another light source 200.

A light receiving dot pattern when the subject is irradiated with light emitted from the laser light source 2*b* included in the imaging device 1B via the pattern generation unit 36 and its reflected light is imaged by the imaging unit 3B is illustrated in FIG. 53.

Figure 56:
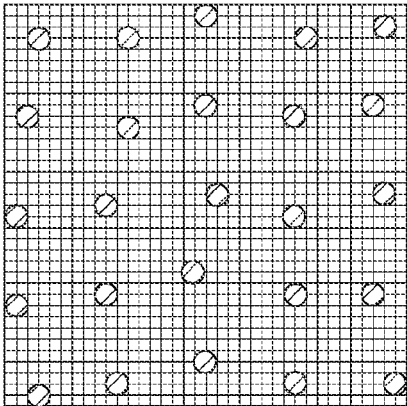
FIG. 56 is a diagram illustrating another example of an invalid light receiving dot pattern in a fourteenth example of the validity determination processing.

Furthermore, a light receiving dot pattern in a case where a laser light source as the another light source 200 positioned at the position substantially facing the imaging device 1B is manufactured similarly to the laser light source 2*b* included in the imaging device 1B in a case where an irradiated dot pattern emitted from the another light source 200 is received by the imaging unit 3B of the imaging device 1B is illustrated in FIG. 56.

In any one of FIGS. 53 to 56, the irradiated dot patterns are the same. However, the light receiving dot patterns in FIGS. 53 and 56 are mirror symmetrical.

In such a case, it can be determined that the laser light source included in the another light source 200 is invalid on the basis of the light receiving dot pattern illustrated in FIG. 56, and it is possible to roughly grasp the position of the another light source 200. That is, in a case where a cross-talk person or a malicious attacker uses the another light source 200, it is possible to specify the position of the another light source 200, and it is possible to cope with erroneous measurement and attacks.

Note that, in a case where the light receiving dot pattern illustrated in FIG. 55 in the twelfth example of the validity determination processing above is acquired, the arrangement of the light reception spot light is correct, and therefore, it can be understood that the another light source 200 and the imaging device 1B are positioned in the same direction with respect to the subject. Because the light reception spot shape is a vertically-long ellipse, it is possible to estimate that the imaging device 1B and the another light source 200 are positioned at different positions in the vertical direction.

Furthermore, even in a case where the shape of the irradiated spot light beam is an asymmetrical shape, it is possible to grasp an irradiation position of the another light source 200 according to the light reception spot shape. Note that information regarding the irradiation position of the another light source 200 can be applied to game applications or various applications.

3-16. Fifteenth Example of Validity Determination Processing

A fifteenth example of the validity determination processing is another example of a case where the laser light source 2*b* is used as the another light source 200.

A light receiving dot pattern when the subject is irradiated with the light emitted from the valid laser light source 2*b* included in the imaging device 1B via the pattern generation unit 36 and the reflected light is imaged by the imaging unit 3B, that is, a light receiving dot pattern determined to be valid is illustrated in FIG. 53.

Figure 57:
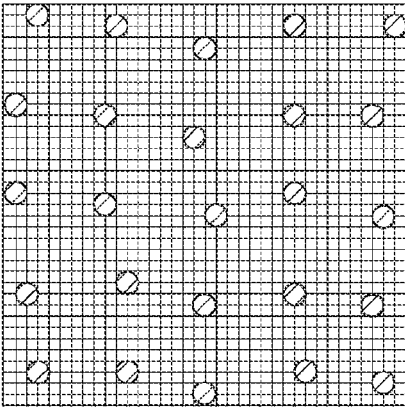
FIG. 57 is a diagram illustrating another example of an invalid light receiving dot pattern in a fifteenth example of the validity determination processing.

On the other hand, FIG. 57 is a light receiving dot pattern in a case where a laser light source 2*b* included in another imaging device AC is used as the another light source 200, the subject is irradiated with the light emitted from the another laser light source 2*b* via a pattern generation unit 36 included in the another imaging device AC, and the reflected light is received by the imaging unit 3B of the imaging device 1B.

Comparing FIG. 53 with 57, the light receiving dot pattern illustrated in FIG. 57 is a pattern obtained by rotating the dot pattern illustrated in FIG. 53 by 180 degrees. Note that whether or not a pattern is the pattern rotated by 180 degrees can be determined by asymmetry of the irradiated dot pattern.

In a case where the light receiving dot pattern illustrated in FIG. 57 is detected, it is determined that the laser light source is an invalid laser light source, and a position and a posture of the another imaging device AC including the laser light source 2*b* as the another light source 200 can be estimated.

Figure 58:
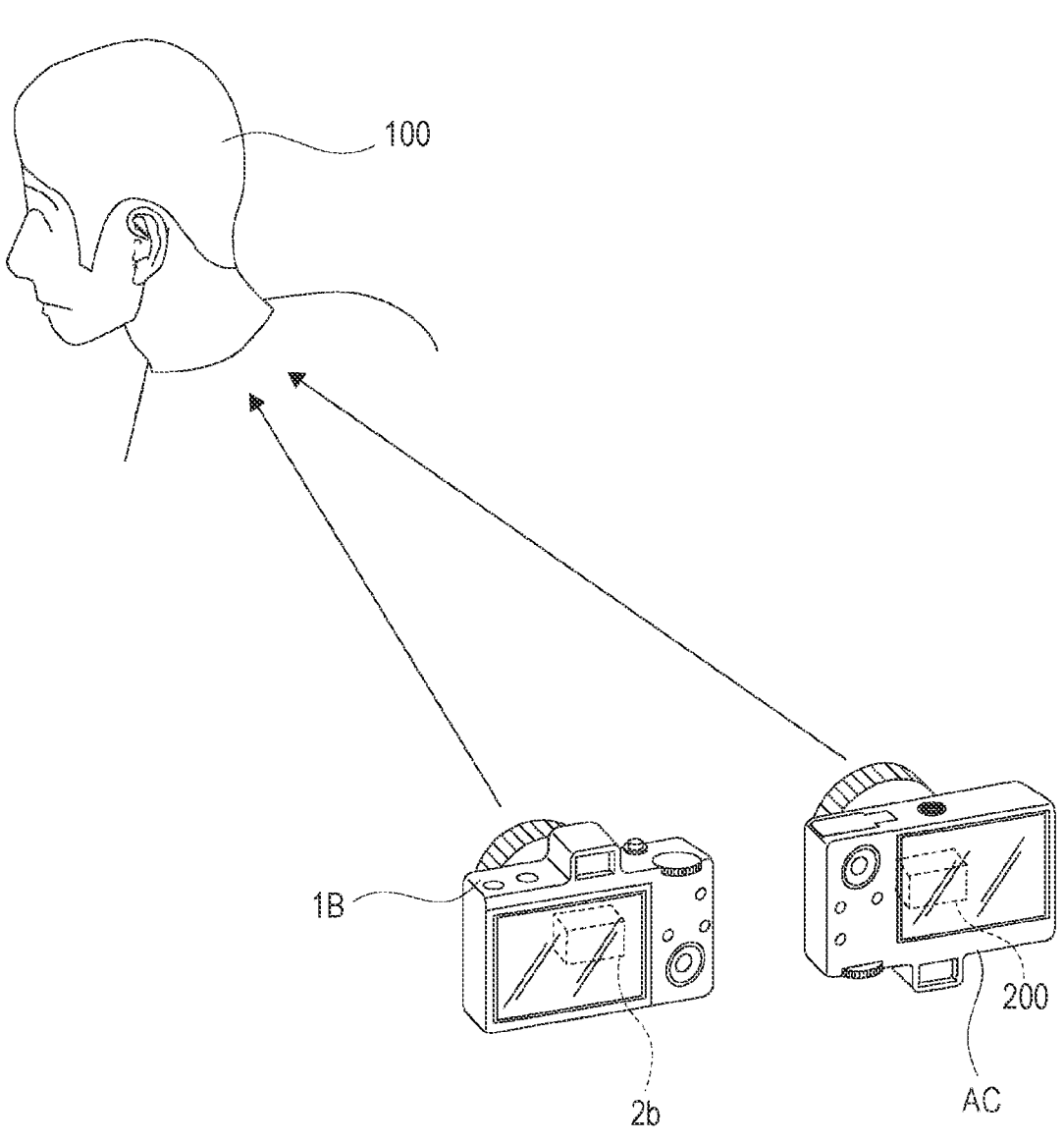
FIG. 58 is a diagram illustrating an example of positions and postures of an imaging device and another imaging device in an embodiment in the fifteenth example of the validity determination processing.

For example, as illustrated in FIG. 58, the imaging device 1B is in a posture in which an upper surface portion faces upward (sky) and a lower surface portion faces downward (ground), and the another imaging device AC is in a posture in which an upper surface portion faces downward (ground) and a lower surface portion faces upward (sky). In this way, when the two imaging devices irradiate the same irradiated dot patterns in a state where the two imaging devices are relatively rotated by 180 degrees, the difference between the light receiving dot patterns illustrated in FIGS. 53 and 57 appears.

That is, in a case where the light receiving dot pattern illustrated in FIG. 57 is imaged, it is found that the laser light is invalid laser light by the another imaging device AC, and it is estimated that the another imaging device AC is in a posture rotated by 180 degrees with respect to the imaging device 1B, and it can be estimated that the another imaging device AC is positioned in the same direction as the imaging device 1B with respect to the subject 100.

3-17. Sixteenth Example of Validity Determination Processing

A sixteenth example of the validity determination processing is still another example of a case where the laser light source 2*b* is used as the another light source 200.

A light receiving dot pattern when the subject is irradiated with the light emitted from the valid laser light source 2*b* included in the imaging device 1B via the pattern generation unit 36 and the reflected light is imaged by the imaging unit 3B, that is, a light receiving dot pattern determined to be valid is illustrated in FIG. 53.

Figure 59:
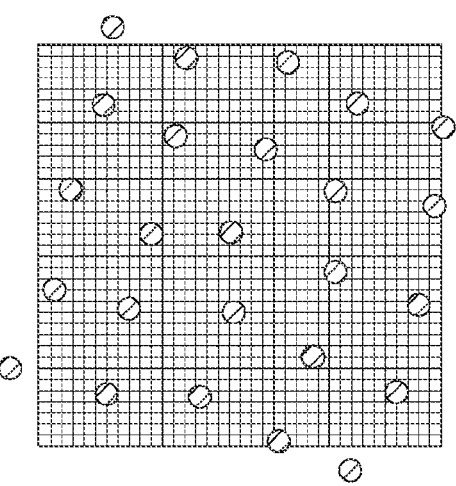
FIG. 59 is a diagram illustrating another example of an invalid light receiving dot pattern in a sixteenth example of the validity determination processing.

FIG. 59 is a light receiving dot pattern in a case where a laser light source 2*b* included in another imaging device AC is used as the another light source 200, the subject is irradiated with the light emitted from the another laser light source 2*b* via the pattern generation unit 36 included in the another imaging device AC, and the reflected light is received by the imaging unit 3B of the imaging device 1B.

Comparing FIG. 53 with 59, the light receiving dot pattern illustrated in FIG. 59 is a pattern obtained by rotating the dot pattern illustrated in FIG. 53 by about 15 degrees in the clockwise direction.

In a case where the light receiving dot pattern illustrated in FIG. 59 is detected, it can be determined that the light receiving dot pattern is not the dot pattern irradiated from the valid laser light source 2b included in the imaging device 1B.

Note that, because the illumination unit 2B and the imaging unit 3B are fixed to outside or inside of the imaging device 1B, the illumination unit 2B and the imaging unit 3B are rotated according to the rotation of the imaging device 1B. Similarly, the illumination unit (another light source 200) included in the another imaging device AC is rotated according to the rotation of the another imaging device AC.

That is, the validity determination processing can be executed by extracting measurement data regarding a rotation angle of a light source that performs irradiation on the basis of measurement data of the light receiving dot pattern acquired by the imaging unit 3B and comparing the measurement data with a reference condition. Furthermore, by determining the validity only in a case where the measurement data matches or substantially matches the reference condition, erroneous measurement by a cross-talk person is reduced, and it is possible to prevent a fraud by a malicious attacker. On the other hand, information regarding the rotation angle of the another light source 200 can be applied to game applications and various applications.

3-18. Seventeenth Example of Validity Determination Processing

A seventeenth example of the validity determination processing is an example of an imaging device 1C that includes an imaging unit 3C including an imaging element 3Cb using a single photon avalanche diode (SPAD).

Figure 60:
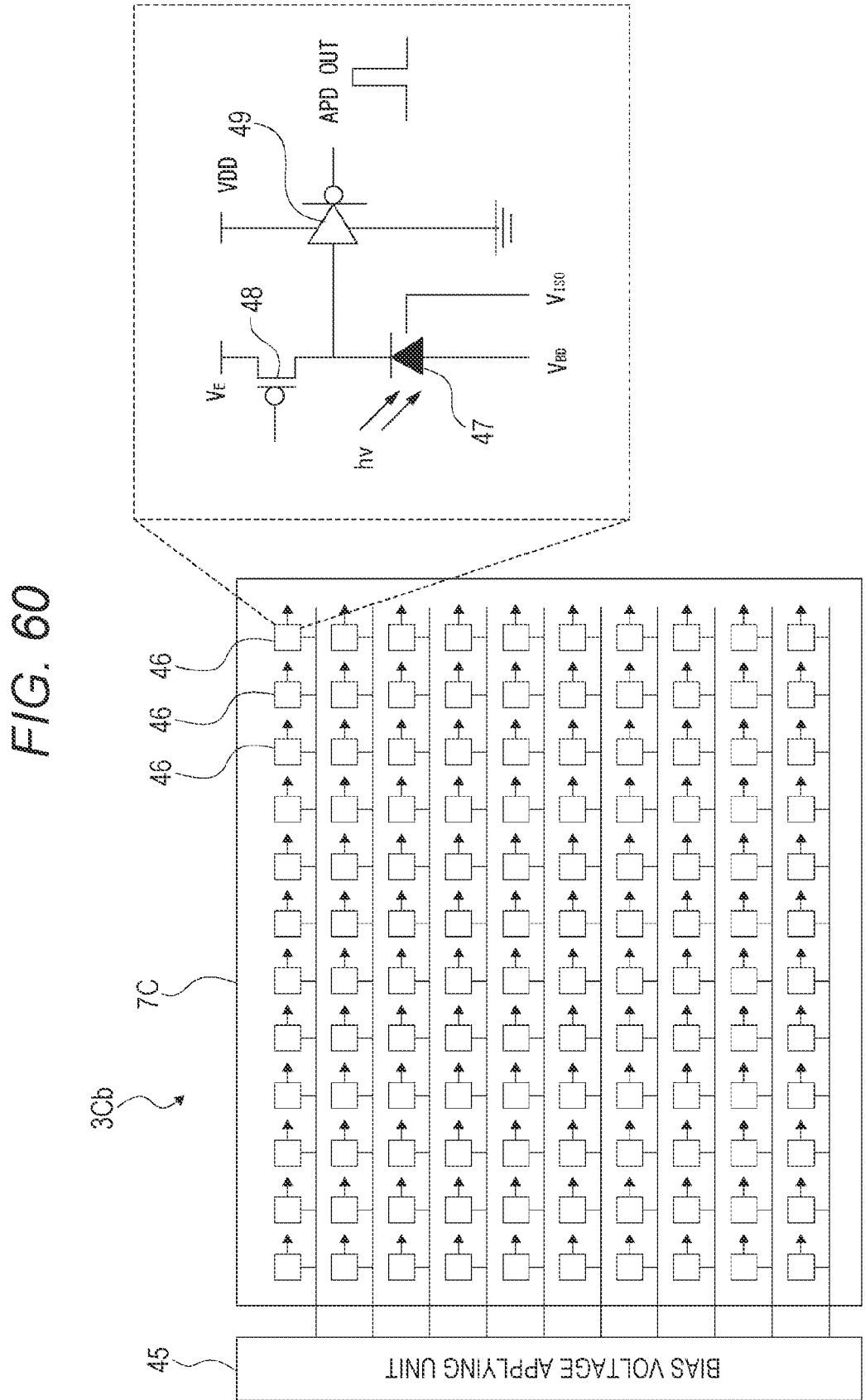
FIG. 60 is a diagram illustrating a configuration example of an imaging element using an SPAD element in a seventeenth example of the validity determination processing.

A configuration example of the imaging element 3Cb is illustrated in FIG. 60.

The imaging element 3Cb includes a pixel array unit 7C and a bias voltage applying unit 45.

The pixel array unit 7C is a light receiving surface that receives light collected by the lens 3a and in which a plurality of SPAD pixels 46 is arranged in a two-dimensional array in the row direction and the column direction.

As enlarged and illustrated in FIG. 60, the SPAD pixel 46 includes an SPAD element 47, a p-type metal oxide semiconductor field effect transistor (MOSFET) 48, and a CMOS inverter 49.

The SPAD element 47 forms an avalanche multiplication region by applying a large negative voltage VBD to a cathode and avalanche-multiplies electrons generated by incidence of one photon.

In a case where a voltage caused by the electrons avalanche-multiplied by the SPAD element 47 reaches the negative voltage VBD, the p-type MOSFET 48 performs quenching for releasing the electrons multiplied by the SPAD element 47 and returning to an initial voltage.

The CMOS inverter 49 shapes the voltage generated by the electrons multiplied by the SPAD element 47 so as to output a light reception signal (APD OUT) in which a pulse waveform starting from an arrival time of one photon is generated.

The bias voltage applying unit 45 applies a bias voltage to each of the plurality of SPAD pixels 46 arranged in the pixel array unit 7C.

The imaging element 3Cb having such a configuration outputs the light reception signal for each SPAD pixel 46 to the signal processing circuit 3c at the subsequent stage.

For example, the signal processing circuit 3c executes calculation processing for obtaining a distance to the subject on the basis of a timing when a pulse that indicates the arrival time of one photon is generated in each light reception signal and acquires distance measurement data for each SPAD pixel 46. The signal processing circuit 3c generates a distance image based on the distance to the subject detected by the plurality of SPAD pixels 46 on the basis of these pieces of the distance measurement data.

A configuration example of the single SPAD pixel 46 and peripheral portions will be described with reference to FIGS. 61 and 62.

Figure 61:
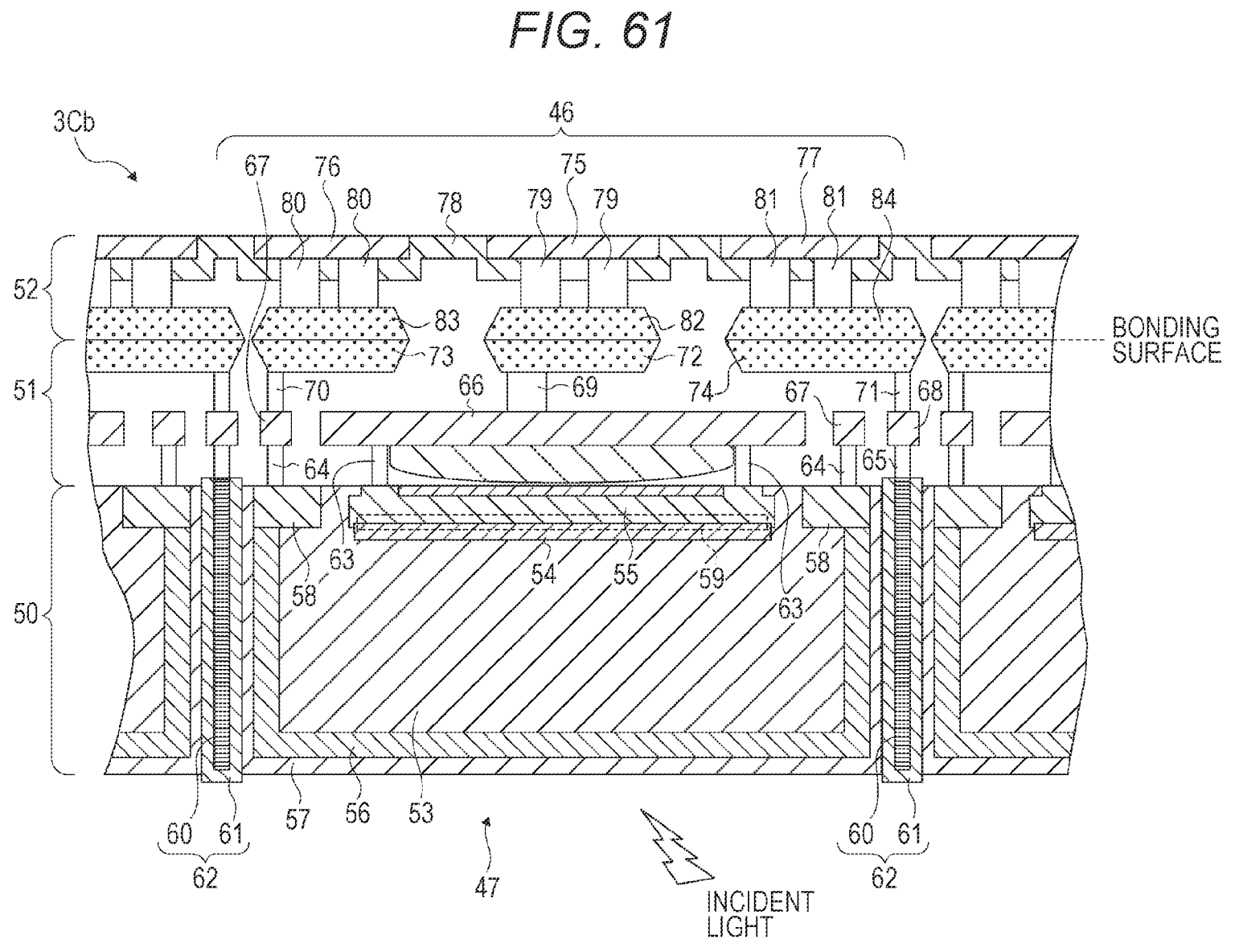

FIG. 61 is a cross-sectional view of the SPAD pixel 46. FIG. 62 is a plan view of the SPAD pixel 46.

The imaging element 3Cb has a stacked structure in which a sensor substrate 50, a sensor-side wiring layer 51, and a logic-side wiring layer 52 are stacked, and a logic circuit substrate (not illustrated) is stacked to the logic-side wiring layer 52.

On the logic circuit substrate, for example, the bias voltage applying unit 45, the p-type MOSFET 48, the CMOS inverter 49, and the like are formed.

For example, the imaging element 3Cb can be manufactured by forming the sensor-side wiring layer 51 on the sensor substrate 50, forming the logic-side wiring layer 52 on the logic circuit substrate, and then, bonding the sensor-side wiring layer 51 and the logic-side wiring layer 52 with a bonding surface (surface indicated by a broken line in FIG. 61).

The sensor substrate 50 is, for example, a semiconductor substrate of a thinly-sliced single-crystal silicon, a p-type or n-type impurity concentration is controlled, and the SPAD element 47 is formed for each SPAD pixel 46.

Furthermore, in FIG. 61, a surface on the opposite side of the bonding surface of the sensor substrate 50 is a light receiving surface that receives light.

On the sensor-side wiring layer 51 and the logic-side wiring layer 52, wiring to supply a voltage to be applied to the SPAD element 47, wiring to extract charges (electrons) generated by the SPAD element 47 from the sensor substrate 50, or the like are formed.

The SPAD element 47 includes an N well 53 formed on the sensor substrate 50, a P-type diffusion layer 54, an N-type diffusion layer 55, a hole accumulation layer 56, a pinning layer 57, and a high-concentration P-type diffusion layer 58.

In the SPAD element 47, an avalanche multiplication region 59 is formed with a depletion layer formed in a region where the P-type diffusion layer 54 is connected to the N-type diffusion layer 55.

The N well 53 is formed by controlling the impurity concentration of the sensor substrate 50 to the n type, and forms an electric field that transfers the electrons generated by photoelectric conversion by the SPAD element 47 to the avalanche multiplication region 59.

Note that, instead of the N well 53, a P well may be formed by controlling the impurity concentration of the sensor substrate 50 to a p type.

The P-type diffusion layer 54 is a dense P-type diffusion layer that is formed near the surface of the sensor substrate 50 and on the light receiving surface side with respect to the N-type diffusion layer 55 and is formed across a substantially-front surface of the SPAD element 47.

The N-type diffusion layer 55 is a dense N-type diffusion layer formed near the surface of the sensor substrate 50 and formed on the bonding surface side with respect to the P-type diffusion layer 54 and is formed across the substantially-front surface of the SPAD element 47.

In order to connect to a first contact electrode 63 (described later) to supply a negative voltage used to form the avalanche multiplication region 59, the N-type diffusion layer 55 has a convex shape of which a part is formed to the surface of the sensor substrate 50.

The hole accumulation layer 56 is a P-type diffusion layer formed to surround the side surfaces and the bottom surface of the N well 53 and accumulates holes. The hole accumulation layer 56 is electrically connected to an anode of the SPAD element 47, and a bias can be adjusted. Therefore, a hole concentration of the hole accumulation layer 56 is strengthened, and pinning including the pinning layer 57 is strengthened so that, for example, generation of a dark current can be prevented.

The pinning layer 57 is a dense P-type diffusion layer formed on the light receiving surface side of the hole accumulation layer 56 and on the surface on the adjacent SPAD element 47 side, and for example, prevents the generation of the dark current similarly to the hole accumulation layer 56.

The high-concentration P-type diffusion layer 58 is a dense P-type diffusion layer formed near the surface of the sensor substrate 50 so as to surround an outer periphery of the N well 53 and is used to connect to a second contact electrode 64 (described later) that electrically connects the hole accumulation layer 56 to the anode of the SPAD element 47.

The avalanche multiplication region 59 is a high electric field region formed on a boundary surface between the P-type diffusion layer 54 and the N-type diffusion layer 55 by a large negative charge applied to the N-type diffusion layer 55 and multiplies electrons generated by one photon entering the SPAD element 47. Furthermore, in the imaging element 3Cb, each SPAD element 47 is insulated and separated by an inter-pixel separation unit 62 having a double structure including a metal film 60 and an insulation film 61 formed between the adjacent SPAD elements 47.

The inter-pixel separation unit 62 is formed, for example, so as to pass through from the rear surface to the surface of the sensor substrate 50.

The metal film 60 is a film including metal such as tungsten that reflects light or the like, and the insulation film 61 is a film that has an insulation property such as SiO2.

For example, the inter-pixel separation unit 62 is formed by embedding the surface of the metal film 60 into the sensor substrate 50 to as to be covered with the insulation film 61, and the inter-pixel separation unit 62 electrically an optically separates the adjacent SPAD elements 47.

In the sensor-side wiring layer 51, the first contact electrode 63, the second contact electrode 64, a third contact electrode 65, first metal wiring 66, second metal wiring 67, third metal wiring 68, a fourth contact electrode 69, a fifth contact electrode 70, a sixth contact electrode 71, a first metal pad 72, a second metal pad 73, and a third metal pad 74 are formed.

The first contact electrode 63 connects the N-type diffusion layer 55 and the first metal wiring 66, the second contact electrode 64 connects the high-concentration P-type diffusion layer 58 and the second metal wiring 67, and the third contact electrode 65 connects the metal film 60 and the third metal wiring 68.

Figure 62:
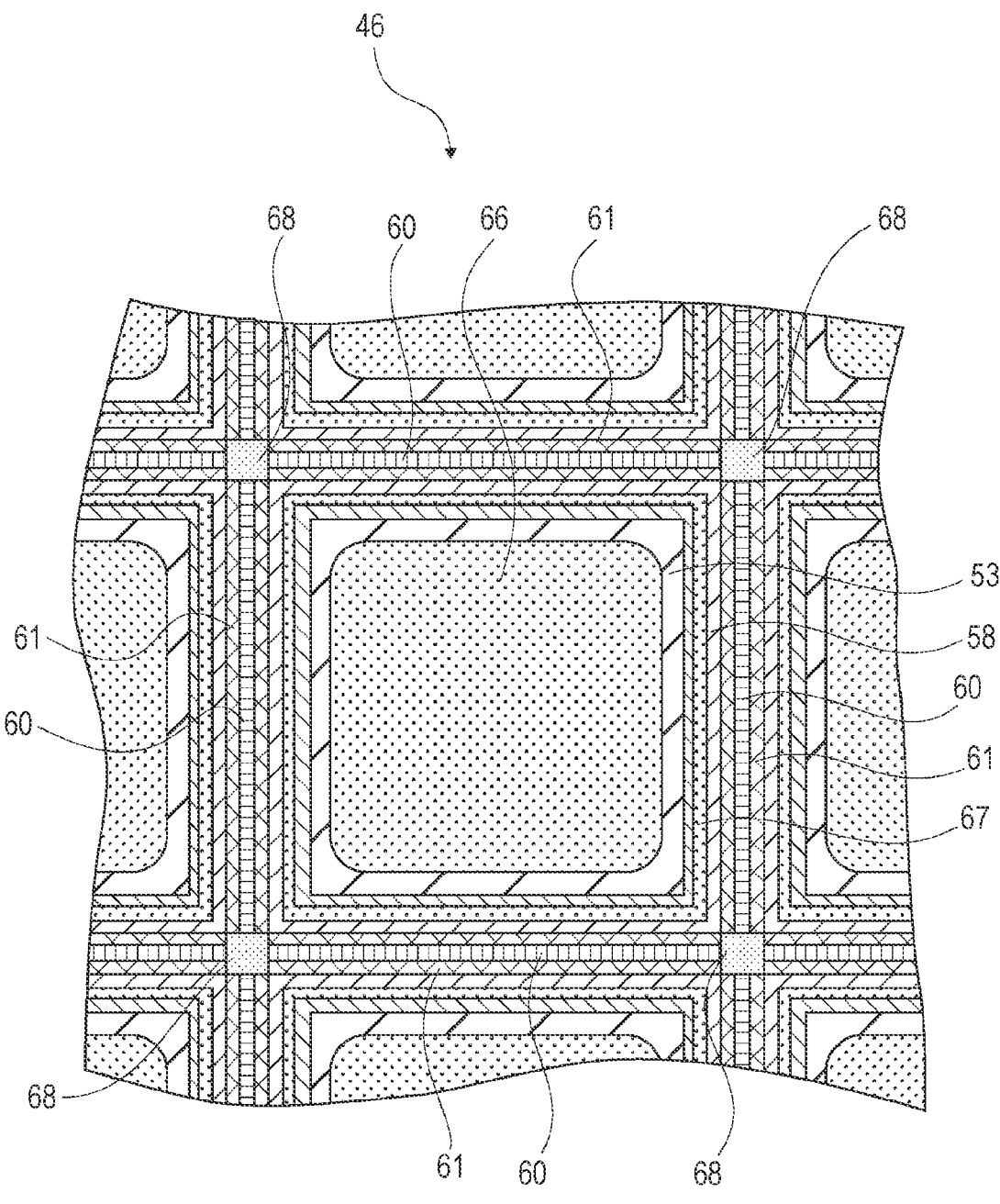
FIG. 62 is a plan view of the SPAD pixel in the seventeenth example of the validity determination processing.

For example, as illustrated in FIG. 62, the first metal wiring 66 is formed to be wider than the avalanche multiplication region 59 so as to cover at least the avalanche multiplication region 59.

The first metal wiring 66 reflects light that has passed through the SPAD element 47 to the SPAD element 47.

For example, as illustrated in FIG. 62, the second metal wiring 67 is formed to overlap the high-concentration P-type diffusion layer 58 so as to cover the outer periphery of the first metal wiring 66.

For example, the third metal wiring 68 is formed to connect to the metal film 60 at the four corners of the SPAD pixel 46.

The fourth contact electrode 69 connects the first metal wiring 66 and the first metal pad 72, the fifth contact electrode 70 connects the second metal wiring 67 and the second metal pad 73, and the sixth contact electrode 71 connects the third metal wiring 68 and the third metal pad 74.

The first metal pad 72, the second metal pad 73, and the third metal pad 74 are used to respectively, electrically, and mechanically bonded to a fourth metal pad 82, a fifth metal pad 83, and a sixth metal pad 84 (all of them are described later) formed in the logic-side wiring layer 52 with metal (copper) forming each metal pad.

In the logic-side wiring layer 52, a first electrode pad 75, a second electrode pad 76, a third electrode pad 77, an insulation layer 78, a seventh contact electrode 79, an eighth contact electrode 80, a ninth contact electrode 81, the fourth metal pad 82, the fifth metal pad 83, and the sixth metal pad 84 are formed.

Each of the first electrode pad 75, the second electrode pad 76, and the third electrode pad 77 is used for connection to the logic circuit substrate, and the insulation layer 78 is a layer that insulates the first electrode pad 75, the second electrode pad 76, and the third electrode pad 77 from each other.

The seventh contact electrode 79 connects the first electrode pad 75 and the fourth metal pad 82, the eighth contact electrode 80 connects the second electrode pad 76 and the fifth metal pad 83, and the ninth contact electrode 81 connects the third electrode pad 77 and the sixth metal pad 84.

The fourth metal pad 82 is bonded to the first metal pad 72, the fifth metal pad 83 is bonded to the second metal pad 73, and the sixth metal pad 84 is bonded to the third metal pad 74.

With such a wiring structure, for example, the first electrode pad 75 is connected to the N-type diffusion layer 55 via the seventh contact electrode 79, the fourth metal pad 82, the first metal pad 72, the fourth contact electrode 69, the first metal wiring 66, and the first contact electrode 63.

Therefore, in the SPAD pixel 46, the large negative voltage applied to the N-type diffusion layer 55 can be supplied from the logic circuit substrate to the first electrode pad 75.

Furthermore, the second electrode pad 76 is connected to the high-concentration P-type diffusion layer 58 via the eighth contact electrode 80, the fifth metal pad 83, the second metal pad 73, the fifth contact electrode 70, the second metal wiring 67, and the second contact electrode 64.

Therefore, in the SPAD pixel 46, the anode of the SPAD element 47 that is electrically connected to the hole accumulation layer 56 is connected to the second electrode pad 76 so that a bias with respect to the hole accumulation layer 56 can be adjusted via the second electrode pad 76.

Moreover, the third electrode pad 77 is connected to the metal film 60 via the ninth contact electrode 81, the sixth metal pad 84, the third metal pad 74, the sixth contact electrode 71, the third metal wiring 68, and the third contact electrode 65.

Therefore, in the SPAD pixel 46, a bias voltage supplied from the logic circuit substrate to the third electrode pad 77 can be applied to the metal film 60.

Moreover, as described above, the SPAD pixel 46 is formed to be wider than the avalanche multiplication region 59 so that the first metal wiring 66 covers at least the avalanche multiplication region 59, and the metal film 60 is formed to pass through the sensor substrate 50.

That is, the SPAD pixel 46 is formed to have a reflection structure in which all the surfaces of the SPAD element 47 other than a light incident surface is surrounded by the first metal wiring 66 and the metal film 60.

As a result, the SPAD pixel 46 can prevent occurrence of an optical crosstalk and improve sensitivity of the SPAD element 47 according to an effect of reflecting light by the first metal wiring 66 and the metal film 60.

Furthermore, the SPAD pixel 46 can adjust a bias with a configuration in which the side surfaces and the bottom surface of the N well 53 are surrounded by the hole accumulation layer 56 and the hole accumulation layer 56 is electrically connected to the anode of the SPAD element 47.

Moreover, the SPAD pixel 46 can form an electric field that assists carriers to the avalanche multiplication region 59 by applying the bias voltage to the metal film 60 of the inter-pixel separation unit 62.

As described above, the SPAD pixel 46 prevents occurrence of a crosstalk and improves the sensitivity of the SPAD element 47, and can improve the characteristics.

In the distance measurement by the ToF method using the SPAD pixel 46 having the structure described above, by directly measuring Lt, not performing distance measurement based on the sum Qa (pixel signal Sa) of the charge amount obtained by using the first reference signal a and the sum Qb (pixel signal Sb) of the charge amount obtained by using the second reference signal b, the distance measurement can be performed using a relational expression of "distance=c (light speed)*Δt/2".

Furthermore, as in the ToF method described above, in this ToF method, by using at least a part of the configuration of each example described above, it is possible to confirm the validity of the laser light source and recognize the positional relationship with the another imaging device AC.

In the distance measurement by the ToF method using the SPAD pixel 46, distance measurement can be performed with at least one spot light beam by irradiating (scanning) at least a part of the region of the imagable range with the laser light so as to draw a specific trajectory.

In this case, the laser light is not irradiated in a wide range and at the same time, and the laser light is continuously irradiated at one point. Therefore, it is possible to measure a farther distance than the distance measurement by the ToF method and the triangulation method described above while satisfying the safety standards of laser products and prescribed rules. However, the distance measurement using the SPAD pixel 46 can be configured as in the ToF method described above (configuring so that illumination unit 2B can output laser light with dot pattern or the like). Furthermore, these two ToF methods may be combined. That is, distance measurement can be performed with a plurality of spot light beams by irradiating at least a part of the region of the imagable range with the plurality of laser light beams so as to draw a specific trajectory. Note that the specific trajectories of the plurality of respective laser light beams may be at least partially the same or partially substantially the same, or may be at least partially different from each other.

Figure 63:
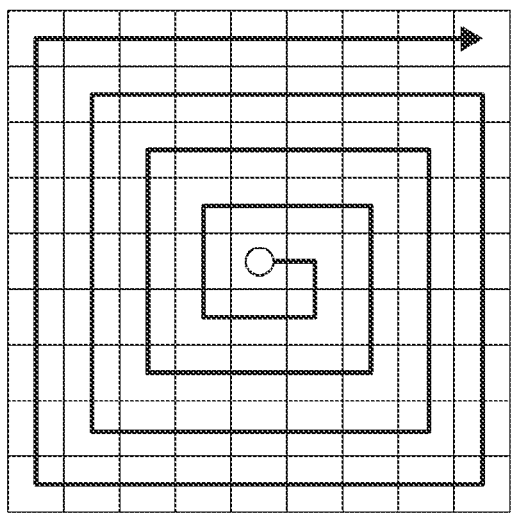
FIG. 63 is a diagram illustrating a trajectory of a valid laser light source in the seventeenth example of the validity determination processing.

An example of the specific trajectory (scan trajectory) drawn by the laser light irradiated from the valid laser light source 2b is illustrated in FIG. 63.

As illustrated, the laser light is irradiated from the substantially center portion of the irradiation range (may be entire irradiatable range or partial irradiatable range) in the clockwise direction. Of course, the laser light may be irradiated from the substantially center portion of the irradiation range in the counterclockwise direction.

Figure 64:
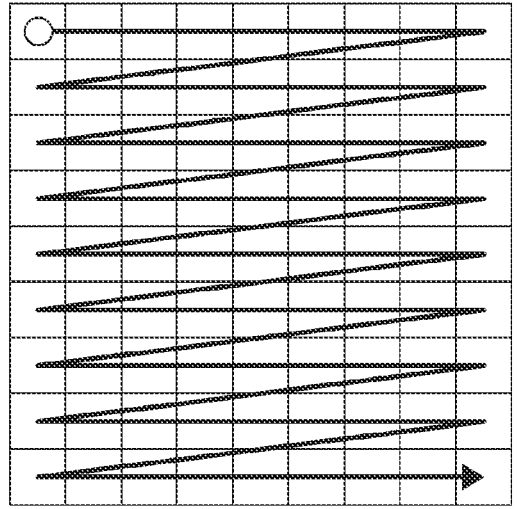
FIG. 64 is a diagram illustrating a trajectory of an invalid laser light source in the seventeenth example of the validity determination processing.

Furthermore, an example of a trajectory drawn by laser light irradiated from the invalid another light source 200 is illustrated in FIG. 64.

As illustrated, the laser light is sequentially irradiated from the left to the right for each of the pixel rows from the upper side to the lower side in the irradiation range. Of course, the laser light may be sequentially irradiated from the right to the left for each of the pixel rows from the upper side to the lower side, may be sequentially irradiated from the left to the right for each of the pixel rows from the lower side to the upper side, may be sequentially irradiated from the right to the left for each of the pixel rows from the lower side to the upper side in the irradiation range, or may be irradiated along a trajectory obtained by rotating the above trajectories.

In a case where the laser light trajectory as illustrated in FIG. 64 is detected, invalidity of the another light source 200 can be determined by comparing with the specific trajectory by the valid laser light source 2b.

Moreover, the position, the posture, or the like of the invalid another light source 200 can be estimated on the basis of the received laser light trajectory.

In order to realize such a function, it is sufficient for the illumination unit 2, the illumination control unit 2a, or the imaging device 1C to include a scanning unit that performs irradiation control so as to draw a specific trajectory.

It is sufficient for the scanning unit to be configured so that the laser light draws the specific trajectory, for example, the scanning unit may be realized by a mechanical movable unit, may be realized by changing a direction of a micromirror using micro electro mechanical systems (MEMS), may be realized by controlling refractive characteristics of a liquid crystal material, and in addition, may be realized by applying a phased array.

Figure 65:
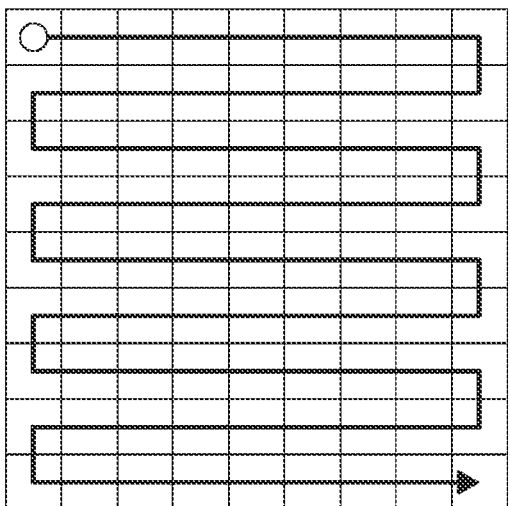
FIG. 65 is a diagram illustrating another example of the trajectory of the valid laser light source in the seventeenth example of the validity determination processing.
Figure 66:
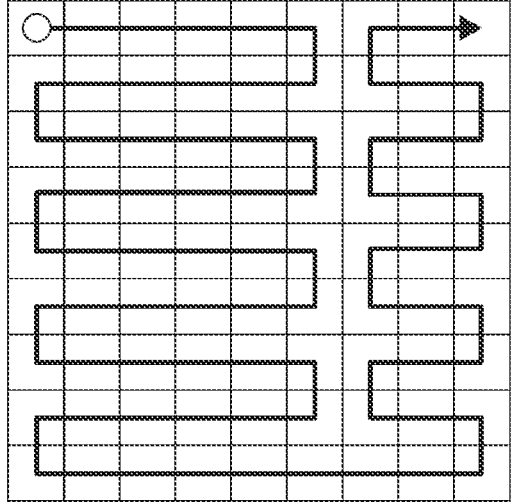
FIG. 66 is a diagram illustrating still another example of the trajectory of the valid laser light source in the seventeenth example of the validity determination processing.

Other examples of the specific trajectory by the valid laser light source 2b are illustrated in FIGS. 65 and 66.

The specific trajectory illustrated in FIG. 65 is a trajectory irradiated in a zigzag manner from the upper left to the lower right of the irradiation range. Of course, the irradiation may be performed from the lower left to the upper right in a zigzag manner, and the irradiation may be performed along a trajectory obtained by rotating these.

In the specific trajectory illustrated in FIG. 66, pixels positioned in the irradiation range are divided into left-side pixels and right-side pixels, and only the left-side pixels are irradiated in a zigzag manner, and then, the right-size pixels are irradiated in a zigzag manner. That is, the irradiation may be performed along a trajectory obtained by combining two or more types of trajectories having different irradiation orders and irradiation range areas.

Note that the trajectory illustrated in FIG. 64 may be the specific trajectory by the valid laser light source 2b.

With a configuration that can select various types of modes regarding the specific trajectory, the validity of the laser light source can be confirmed with high accuracy.

Note that, regarding the specific trajectory illustrated in FIG. 66, by changing a ratio between the left-side pixels and the right-side pixels, imitation of the laser light trajectory can be further sophisticated. Furthermore, by making it possible to select an irradiation start pixel from each of the left-side pixels and the right-side pixels, the imitation of the laser light trajectory can be harder.

4. Summary

As described in each example and the modification described above, the semiconductor device (imaging devices 1, 1A, 1B, and 1C) includes the imaging unit 3 (3B and 3C) including the photoelectric conversion elements 17 (17A and 17B) that receive the reflected light of the light emitted from the specific laser light source 2b reflected by the subject 100 (101) and performs photoelectric conversion and the control unit 4 that executes the validity determination processing for determining whether or not the light received by the photoelectric conversion element 17 (17A and 17B) is the light emitted from the specific laser light source 2b.

For example, in a case where distance measurement is performed using the specific laser light source 2b, the control unit 4 determines that the received light is reflected light of the light emitted from the specific laser light source 2b.

This can reduce a possibility of erroneous measurement caused by the entry of the another laser light source (another light source 200).

As described in the fourth example of the validity determination processing, the photoelectric conversion elements 17 include the first photoelectric conversion element 17A, and the first photoelectric conversion element 17A may be connected to at least four charge accumulation units (FD 20) to which charges accumulated in different periods in the first photoelectric conversion element 17A are transferred.

As a result, the light receiving waveform based on the waveform of the light emitted from the laser light source 2b can be obtained.

Therefore, it can be determined whether or not the light received by the first photoelectric conversion element 17A on the basis of the waveform at the time of light emission specific for each laser light source 2b is the light emitted from the specific laser light source 2b. Specifically, determination can be performed on the basis of the rising waveform, the shape of the overshoot, the shape of the undershoot, or the like at the time of light emission of the laser light source.

As described in the seventh example of the validity determination processing or the like, the photoelectric conversion elements 17 include the second photoelectric conversion element 17B, and the number of charge accumulation units (FD 20) connected to the second photoelectric conversion element 17B may be smaller than the number of charge accumulation units (FD 20) connected to the first photoelectric conversion element 17A.

For example, the second photoelectric conversion element 17B is used for distance measurement.

As a result, unlike the first photoelectric conversion element 17A used to confirm the validity of the laser light source or the authentication of the laser light source, the number of charge accumulation units (FD 20) connected to the second photoelectric conversion element 17B used for distance measurement is small, and therefore, the number of components can be reduced, and cost can be reduced.

As described in the seventh example of the validity determination processing or the like, the number of second photoelectric conversion elements 17B may be larger than the number of first photoelectric conversion elements 17A.

As a result, the number of charge accumulation units (FD 20) connected to the photoelectric conversion elements 17 (17A and 17B) is further reduced.

Therefore, the number of components can be further reduced, and it is possible to contribute to the cost reduction.

As described in the seventh example of the validity determination processing or the like, the first photoelectric conversion elements 17A may be arranged on the outer side of the group of the second photoelectric conversion elements 17B.

As a result, the second photoelectric conversion elements 17B can be densely arranged.

Therefore, the imaging element 3b (3Cb) can have a function for confirming the validity of the laser light source or both of a function for authenticating the laser light source and a function for measuring a distance without increasing the size of the imaging element 3b. Furthermore, because the first photoelectric conversion elements 17A that control the authentication function are positioned in the edge portion of the imaging element 3b (3Cb), an effect on a captured image can be minimized.

As described in the eighth example of the validity determination processing or the like, the first photoelectric conversion element 17A can be used for the validity determination processing and also used for distance measurement.

As a result, light reception data of the light reception data received by the first photoelectric conversion element 17A can be effectively used.

Therefore, the light reception data used for distance measurement can be increased, and the accuracy of the distance measurement result can be enhanced.

As described in the eighth example of the validity determination processing or the like, the first photoelectric conversion element 17A may be used for the validity determination processing, and the second photoelectric conversion element 17B may be used for distance measurement.

That is, some photoelectric conversion elements are used for the validity determination processing.

This simplifies the validity determination processing.

As described in the first example of the validity determination processing or the like, in the validity determination processing, determination based on the rising waveform of the laser light source 2b may be made.

The rising waveform of the light emitted from the laser light source 2b is individually different for the laser resonator that generates laser light. It is difficult for a person other than the manufacturer of the laser light source 2b to duplicate the rising waveform.

Therefore, by comparing the rising waveform unique to the laser resonator with the reception waveform, it is possible to confirm the validity of the laser light source 2b with high accuracy.

As described in the ninth example of the validity determination processing or the like, in the validity determination processing, determination based on the light reception spot shape of the light emitted from the laser light source 2b may be made.

The light reception spot shape is determined on the basis of the spatial positional relationship between the laser light source 2b, the subject 100 (101), and the imaging unit 3 (3B and 3C).

By executing the validity determination processing based on the light reception spot shape, it can be determined whether or not the light emitted from the another light source 200 positioned at a position different from the laser light source 2b is received, and the validity determination processing can be realized.

As described in each example described above, the imaging device 1 (1A, 1B, and 1C) may include the illumination unit 2 (2B) that includes a specific laser light source.

By integrating the specific laser light source 2b and the imaging unit 3 (3B and 3C), the positional relationship between the specific laser light source 2b and the imaging unit 3 (3B and 3C) is constantly fixed.

This makes it easier to determine the validity of the light emitted from the specific laser light source 2b.

As described in the third example of the validity determination processing or the like, the illumination unit 2 (2B) may be able to irradiate laser light with a first waveform and laser light with a second waveform different from the first waveform.

As a result, the validity determination processing can be executed using both of the first waveform and the second waveform.

Therefore, the accuracy of the determination result of the validity determination processing can be improved. Furthermore, it is possible to reduce a possibility that it is accidentally determined to be valid by receiving the light from the other light source (another light source 200). In particular, by imitating (duplicating) the irradiation by the illumination unit 2 (2B), it is difficult to inappropriately pass through the validity determination processing.

As described in the third example of the validity determination processing or the like, the light intensity of the first waveform and the light intensity of the second waveform may be different at the time of irradiation.

As a result, the validity determination processing considering the light intensity can be executed.

Therefore, the accuracy of the determination result of the validity determination processing can be further improved.

As described in the third example of the validity determination processing or the like, the rising shapes of the first waveform and the second waveform may be different from each other.

As a result, it is possible to execute the validity determination processing using the rising shapes of both of the first waveform and the second waveform.

Therefore, the accuracy of the determination result of the validity determination processing can be improved.

As described in the third example of the validity determination processing or the like, the illumination unit 2 (2B) may irradiate the first waveform and the second waveform in a random order.

As a result, it is possible to execute the validity determination processing considering an appearance order of the first waveform and the second waveform.

Therefore, the accuracy of the determination result of the validity determination processing can be improved.

As described in the fifth example of the validity determination processing or the like, light emission time lengths of the first waveform and the second waveform may be different from each other.

As a result, it is possible to execute the validity determination processing considering the light emission time lengths of the first waveform and the second waveform.

Therefore, the accuracy of the determination result of the validity determination processing can be improved.

As described in the sixth example of the validity determination processing or the like, non-light emission time lengths of the first waveform and the second waveform may be different from each other.

As a result, it is possible to execute the validity determination processing considering the non-light emission time lengths of the first waveform and the second waveform.

Therefore, the accuracy of the determination result of the validity determination processing can be improved.

As described in the ninth example of the validity determination processing or the like, the illumination unit 2 (2B) can emit spot-like laser light of which the irradiation range is equal to or less than one quarter of the imaging range of the imaging unit 3 (3B and 3C).

As a result, even if the spot shape of the light irradiated on the subject 100 (101) is modified and is doubled, the spot shape can be within the imaging range.

Therefore, the validity determination processing can be appropriately executed.

As described in the ninth example of the validity determination processing or the like, the illumination unit 2 (2B) may be able to emit laser light having a mirror symmetrical or point symmetrical spot-like shape.

This makes it easy to implement spot-like laser light.

Therefore, the cost can be reduced.

As described in the fourteenth example of the validity determination processing or the like, the illumination unit 2 (2B) may be able to emit laser light having a non-mirror symmetrical or non-point symmetrical spot-like shape.

This makes it difficult to imitate the spot-like laser light.

Therefore, the accuracy of the determination result of the validity determination processing can be improved.

As described in the tenth example of the validity determination processing or the like, the illumination unit 2 (2B) may be able to emit the dot pattern in which the plurality of spot-like laser light beams is irregularly arranged.

As a result, the plurality of spot-like laser light beams can be detected by one time of imaging by the imaging unit 3 (3B and 3C).

Therefore, it is more difficult to imitate the laser light, and the accuracy of the determination result of the validity determination processing can be improved. Furthermore, the irradiation time for the validity determination processing can be shortened.

As described in the tenth example of the validity determination processing or the like, the illumination unit 2 (2B) may be able to emit the dot pattern in which the plurality of spot-like laser light beams is regularly arranged.

This makes it easy to generate the dot pattern.

Therefore, while the accuracy of the determination result of the validity determination processing is improved, easiness of the implementation can be ensured. Furthermore, the irradiation time for the validity determination processing can be shortened.

As described in the tenth example of the validity determination processing or the like, the illumination unit 2 (2B) may be able to emit the dot pattern in which the spot-like laser light beams, of which the number is equal to or less than a quarter of the number of photoelectric conversion elements 17, are arranged.

As a result, it is possible to execute the validity determination processing considering the light reception spot shape according to each spot light beam forming the dot pattern.

That is, because the validity determination processing considering not only the arrangement of the light receiving spots but also the spot shape is executed, difficulty in the imitation of the laser light can be further increased, and the accuracy of the determination result of the validity determination processing can be improved. Furthermore, the irradiation time for the validity determination processing can be shortened.

As described in the seventeenth example of the validity determination processing or the like, the illumination unit 2 (2B) may irradiate the laser light source 2b so that the laser light having the spot shape smaller than the imaging range of the imaging unit 3 (3B and 3C) draws a specific trajectory within the imaging range.

As a result, the validity determination processing using the specific trajectory, that is, a scan trajectory can be executed.

Therefore, the difficulty in the imitation of the laser light can be increased, and the accuracy of the determination result of the validity determination processing can be improved.

In each example described above, the description has been made with reference to the flowcharts. However, a processing order of each processing illustrated in the flowchart may be arbitrarily changed. For example, distance measurement may be performed after the validity determination processing is executed or vice versa. Furthermore, in each example described above, the description has been made with reference to the drawings of the system configuration, the element configuration, and the circuit configuration. However, arrow directions in the drawings are examples, and at least some of the arrows may be reverse arrows or bidirectional arrows. Note that at least a part of the content described as the function, the control, and the processing of the control unit 4 can be configured to be executed by the signal processing unit 14 instead of the control unit 4. Furthermore, at least a part of the content described as the function, the control, and the processing of the signal processing unit 14 can be configured to be executed by the control unit 4 instead of the signal processing unit 14. Furthermore, at least a part of the data stored in the storage unit 6 may be the data stored in the data storage unit 15 instead of the storage unit 6 and can be configured to be read or written by the signal processing unit 14. Furthermore, at least a part of the data stored in the data storage unit 15 may be the data stored in the storage unit 6 instead of the data storage unit 15, and can be configured to be read and written by the control unit 4. Note that the present technology can be applied to a camera, a mobile phone, a smartphone, a tablet, a personal computer, a game machine, a television, a display, an electronic device, a mobile device, an automobile, a moving body, a drone, a flying object, a robot, a movable body, or the like.

The embodiment described in each example described above has various modifications. That is, some of the components in each example described above may be omitted, some or all of the components may be changed or modified. Furthermore, some components may be replaced with other components, and other components may be added to some or all of the components.

Moreover, some or all of the components may be divided into plural portions, some or all of the components may be separated into plural portions, and at least some of the plurality of divided or separated components may have different functions or characteristics.

Moreover, at least some of the components may be moved and a different embodiment may be formed.

Moreover, a different embodiment may be formed by adding a coupling element or a relay element to a combination of at least some of the components.

In addition, a different embodiment may be formed by adding a switching function to a combination of at least some of the components.

The present embodiment is not limited to the configuration indicated in each example described above, various changes can be made without departing from the scope of the present technology.

Note that the effects described in the present specification are only exemplary and not limited to these. Furthermore, there may be an additional effect.

5. The Present Technology

Note that, the present technology can have the following configurations.

(1)

A semiconductor device including:

an imaging unit including a photoelectric conversion element that receives reflected light of light emitted from a specific laser light source reflected by a subject and performs photoelectric conversion; and a control unit configured to execute validity determination processing for determining whether or not the light received by the photoelectric conversion element is the light emitted from the specific laser light source.

(2)

The semiconductor device according to (1), in which the photoelectric conversion element includes a first photoelectric conversion element, and the first photoelectric conversion element is connected to at least four charge accumulation units to which charges accumulated in different periods in the first photoelectric conversion element are transferred.

(3)

The semiconductor device according to (2), in which the photoelectric conversion element includes a second photoelectric conversion element, and the number of the charge accumulation units connected to the second photoelectric conversion element is less than the number of the charge accumulation units connected to the first photoelectric conversion element.

(4)

The semiconductor device according to (3), in which the number of the second photoelectric conversion elements is more than the number of the first photoelectric conversion elements.

(5)

The semiconductor device according to (3) or (4), in which the first photoelectric conversion elements are arranged on an outer side of a group of the second photoelectric conversion elements.

(6)

The semiconductor device according to any one of (2) to (5), in which the first photoelectric conversion element is used for the validity determination processing and also used for distance measurement.

(7)

The semiconductor device according to any one of (3) to (5), in which the first photoelectric conversion element is used for the validity determination processing, and the second photoelectric conversion element is used for distance measurement.

(8)

The semiconductor device according to any one of (1) to (7), in which in the validity determination processing, determination based on a rising waveform of the laser light source is made.

(9)

The semiconductor device according to any one of (1) to (8), in which in the validity determination processing, determination based on a light reception spot shape of light emitted from the laser light source is made.

(10)

The semiconductor device according to any one of (1) to (9), further including:

an illumination unit including the specific laser light source.

(11)

The semiconductor device according to (10), in which the illumination unit is able to irradiate laser light with a first waveform and laser light with a second waveform different from the first waveform.

(12)

The semiconductor device according to (11), in which light intensities of the first waveform and the second waveform at the time of irradiation are different from each other.

(13)

The semiconductor device according to (11) or (12), in which rising shapes of the first waveform and the second waveform are different from each other.

(14)

The semiconductor device according to any one of (11) to (13), in which the illumination unit irradiates the first waveform and the second waveform in a random order.

(15)

The semiconductor device according to any one of (11) to (14), in which light emission time lengths of the first waveform and the second waveform are different from each other.

(16)

The semiconductor device according to any one of (11) to (15), in which non-light emission time lengths of the first waveform and the second waveform are different from each other.

(17)

The semiconductor device according to any one of (10) to (16), in which the illumination unit is able to emit spot-like laser light of which an irradiation range is equal to or less than a quarter of an imaging range of the imaging unit.

(18)

The semiconductor device according to any one of (10) to (17), in which the illumination unit is able to emit laser light having a mirror symmetrical or point symmetrical spot-like shape.

(19)

The semiconductor device according to any one of (10) to (17), in which the illumination unit is able to emit laser light having a non-mirror symmetrical or non-point symmetrical spot-like shape.

(20)

The semiconductor device according to any one of (10) to (19), in which the illumination unit is able to emit a dot pattern in which a plurality of spot-like laser light beams is irregularly arranged.

(21)

The semiconductor device according to any one of (10) to (19), in which the illumination unit is able to emit a dot pattern in which a plurality of spot-like laser light beams is regularly arranged.

(22)

The semiconductor device according to any one of (10) to (21), in which the illumination unit is able to emit a dot pattern in which spot-like laser light beams of which the number is equal to or less than a quarter of the number of photoelectric conversion elements are arranged.

(23)

The semiconductor device according to any one of (10) to (19), in which the illumination unit irradiates the specific laser light source so that laser light having a spot shape smaller than the imaging range of the imaging unit draws a specific trajectory within the imaging range.

REFERENCE SIGNS LIST

1, 1A, 1B, 1C Imaging device
2 Illumination unit
2B Illumination unit
2*b* Laser light source
4 Control unit
17 Photoelectric conversion element
17A First photoelectric conversion element
17B Second photoelectric conversion element
20, 20*a*, 20*b*, 20*c*, 20*d* FD
100, 101 Subject
T1, T3, T4, T5 Light emission period

The invention claimed is:

1. A semiconductor device comprising:

an imaging unit including a first photoelectric conversion element and a second photoelectric conversion element that respectively receive reflected light of light emitted from a specific laser light source reflected by a subject and perform photoelectric conversion, wherein the first photoelectric conversion element is connected to at least four charge accumulation units to which charges accumulated in different periods in the first photoelectric conversion element are transferred, and the second photoelectric conversion element is connected to a number of charge accumulation units less than a number of charge accumulation units connected to the first photoelectric conversion element; and a control unit configured to execute validity determination processing and distance measurement, wherein the first photoelectric conversion element is used for the validity determination processing for determining whether or not the light received by the first photoelectric conversion element is the light emitted from the specific laser light source, and the second photoelectric conversion element is used for the distance measurement.

2. The semiconductor device according to claim 1, wherein the first photoelectric conversion element is one of a plurality of first photoelectric conversion elements, the second photoelectric conversion element is one of a plurality of second photoelectric conversion elements, and a number of the second photoelectric conversion elements is more than a number of the first photoelectric conversion elements.

3. The semiconductor device according to claim 1, wherein the first photoelectric conversion element is one of a plurality of first photoelectric conversion elements, the second photoelectric conversion element is one of a plurality of second photoelectric conversion elements, and the first photoelectric conversion elements are arranged on an outer side of a group of the second photoelectric conversion elements.

4. The semiconductor device according to claim 1, wherein the first photoelectric conversion element is used for the validity determination processing and also used for distance measurement.

5. The semiconductor device according to claim 1, wherein in the validity determination processing is based on a rising waveform of the laser light source.

6. The semiconductor device according to claim 1, wherein in the validity determination processing, determination based on a light reception spot shape of light emitted from the laser light source is made.

7. The semiconductor device according to claim 1, further comprising:

an illumination unit including the specific laser light source.

8. The semiconductor device according to claim 7, wherein the illumination unit is able to irradiate laser light with a first waveform and laser light with a second waveform different from the first waveform.

9. The semiconductor device according to claim 8, wherein light intensities of the first waveform and the second waveform at the time of irradiation are different from each other.

10. The semiconductor device according to claim 8, wherein rising shapes of the first waveform and the second waveform are different from each other.

11. The semiconductor device according to claim 8, wherein the illumination unit irradiates the first waveform and the second waveform in a random order.

12. The semiconductor device according to claim 8, wherein light emission time lengths of the first waveform and the second waveform are different from each other.

13. The semiconductor device according to claim 8, wherein non-light emission time lengths of the first waveform and the second waveform are different from each other.

14. The semiconductor device according to claim 7, wherein the illumination unit is able to emit spot-like laser light of which an irradiation range is equal to or less than a quarter of an imaging range of the imaging unit.

15. The semiconductor device according to claim 7, wherein the illumination unit is able to emit laser light having a mirror symmetrical or point symmetrical spot-like shape.

16. The semiconductor device according to claim 7, wherein the illumination unit is able to emit laser light having a non-mirror symmetrical or non-point symmetrical spot-like shape.

17. The semiconductor device according to claim 7, wherein the illumination unit is able to emit a dot pattern in which a plurality of spot-like laser light beams is irregularly arranged.

18. The semiconductor device according to claim 7, wherein the illumination unit is able to emit a dot pattern in which a plurality of spot-like laser light beams is regularly arranged.

19. The semiconductor device according to claim 7, wherein the illumination unit is able to emit a dot pattern in which spot-like laser light beams of which the number is equal to or less than a quarter of the number of photoelectric conversion elements are arranged.

20. The semiconductor device according to claim 7, wherein the illumination unit irradiates the specific laser light source so that laser light having a spot shape smaller than the imaging range of the imaging unit draws a specific trajectory within the imaging range.

* * * * *